(12) United States Patent
Nebrigic et al.

(10) Patent No.: US 9,397,370 B2
(45) Date of Patent: Jul. 19, 2016

(54) SINGLE AND MULTIPLE CELL BATTERY WITH BUILT-IN CONTROLLER

(75) Inventors: Dragan Danilo Nebrigic, Carlsbad, CA (US); Milan Marcel Jevtitch, Cincinnati, OH (US); Vladimir Gartstein, Cincinnati, OH (US); William Thomas Mllam, Knoxville, TN (US); James Vig Sherrill, Oak Ridge, TN (US); Nicholas Busko, Oak Ridge, TN (US); Peter Hansen, Knoxville, TN (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1501 days.

(21) Appl. No.: 11/726,101

(22) Filed: Mar. 21, 2007

(65) Prior Publication Data

US 2007/0212596 A1    Sep. 13, 2007

Related U.S. Application Data

(63) Continuation of application No. 10/221,424, filed as application No. PCT/US01/08454 on Mar. 16, 2001, now Pat. No. 7,208,928.

(60) Provisional application No. 60/191,138, filed on Mar. 22, 2000.

(51) Int. Cl.
*H01M 6/00*       (2006.01)
*H01M 10/42*      (2006.01)
*H01M 10/44*      (2006.01)

(52) U.S. Cl.
CPC .............. *H01M 10/42* (2013.01); *H01M 10/44* (2013.01)

(58) Field of Classification Search
USPC .............. 429/61, 62, 90, 91, 92, 7, 120, 121, 429/149, 153, 160, 163, 99
See application file for complete search history.

(56) References Cited

U.S. PATENT DOCUMENTS 4,578,631 A   3/1986   Smith
4,626,982 A   12/1986  Huber
(Continued)

FOREIGN PATENT DOCUMENTS

CA   2 081 601   1/1994
EP   0 546 652   6/1993
(Continued)

OTHER PUBLICATIONS

Translation of Paragraphs 9, 23 & 24 of JP 07-201358.
"Honda EV Plus Battery Brochure: The Dream of an Electric Vehicle"; www.honda.com/history/challenge/1988evplus/test/el. html, (date unknown).
Honda EV Plus Battery System Diagram, (date unknown).
Honda EV Plus Brochure; (date unknown).
Honda Civic Hybrid Battery Diagram, (date unknown).
Allen, Charlie, CMOS curbs the appetite of power-hungry dc-dc converter chips, Electronic Design, Nov. 14, 1985, pp. 175-179.
Arbetter, Barry and Maksimovic, Dragan, Control Method for Low-Voltage DC Power Supply in Battery-Powered Systems with Power Management, 28th Annual IEEE Power Electronics Specialists Conference, Jun. 22, 1997-Jun. 27, 1997, pp. 1198-1204.
(Continued)

*Primary Examiner* — Raymond Alejandro
(74) *Attorney, Agent, or Firm* — Greer, Burns & Crain, Ltd.

(57) ABSTRACT

Single and multiple cell batteries are provided with built-in controllers that monitor the cell or cells and provide a safety disconnect when certain monitored conditions are detected by the controller. Preferred single and multiple cell batteries have their cell or cells within a container having a positive terminal and a negative terminal. The built-in controller monitors the cell or cells for each of the following conditions: over temperature, short-circuit, overcharge, and over-discharge and the controller provides a safety disconnect when one of the monitored conditions exist. A multiple cell battery includes a built-in controller that monitors the temperature of the cells and provides a safety disconnect that electronically disconnects all of the cells when at least one of the cells exceeds a predetermined temperature, or a controller that monitors the state of charge of each of the cells and individually controls the charge cycle of each of the cells, or a controller that monitors the temperature of the cells and to provides a safety disconnect when at least one of the cells exceeds a predetermined temperature.

70 Claims, 29 Drawing Sheets

(56) References Cited

U.S. PATENT DOCUMENTS

| | | | |
|---|---|---|---|
| 4,672,303 | A | 6/1987 | Newton |
| 5,134,355 | A | 7/1992 | Hastings |
| 5,164,657 | A | 11/1992 | Gulczynski |
| 5,233,287 | A | 8/1993 | Lenk |
| 5,300,369 | A | 4/1994 | Dietrich |
| 5,528,480 | A | 6/1996 | Kikinis et al. |
| 5,547,775 | A | 8/1996 | Eguchi et al. |
| 5,622,789 | A | 4/1997 | Young |
| 5,751,139 | A | 5/1998 | Jordan et al. |
| 5,770,940 | A | 6/1998 | Goder |
| 5,929,615 | A | 7/1999 | D'Angelo et al. |
| 5,959,443 | A | 9/1999 | Littlefield |
| 6,074,775 | A * | 6/2000 | Gartstein et al. ............ 429/53 |
| 6,118,248 | A * | 9/2000 | Gartstein et al. ............ 320/107 |
| 6,163,131 | A * | 12/2000 | Gartstein et al. ............ 320/118 |
| 6,194,880 | B1 | 2/2001 | Fraidlin et al. |
| 6,249,156 | B1 | 6/2001 | Attwood |
| 6,483,278 | B2 | 11/2002 | Harvest |
| 6,541,947 | B1 | 4/2003 | Dittmer |
| 6,835,491 | B2 * | 12/2004 | Gartstein et al. ............ 429/92 |
| 7,208,928 | B2 * | 4/2007 | Nebrigic et al. ............ 323/285 |
| 2004/0056642 | A1 | 3/2004 | Nebrigic et al. |
| 2007/0212596 | A1 * | 9/2007 | Nebrigic et al. ............ 429/61 |

FOREIGN PATENT DOCUMENTS

| | | |
|---|---|---|
| EP | 0 546 872 | 6/1993 |
| EP | 0 622 863 A1 | 11/1994 |
| EP | 0 624 944 | 11/1994 |
| EP | 0 644 642 | 3/1995 |
| EP | 0 645 949 | 3/1995 |
| EP | 0 653 798 | 5/1995 |
| EP | 0 653 851 | 5/1995 |
| EP | 0 665 628 | 8/1995 |
| GB | 2 270 793 | 3/1994 |
| GB | 2 271 228 | 4/1994 |
| JP | 55-103051 | 8/1980 |
| JP | 57011466 | 1/1982 |
| JP | 59-228355 | 12/1984 |
| JP | 04-075430 | 3/1992 |
| JP | 05-041206 | 2/1993 |
| JP | 05-325943 | 12/1993 |
| JP | 06-054453 | 2/1994 |
| JP | 06-153412 | 5/1994 |
| JP | 07-192770 | 7/1995 |
| JP | 07-201358 | 8/1995 |
| JP | 07-263033 | 10/1995 |
| JP | 07-272748 | 10/1995 |
| JP | 09-140066 | 5/1997 |
| JP | 09-161851 | 6/1997 |
| JP | 10-021968 | 1/1998 |
| JP | 10-055825 | 2/1998 |
| JP | 10-262365 | 9/1998 |
| JP | 10-284099 | 10/1998 |
| JP | 10-285809 | 10/1998 |
| JP | 10-285820 | 10/1998 |
| SU | 726608 | 4/1980 |
| WO | WO 93/23887 | 11/1993 |
| WO | WO 94/00888 | 1/1994 |
| WO | WO 94/08358 | 4/1994 |
| WO | WO 96/08846 | 3/1996 |
| WO | WO 97/13189 | 4/1997 |
| WO | WO 97/18588 | 5/1997 |
| WO | WO 01/71894 * | 9/2001 ............ H01M 3/00 |

OTHER PUBLICATIONS

Goodenough, Frank, Off-Line and One-Cell IC Converters Up Efficiency, Electronic Design, Jun. 27, 1994, pp. 55-64.

Iwata, T., H. Yamauchi, H. Akamatsu, Y. Terada, A. Matsuzawa, Gate-Over Driving CMOS Architecture for 0.5V Single-Power-Supply-Operated Devices, 1997 IEEE International Solid-State Circuits Conference, Digest of Technical Papers, Feb. 6, 1997-Feb. 8, 1997, pp. 290-291, 473.

McClure, M., Constant Input Power Modulation Technique for High Efficiency Boost Converter Optimized for Lithium-Ion Battery Applications, 11th Annual Applied Power Electronics Conference and Exposition, Mar. 3, 1996-Mar. 7, 1996, pp. 850-855.

Moore, B., Regulator Topologies Standardize Battery-Powered Systems, Electronic Design News, Jan. 20, 1994, pp. 59-64.

Travis, B., Low-Voltage Power Sources Keep Pace with Plummeting Logic and μP Voltages, Electronic Design News, Sep. 26, 1996, pp. 51-62.

Williams, R., et al., High-Frequency DC/DC Converter for Lithium-Ion Battery Applications Utilizes Ultra-Fast CBiC/D Process Technology, 10th Annual Applied Power Electronics Conference and Exposition, Mar. 5, 1995-Mar. 9, 1995, pp. 322-332.

Yamauchi, H., Iwata, T., Akamatus, H., and Matsuzawa, A., A 0.5V/100MHz Over-Vcc Grounded Data Storage (OVGS) SRAM Cell Architecture With Boosted Bit-Line and Offset Source Overdriving Schemes, 1996 International Symposium on Low Power Electronics and Design, Aug. 12, 1996-Aug. 14, 1996, pp. 49-54.

Zhou, X., Wang, T., and Lee, F., Optimizing Design for Low Voltage DC-DC Converters, 12th Annual Applied Power Electronics Conference and Exposition, Feb. 23, 1997-Feb. 27, 1997, pp. 612-616.

Aguilar, C., Canales, F., Arau, J., Sebastian, J., and Uceda, J., An Integrated Battery Charger/Discharger with Power-Factor Correction, IEEE Transactions on Industrial Electronics, Oct. 1997, pp. 597-603.

Favrat, P., Paratte, L., Ballan, H., Declercq, M., and deRooji, N., A 1.5-V-Supplied CMOS ASIC for the Actuation of an Electrostatic Micromotor, IEEE/ASME Transactions on Mechatronics, Sep. 1997, pp. 153-160.

Lachs, W., Sutano, D., and Logothetis, D., Power System Control in the Next Century, IEEE Transactions on Power Systems, Feb. 1996, pp. 11-18.

Stratakos, Anthony, High-Efficiency Low-Voltage DC-DC Conversion for Portable Applications, University of California Berkeley, Department of EECS, http://bwrc.eecs.berkeley.edu/publications/1998/index.htm.

Douseki, Takakuni et al., A 0.5V MTCMOS/SIMOX Logic Gate, IEEE Journal of Solid State Circuits, v. 32, No. 10, Oct. 1997, pp. 1604-1609.

Wang, Chi-Chang et al., Efficiency Improvement in Charge Pump Circuits, IEEE Journal of Solid State Circuits, v. 32, No. 6, Jun. 1997, pp. 852-860.

Heacock, David and Freeman, David, Capacity Monitoring in Advanced Battery Chemistries, 10th Annual Battery Conference on Applications and Advances, Jan. 10, 1995-Jan. 13, 1995, pp. 185-191.

* cited by examiner

SINGLE AND MULTIPLE CELL BATTERY WITH BUILT-IN CONTROLLER

PRIORITY CLAIM AND CROSS REFERENCE TO RELATED APPLICATIONS

This application is a continuation of, incorporates by reference in its entirety, and claims priority under 35 U.S.C. §120 from co-pending prior Nebrigic et al. U.S. application Ser. No. 10/221,424, filed on Oct. 17, 2003 and now issued as U.S. Pat. No. 7,208,928 (hereinafter. "Nebrigic '928"), which was filed based upon PCT Application No. PCT/US01/08454, filed Mar. 16, 2001 and entitled Oscillatorless DC-DC Power Converter; which in turn further relates to, incorporates by reference in its entirety, and claims priority from U.S. Provisional Application Ser. No. 60/191,138, filed Mar. 22, 2000 (hereinafter, "Nebrigic '138").

Further, both Nebrigic '928 and Nebrigic '138 are related to, and incorporate by reference in their entirety, Nebrigic et al, U.S. Provisional Application Ser. No. 60/141,119, filed on Jun. 25, 1999 and entitled Battery Having Built-In Dynamically-Switched Capacitive Power Converter.

FIELD OF THE INVENTION

The present invention relates to DC/DC power supply controllers, and more particularly to regulated inductive power converters for integrated power management systems, and batteries having built-in controllers.

BACKGROUND OF THE INVENTION

Advances in electronics technology have enabled the design and cost-effective fabrication of portable electronic devices. Thus, usage of portable electronic devices continues to increase as do the number and types of products. Examples of the broad spectrum of portable electronic devices include pagers, cellular telephones, music players, calculators, laptop computers, and personal digital assistants, as well as others.

The electronics in a portable electronic device generally require direct current (DC) electrical power. Typically, one or more batteries are used as an energy source to provide this DC electrical power. Ideally, the energy source would be perfectly matched to the energy requirements of the portable electronic device. However, most often the voltage and current from the batteries are unsuitable for directly powering the electronics of the portable electronic device. For example, the voltage level determined from the batteries may differ from the voltage level required by the device electronically. In addition, some portions of the electronics may operate at a different voltage level than other portions, thereby requiring different energy source voltage levels. Still further, batteries are often unable to respond quickly to rapid fluctuations in current demand by a device.

A typical arrangement is shown in FIG. 1 for an electronic device 10, such as portable computer, that includes an energy source 12, such as one or more batteries, and a load device 14, such as the internal electronics that require electrical power. Interposed between the energy source 12 and the load device 14 is a power supply 16 that may perform a number of functions. For example, a power converter 20, depicted as integral to the power supply 16, provides the necessary changes to the power from the energy source 12 to make it suitable for the load device 14.

The power supply 16 may also perform functions other than power conversion. For example, protecting the energy source 12, load device 14 and/or power converter 20 from damage by a sustained high electrical current may require electrically disconnecting the energy source 12 from the rest of the portable electronic device 10. As another example, the power converter 20 may require assistance during start-up which is provided by the supply 16.

With respect to the types of power conversion required, the power converter 20 may "step up" (i.e., boost) or "step down" the voltage. That is, the converter 20 may increase or decrease the input voltage $V_S$ from the energy source 12 across a pair of input terminals 24, 25 to an output voltage $V_O$ provided to the load device 14 across a pair of output terminals 26, 27. The power converter 20 may also store an amount of energy to satisfy a brief spike or increase in demand by the load device 14 that the energy source 12 is unable to provide.

The power converter 20 may also regulate the output voltage $V_O$, keeping it close to the desired output voltage level and reducing rapid fluctuations that may cause detrimental noise or cause undesirable performance of the load device 14. Such fluctuations may occur due to changes in demand by the load, induced noise from external electromagnetic sources, characteristics of the energy source 12, and/or noise from other components in the power supply 16.

Inductive DC-DC power converters are often used in medium to medium/high capacity switching power supplies. Known inductive DC-DC power converters are based upon switching an output stage between a charge and discharge state. The output stage includes a switch that, when closed during the charge state, causes an inductive element, such as an inductor to charge (i.e., to store energy in an electric field) from the energy source. A rectifying element, such as a diode, is non-conductive, thereby preventing discharging to a load capacitor across the output terminals. During the discharge state, the switch is opened and the rectifying element conducts allowing the inductor to discharge into the load capacitor.

Known inductive DC-DC power converters are configured in various ways in order to achieve greater capacities, voltage ranges, and inverting/noninverting outputs. An inverted output has the opposite algebraic sign as the input. For example, an input voltage is provided at the positive input terminal 24 at +1.5 V referenced to a grounded negative input terminal 25. The positive output terminal 26 is grounded and the negative output terminal 27 is −1.0 V. Examples of known configurations include converters referred to buck, boost, buck-boost, noninverting buck-boost, bridge, Watkins-Johnson, current fed bridge, uk, single-ended primary inductance converter (SEPIC), buck square.

Inductive DC-DC power converters are often chosen due to power efficiencies which are greater than other converters such as linear converters, whose efficiency is related to the ratio of output voltage $V_O$ to input voltage $V_S$. Also, the output voltage $V_O$ of inductive converters is generally related to the duty cycle of the switching, rather than the operating frequency of the switching, unlike generally known capacitive power converters.

However, known output stages for inductive DC-DC power converters 20 do have some drawbacks related to the capacitor, switch, and rectifying elements used in the converter. Specifically, reliance upon a diode as the rectifying element imposes a voltage drop across the diode that makes low input voltages (e.g., sub-one volt) impractical. In addition, generally known switches similarly require a control signal of a magnitude unsuitable for low input voltages. In addition, the range of practical inductance and capacitance values is constrained by achievable operating frequencies of the controller.

Therefore, relatively expensive, noisy, and relatively large discrete inductors are required for the power output stage within an inductive converter.

Furthermore, known inductive DC-DC power converters 20 rely upon oscillator-based control. The inductor-capacitor combination chosen for these known "oscillator-controlled power converters" 20 generally dictate an operating frequency suitable for operation. Adjustments to the power delivered by the oscillator-controlled power converter is often provided by Pulse Width Modulation (PWM) or Pulse Frequency Modulation (PFM) by a controller. The problems with PWM and PFM schemes include circuit and fabrication complexity. Such complexity results in difficulty in miniaturizing the power converter 20 due to the number of discrete components necessary and/or the required area allocated on a semiconductor device.

In addition to the drawbacks associated with their complexity, oscillator-controlled power converters are also inefficient with light loads due to the continued operation of the oscillator.

Still further drawbacks in the prior art are the result of some inductive DC-DC power converters 20 using feedback, either inductor voltage $V_L$ or inductor current $i_L$, feedback to sense the energy stored in the inductor as well as to sense the output voltage $V_O$. These feedback techniques cause problems due to the nature of PWM and PFM control. For instance, inductor voltage $V_L$ feedback is an indirect approach to sensing the stored energy in the inductor L and introduces noise into the feedback voltage $V_F$, (which is the same as or directly related to the inductor voltage $V_L$,) due to fluctuations in input voltage $V_S$ and/or demand by the load device 14. Using current feedback avoids sources of voltage noise; however, known current-feedback power converters 20 suffer problems with respect to inadequate robustness to noise disturbances in the current feedback $i_F$, (which is the same as or directly related to the inductor current $i_L$,) resulting in premature switching and reduced power converter stability.

SUMMARY OF THE INVENTION

The invention concerns single and multiple cell batteries. Embodiments of the invention concern single and multiple cell batteries with built-in controllers the monitor the cell or cells and provide a safety disconnect when certain monitored conditions are detected by the controller. Preferred embodiment single and multiple cell batteries have their cell or cells within a container having a positive terminal and a negative terminal. The built-in controller monitors the cell or cell for each of the following conditions: over temperature, short-circuit, overcharge, and over-discharge and the controller provides a safety disconnect when one of the monitored conditions exist.

A multiple cell battery of embodiments of the invention include a built-in controller that monitors the temperature of the cells and provides a safety disconnect that electronically disconnects all of the cells when at least one of the cells exceeds a predetermined temperature, or a controller that monitors the state of charge of each of the cells and individually controls the charge cycle of each of the cells, or a controller that monitors the temperature of the cells and to provides a safety disconnect when at least one of the cells exceeds a predetermined temperature.

These and other embodiments, objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

DETAILED DESCRIPTION OF INVENTION

Figure 1:
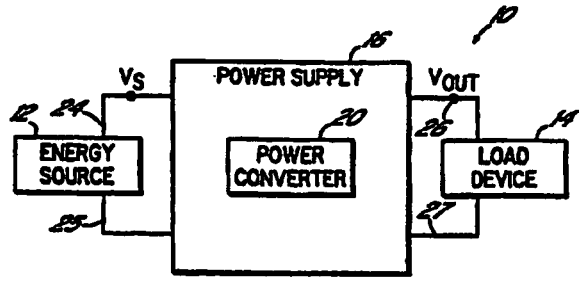
FIG. 1 (prior art) is a top-level block diagram of a conventional portable electronic device incorporating a power supply with a power converter.
Figure 2A:
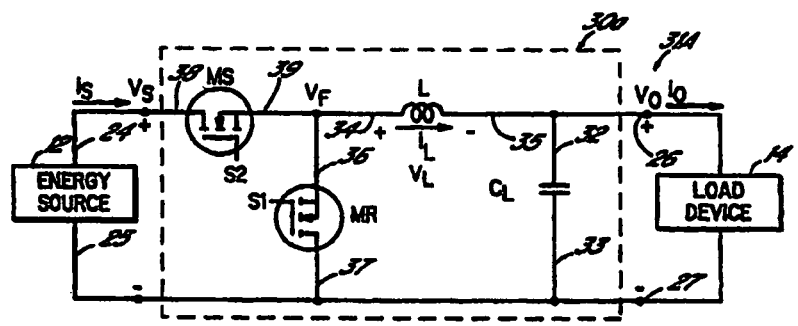
FIG. 2A is a top-level diagram of an output stage for a buck power converter.

Embodiments of the invention modify known inductive power converters by using a MOSFET configured as a synchronous rectifier to replace the conventional diode rectifying element, as will be discussed with respect to the general buck and boost arrangements of FIGS. 2A and 2B. Referring to FIG. 2A, a top-level diagram of a buck power output stage 30a for a power converter 31A is depicted, as an example of a down converter that provides an output voltage $V_O$ that is less than the input voltage $V_S$. The buck output stage 30a is coupled to an energy source 12 at input terminals 24, 25 and to a load device 14 at output terminals 26, 27 to deliver energy from the energy source to the load device. The energy source 12 provides an input voltage $V_S$ and an input current is. The load device 14 receives a current $i_O$ and an output voltage $V_O$.

The buck output stage 30a includes a switch MS, a rectifying element MR, an inductive element, such as an inductor L, and a capacitance element, such as a load capacitor $C_L$. The load capacitor $C_L$ has its positive terminal 32 coupled to the positive output terminal 26 and its negative terminal 33 coupled the negative output terminal 27, which is also coupled to the negative input terminal 25 forming a ground reference. The load capacitor $C_L$, thus, is charged to the output voltage $V_O$. The inductor L has its positive end 34 coupled to a feedback voltage node $V_F$. The feedback voltage $V_F$ is related to the voltage $V_L$ across the inductor L. The inductor L has its negative end 35 coupled to the positive output terminal 26.

In an embodiment of the invention, the rectifying element MR in FIG. 2A is implemented as a MOSFET configured as a synchronous rectifier, and has its positive terminal (source) 36 coupled to the feedback voltage node $V_F$ and its negative terminal (drain) 37 coupled the negative input and output terminals, 25, 27. The rectifying element MR closes in response to a control signal S1 in order to act like a diode. The MOSFET of the rectifying element MR has a channel that conducts current in the reverse direction, and thereby acts like a diode often used in oscillator-controlled power converters 20, by having the source and drain reversed compared to the MOSFET switch MS. The switch MS has its positive end (drain) 38 coupled to the positive input terminal 24 and its negative end (source) 39 coupled to the feedback voltage node $V_F$. The switch MS closes in response to control signal S2 turning ON.

During the discharge state, the control signal S1 is ON to close the rectifying element MR so that it conducts and the control signal S2 is OFF to open the switch MS, allowing the inductor L to discharge into the load capacitor $C_L$. During the charge state, the control signal S1 is OFF to open the rectifying element or make it non-conductive MR and the control signal S2 is ON to close the switch MS, allowing the inductor to be energized by the input current is from the energy source 12.

Figure 2B:
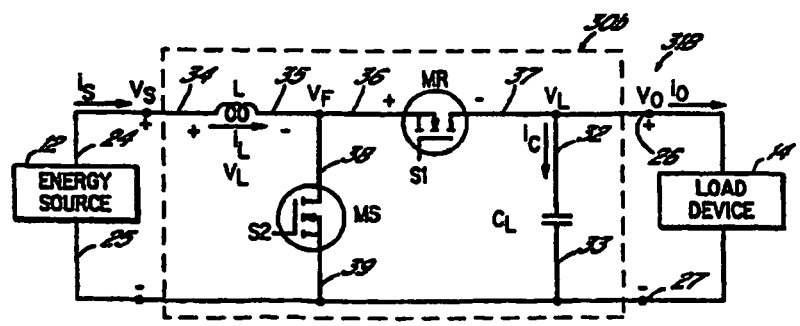
FIG. 2B is a top-level diagram of an output stage for a boost power converter.

Referring to FIG. 2B, a boost power output stage 30b for a power converter 31 illustrates a configuration suitable for increasing the output voltage $V_O$ with respect to the input voltage $V_S$. The boost power output stage 30b has its input terminals 24, 25, output terminals 26, 27, and load capacitor $C_L$ configured as described above for the buck power output stage 30a. The inductor voltage $V_L$ is defined between the input terminal 24 and the feedback voltage node $V_F$. This inductor voltage $V_L$ is thus equivalent to the feedback voltage $V_L$ minus the input voltage $V_S$.

Rectifying element MR has its negative end 37 coupled to $V_L$ the feedback voltage node $V_F$ and its positive end 36 coupled to the positive output terminal 26. Specifically, a MOSFET is configured as a synchronous rectifier with its drain as the negative end and its source as the positive end. MOSFET switch MS has its positive end (drain) coupled to the feedback voltage node $V_F$ and its negative end (source) coupled to ground. During the discharge state, the MOSFET switch MS opens in response to control signal S2 turning OFF and rectifying element MR closes in response to control signal S1 turning ON, coupling the energy source 12 and inductor L to the load capacitor $C_L$. Thus, the input voltage $V_L$ and inductor voltage $V_L$ are added in order to boost the output voltage $V_O$ imparted to the load capacitor $C_L$. During the charge state, MOSFET switch MS closes in response to control signal S2 turning ON, coupling the inductor L across the energy source 12. Rectifying element MR opens in response to control signal S1 turning OFF, disconnecting the load capacitor $C_L$ from the energy source 12 and inductor L.

In accordance with one aspect of the present invention, the buck power output stage 30a of FIG. 2A and the boost power output stage 30b of FIG. 2B are both advantageously efficient and operable with a low input voltage (e.g., sub-one volt) by implementation as an integrated circuit fabricated in a 0.35 micron double salicide process (two metal, two poly salicide) utilizing MOSFET transistor switches capable of low threshold (e.g., sub-one volt) control, as described the following co-pending and commonly owned applications all filed on Mar. 22, 2000: U.S. Ser. No. 09/532,761, PCT publication WO/2001US08452, entitled "Lateral Asymmetric Lightly Doped Drain MOSFET", naming Ying Xu et al., which is hereby incorporated by reference. In addition to having a low threshold control, the disclosed MOSFET devices have a low on-resistance, directly contributing to the efficiency of the power output stage 30a and 30b used in accordance with the invention.

Figure 3:
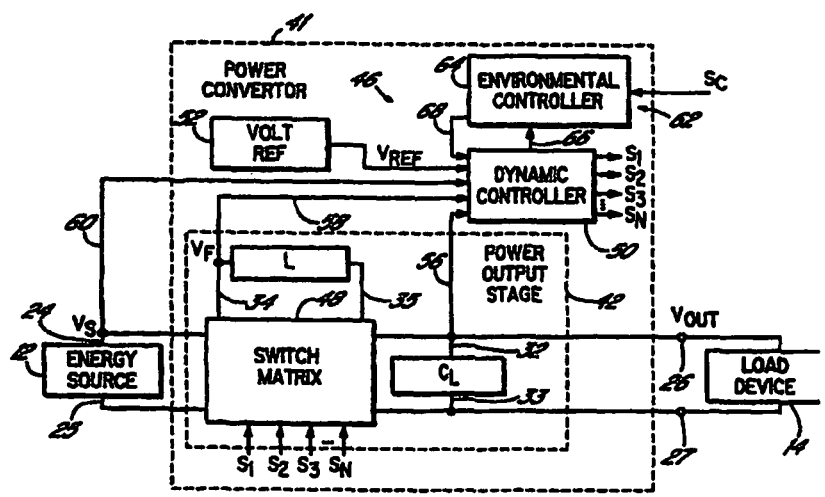
FIG. 3 is a top-level block diagram of a dynamically controlled inductive power converter in accordance with the invention.

Referring to FIG. 3, a power converter 41 is depicted in block diagram form, illustrating oscillatorless, dynamic control of power transfer from an energy source 12 to a load device 14 coupled to the output voltage $V_O$ across output terminals 26, 27 in accordance with one aspect of the invention. The power converter 41 is dynamically controlled in that it adapts to the demands from the load device 14, even with variations in the input voltage $V_S$, and variation in the transfer and storage characteristics of the power converter 41.

The power converter 41 is intrinsically voltage regulated in that the amount of energy transferred does not only correspond to the demand, but the rate of energy transfer is controlled so that the output voltage $V_O$ remains within an accepted range. This is generally referred to as remaining within an acceptable voltage ripple $V_{RIP}$.

The power converter 41 includes a power output stage 42 that transfers the stored energy to the load device 14 and a power controller 46 coupled to the power output stage 30 to responsively command the appropriate amount of stored energy to be transferred in accordance with the present invention.

In one embodiment, the power output stage 42 is an inductive DC-DC power converter, of which the above described buck power output stage 30a and boost power output stage 30b are examples. The load capacitor $C_L$ is electrically coupled across the output terminals 26, 27. The load capacitor $C_L$ stores electrical charge and provides the output voltage $V_O$ in relation to its stored charge. The power output stage 42 also incorporates the inductor L for transferring energy from the energy source 12 to the load capacitor $C_L$ as discussed above. The series resistance for the inductor L and the load capacitor $C_L$ may advantageously be chosen to be low so that the power converter 41 has reduced power consumption. The power output stage 42 includes a switch matrix 48 coupled to the inductor L, load capacitor $C_L$, and energy source 12 for configuring the power output stage 30 between a charge state and a discharge state.

In addition, the power output stage 30 may be inverting or noninverting, with respect to whether the output voltage has an opposite algebraic sign to the input voltage $V_S$. For example, a 2.2 V input voltage $V_S$ may be converted to a –1.6 V output voltage $V_O$. Generally, noninverting embodiments are illustrated below for clarity, although one skilled in the art, having the benefit of the instant disclosure, should recognize application to inverting power converters.

Multi-loop power controller 46 comprises a dynamic controller 50, a voltage reference 52, and an environmental controller 64 to advantageously control the power output stage 42. The dynamic controller is responsive to feedback signals which act as input signals to the controller 50. A first control loop 56 is formed by the output voltage $V_O$ from output terminal 26 being provided as feedback to the dynamic controller 50. The dynamic controller 50 commands the switch matrix 48 to transfer additional charge from the energy source 12 to the load capacitor $C_L$ in response to the output voltage $V_O$ being below a predetermined value $V_{REF}$. The dynamic controller 50 makes the determination of whether $V_O$ is below a predetermined value in comparison to a reference voltage $V_{REF}$ from voltage reference 52. One suitable $V_{REF}$ may be provided by the energy source 12 if it is sufficiently voltage stable to simplify the voltage reference 52 (e.g., lithium batteries are voltage stable). Thus, the voltage reference 52 may then be provided by a voltage divider or multiplier of the input voltage $V_S$ to achieve the desired reference voltage $V_{REF}$.

In addition to the first control loop 56, the multi-loop power controller 46 is responsive to a second control loop 58 or input signal. In the second control loop 58, the energy stored in the inductor L is sensed indirectly by the dynamic controller 50 as a feedback voltage $V_F$, which is the same as or directly related to the inductor voltage $V_L$. Alternatively, the energy stored in the inductor L may be directly sensed as the strength of an electrical field created by inductor current $i_L$, or by a feedback current $i_F$, which may be the same as or directly related to the inductor current $i_L$, as will be discussed with regard to FIG. 15 below. Thus, using the feedback signal associated with the inductor, any discharge of the inductor L upon demand may be predicated upon the inductor L first reaching an optimum state of charge (i.e., energy stored in the form of an electrical field). The optimum state of charge exists because undercharging the inductor L results in unnecessary switching power losses and overcharging the inductor L unnecessarily limits the rate of power transfer.

Regarding unnecessary switch power losses, dynamic control of the switch matrix 48 achieves efficiency in part as described with the first control loop by remaining in the discharge state until more charge is needed (i.e., until $V_O$ drops below $V_{REF}$). Prior art oscillator-controlled power converters 20, by contrast, are switched at a fixed rate even when not necessary. Therefore, the embodiment of the present invention is oscillatorless and provides control non-oscillatorily even though it will switch periodically, because the switching is determined by feedback control and does not continuously oscillate at a fixed frequency.

Additional efficiency in the dynamic control of the switch matrix 48 is realized by remaining in the charge state long enough for the inductor L to acquire a significant amount of charge. For example, charging to 40% rather than 80% of full charge would require that the operating frequency would double to transfer the same power. The switch MS and rectifying element MR dissipate power in relation to this increased operating frequency. This is due to low-on resistance and high-off resistance of the Field Effect Transistors used. Since power consumption is a function of the square of the current times the resistance, most of the power loss occurs during the transition. Consequently, the second control loop 58 senses the voltage level across the inductor L to avoid undercharging during the charge state, and thus avoid unnecessary switching losses.

Optimizing the charge on the inductor L in accordance with one aspect of the invention also includes avoiding overcharging. Inductors are characterized by their rate of charging as a function of time. Specifically, as inductors approach a fully energized condition, their rate for accepting additional energy decreases. Thus, the initial amount of energy acquired by the inductor takes less time than a later similar amount of energy. For example, it would take less time to energize the inductor L twice to 45% than to energize the inductor L once to 90%, even though the same amount of energy would be accepted by the inductor L. Consequently, leaving the switch matrix 48 in the charge state for a period of time longer than required to achieve the optimum level of charge of the inductor L misses an opportunity to transfer more power.

It should be appreciated that the optimum level of stored energy for a particular inductive component may be determined empirically and/or analytically as would be apparent to those skilled in the art having the benefit of the instant disclosure.

In combination with one or more other control loops 56, 58 discussed above, the power converter 41 may advantageously include a forward control loop 60 as an input signal whereby one or more parameters of the energy source 12 are provided to the dynamic controller 50. One use of the forward control loop 60 would include disabling (i.e., interrupting output current to the output terminals 26, 27) and/or bypassing (i.e., directly coupling the energy source 12 to the output terminals 26, 27) the power converter 31 due to unsafe conditions or performance limiting conditions sensed in the energy source 12. For example, a low input voltage may indicate inadequate remaining charge in the energy source 12 to warrant continued operation of the power converter 31. As another example, the electrical current drawn from the energy source 12 may be too high for sustained operation. Thus, a protection circuit may be included in the power converter 41 for interrupting output current to the output terminals 26, 27 based upon control loop 60.

As yet an additional example of dynamic control, a large demand by the load device 14 may warrant continued operation of the power converter 41 in parallel to a direct coupling of the energy source 12 to the output terminals 26, 27. This may be especially true when the input voltage $V_S$ and desired output voltage $V_O$ are approximately the same. An increased output current capacity is achievable by having two paths providing current to output terminals 26, 27.

As a further example, the feedback voltage VF (second control loop 58), and the input voltage $V_S$ (forward control loop 60) may indicate that the power converter 41 is fully discharged and is in a start-up condition. This start-up condition may advantageously warrant use of a rapid progressive start-up circuit, an example being described below in accordance with one aspect of the invention.

In combination with one of the other control loops or control input signals 56, 58, and 60, the power controller 46 may further include an adaptive control loop 62, as represented by an environmental controller 64. The environmental controller 64 senses a control parameter 66 and provides a command 68 to the dynamic controller 50 for altering the predetermined value for the output voltage $V_O$. For example, the environmental controller 64 may sense that the dynamic controller 50 has become unstable, and in response thereto, may provide a signal to drive the dynamic controller 50 to a stable output condition. More particularly, the environmental controller 64 may be adapted to sense an unstable operating condition of the power converter 41, such as the instantaneous output voltage and current each approaching a constant value. The environmental controller 64 may then adjust the predetermined value to drive the power converter 41 to a stable operating condition. Moreover, such altering of the predetermined value may include resetting of the dynamic controller 50 to a stable initial condition.

As another example, the adaptive control loop 62 may include a control signal Sc that is input to the environmental controller 64 whereby the dynamic controller 50 can be made to respond to changes in a load device 14 (e.g., CPU, volatile memory, analog-to-digital converter, digital-to-analog converter) or to other parameters. The load device 14 may advantageously perform better with an adjusted output voltage $V_O$ from the power converter 41. As another example, the output control signal Sc may be a reconfiguration control signal, such as for selecting a desired inverting or noninverting mode or predetermined output voltage $V_O$. As yet another example, a protective function (e.g., bypassing, disabling, or altering the output voltages) may be dictated by the $S_C$ command to preclude damaging a load device 14. For example, the load device 14 may fail under high current, and thus, limits may be imposed to preclude this occurrence.

Depending upon the type of switch matrix 48 that is utilized in the invention, various control signals are generated by the dynamic controller 50 for the switch matrix 48, as represented by switch signals S1, S2, S3 to SN. For example, control signals S3 to SN may represent inputs for a configuring the power output stage 42 to various combination in order to provide a step up, step down, inverted, and/or noninverted output arrangement.

It should be appreciated that the inductor L and the load capacitor $C_L$ are illustrative of charge storage and transfer components and may represent discrete elements or integrated circuit elements.

Moreover, due to the flexibility of the dynamic controller 50, the load capacitor $C_L$ may include various levels of storage capability, such as with small capacitors (e.g., ceramic, chip thick film, tantalum, polymer) and large capacitors (e.g., ultra-capacitors, pseudo-capacitors, double-layer capacitors). The amount of inductance and capacitance is reflective of the amount of storage capability. Thus, providing the same amount of energy transfer requires either that small doses of energy be transferred from a small inductor L with a high operating frequency or that larger doses of charge be transferred more slowly. Thus, the power converter 41 is flexible in that the same dynamic controller 50 may control various power output stages 42. In particular, unlike the prior art oscillator-controlled power converter 20, the dynamic controller 50 may operate in the low operating frequency range appropriate for power output stages 30 incorporating ultra-capacitors.

It should further be appreciated that the energy source 12 may include various electrical charge storage or generating devices such as one or more electrochemical cells (e.g., a battery), photovoltaic cells, a direct-current (DC) generator (e.g., a wrist watch charged by a motion-powered generator in combination with a rechargeable battery), and other applicable power sources.

As another example, power converters 41 consistent with the invention may be used advantageously in electronic devices powered by other power supplies. For example, a device receiving its power from a standard alternating current (AC) wall plug generally transforms the AC power into direct current (DC) power for electronic portions of the device. The DC power provided may be unsuitable for all or portions of the electronics without further adjustment and regulation. For example, a microprocessor may be operating at 2.2 V whereas input/output electronics may operate at 5 V. Consequently, a power converter 41 in accordance with the invention may be used to step-down the input voltage to the microprocessor.

Figure 4:
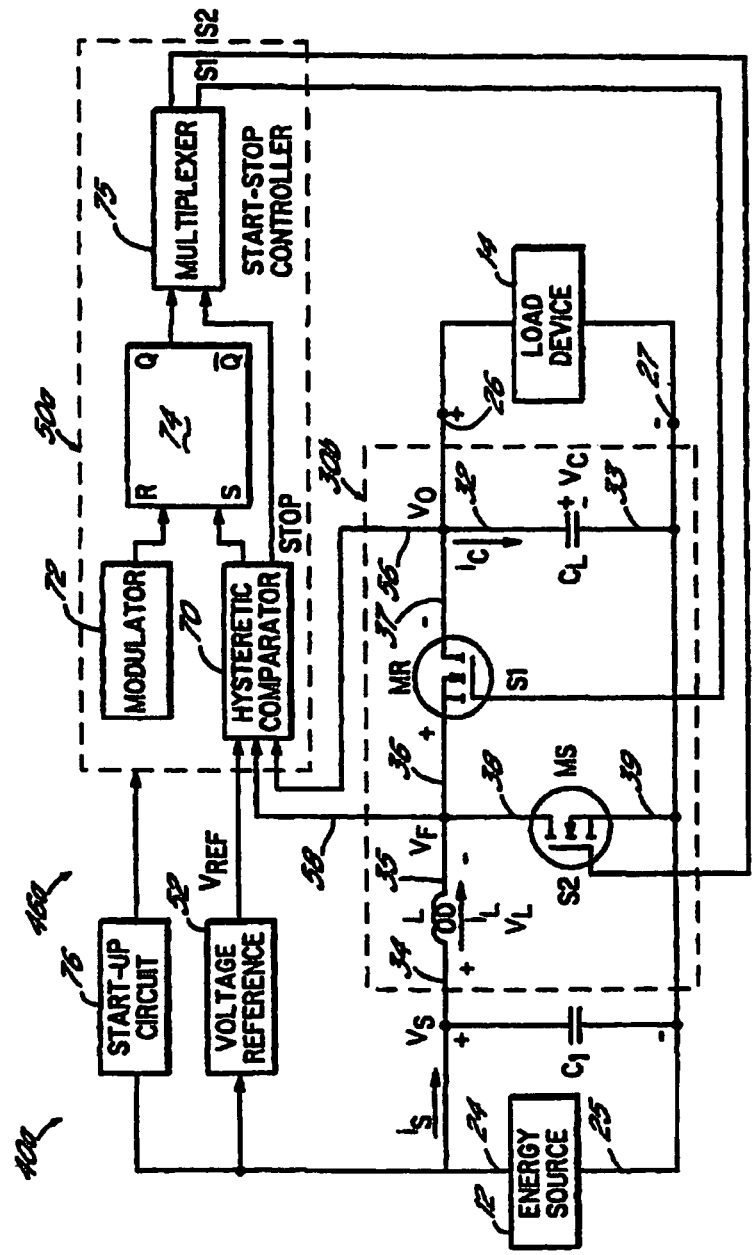
FIG. 4 is one embodiment of a circuit for a start-stop controller for the boost power converter of FIG. 2B in accordance with the invention.

Referring to FIG. 4, one embodiment of a circuit for a start-stop controller 50a for the power output stage 30b of FIG. 2B is illustrated. Generally known power converters, including inductive power converters, continue to oscillate, even when the demand from the load device 14 makes the power converter inefficient. Consequently, the start-stop controller advantageously stops the oscillation of a Pulse Width Modulation (PWM) output when the load capacitor $C_L$ is adequately charged.

Specifically, the boost power output stage 30b is as described above in FIG. 2B, except for the addition of a capacitive element C1 coupled across input terminals 24, 25 which is used to enhance the stability of input voltage $V_S$.

The start-stop controller 50a is responsive to input signals for pulse width modulation (PWM), and oscillated control of the power output stage 30b by selectively generating the control signal S1 to close the rectifying element MR during the discharge state and to open the rectifying element MR during the charge state, and selectively generating the control signal S2 to open the switch MS during the discharge state and to close the switch MS during the charge state. The start-stop controller 50a senses a low demand as indicated by the comparison of the reference voltage $V_{REF}$ and the output voltage $V_O$ to hysteretically stop the oscillated control signal so that the output stage 30b remains in the discharge state. The start-stop controller 50a includes a hysteretic comparator 70 responsive to the reference voltage $V_{REF}$, the output voltage $V_O$ and the feedback voltage VF to generate a duty-cycle signal, and hysteretically responsive to the output voltage $V_O$ and the reference voltage $V_{REF}$ to generate a stop signal. A modulator 72 generates an oscillation signal having the predetermined frequency. An SR flip flop 74 is set by the set duty-cycle signal and reset by the oscillation signal to produce a switching signal which determines the charge state and the discharge state. A multiplexer 75 is responsive to the switching signal to generate the control signals S1 and S2. The multiplexer 75 has a predetermined state switching delay to mitigate cross conduction of the power output stage 30b. The multiplexer 75 is also responsive to the stop signal to stop oscillations until more energy is needed by turning OFF control signal S2 to open switch MS and by turning ON control signal S1 to close rectifying element MR.

In addition, a start-up circuit 76 biases the start-stop controller 50a when the power output stage 30b is discharged, as well as providing initial charge to the load capacitor $C_L$.

Figure 5:
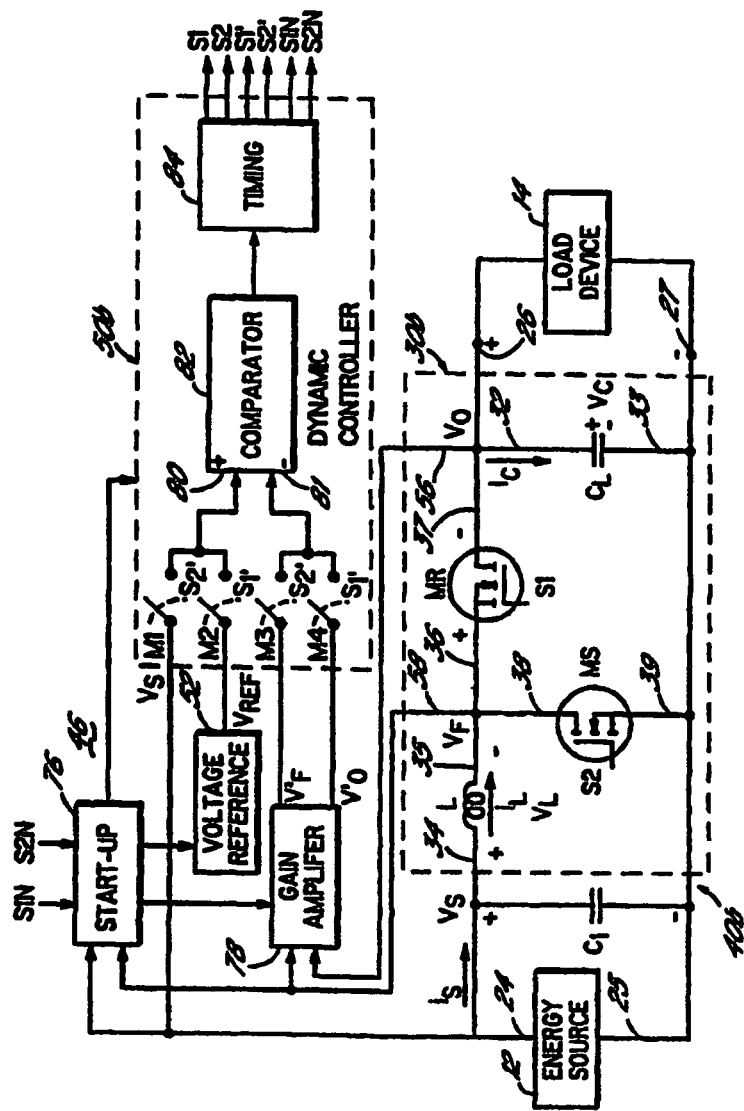
FIG. 5 is an embodiment of a circuit for a voltage-feedback oscillator-less controller for the boost power converter of FIG. 2B in accordance with the invention.

Referring to FIG. 5, an embodiment of a circuit for a voltage-feedback dynamic controller 50b is shown as used for a boost power converter such as shown in FIG. 2B. In particular, the first control loop 56 provides the output voltage $V_O$ and the second control loop 58 provides the feedback voltage VF to the dynamic controller 50b, which provides control of the charge/discharge states of the converter with control signals S1 and S2.

The start-up circuit 76 is powered by the input voltage $V_S$ from the input terminal 24. The start-up circuit 76 responds to the feedback voltage VF such that when the power output stage 30b is fully discharged and thus the controller 50b is not yet operating, the start-up circuit 76 provides a bias to the voltage reference 52, to a gain amplifier 78 and to the dynamic controller 50b.

The gain amplifier 78 receives the output voltage $V_O$ and the feedback voltage VF respectively from the first and second control loops 56, 58, and provides a desired bias and gain to each to produce a filtered and amplified output voltage $V'_O$ and feedback voltage $V'_F$. The desired bias and gain may be selected for appropriate responsiveness and stability of the dynamic controller 50b.

The dynamic controller 50b receives as input signals the input voltage $V_S$, the reference voltage $V_{REF}$ from the voltage reference 52, the filtered feedback voltage $V'_F$, and the filtered output voltage $V'_O$. More particularly, during the discharge state, the dynamic controller 50b couples the reference voltage $V_{REF}$ to a positive comparator input 80 via a switch M2 responsive to a control signal S1'. The dynamic controller 50b couples the filtered output voltage $V'_O$ to a negative comparator input 81 via a switch M4 responsive to the control signal S1'. During the charge state, the dynamic controller 50b couples the input voltage input voltage $V_S$ to the positive comparator input 80 via a switch M1 responsive to a control signal S2'. The dynamic controller 50b further couples the filtered feedback voltage $V'_F$ to the negative comparator input 81 via a switch M3 responsive to the control signal S2'.

The dynamic controller includes a comparator 82 for generating a comparison signal based on the input to the positive and negative comparator inputs 80, 81, as described in FIG. 6 below. The comparison signal is used by a timing circuit 84 to produce the control signals S1, S2, S1', S2', S1N and S2N, as described below in FIG. 14. Control signal S1 is used to control the rectifying element MR, and has sufficient current to control a power MOSFET. Control signal S2 is used to control the switch MS, and has sufficient current to control a power MOSFET. S1' and S2' are unamplified versions of control signals S1, S2, used within the dynamic controller 50b. Control signals S1N and S2N are inverted versions respectively of control signals S1, S2, used for controlling the start-up circuit 76.

Figure 6:
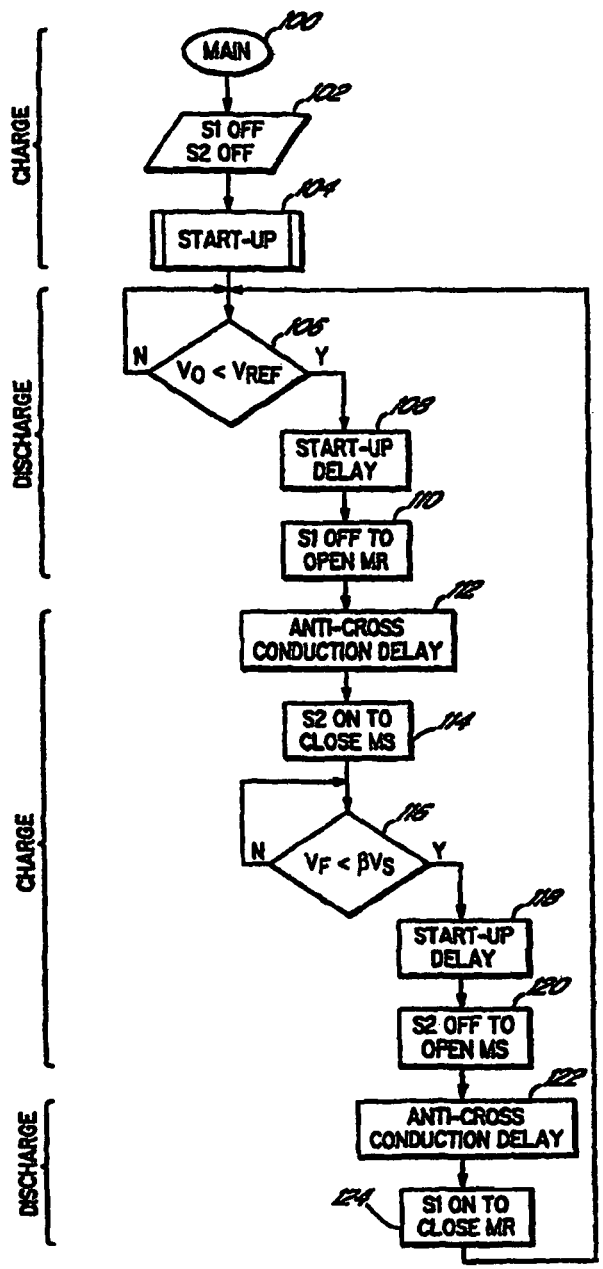
FIG. 6 is a flow diagram for the operation of the voltage-feedback oscillator-less controller of FIG. 5 in accordance with the invention.

Referring to FIG. 6, a flow diagram for an operation 100 of the voltage-feedback dynamic controller 50b of FIG. 5 is shown. The operation 100 begins with the controller not operating, and thus control signals S1 and S2 are OFF (block 102). Thus a start-up operation 104 is performed, as described below in more detail with respect to FIGS. 7-9. Then operation 100 begins dynamic operation, alternating as required between charge and discharge states.

Then, a determination is made as to whether the output voltage $V_O$ is less than the reference voltage $V_{REF}$ (block 106). If not, then the load capacitor $C_L$ is sufficiently charged and operation 100 repeats block 106, remaining in the discharge state.

However, if in block 106 the output voltage $V_O$ is less than the reference voltage $V_{REF}$, then a start-up delay is performed (block 108). Then, control signal S1 is turned OFF, opening rectifying element MR (block 110). A cross conduction delay occurs thereafter with control signal S2 already OFF and switch MS is open (block 112). This prevents inefficient shorting of the power output stage 30b. Then, control signal S2 is turned ON, closing the switch MS, beginning the charge state (block 114).

At block 116, a determination is made as to whether the inductor L is sufficiently energized by determining whether the feedback voltage VF is greater than or equal to a predetermined fraction .beta. of the input voltage $V_S$, where 0<.beta.<1, with block 116 repeating until satisfied.

The fraction .beta. is chosen either analytically or empirically for providing an optimum energy transfer amount. A relatively small fraction .beta. results in a higher operating frequency of switching. Since typical switches dissipate energy mostly during the transition from OFF to ON and from ON to OFF, minimizing switching increases efficiency. However, a relatively high fraction .beta. limits the capacity of the power output stage 30b since the inductor L has a diminishing rate of energy storage as it approaches a fully energized state.

When block 116 is satisfied, then a start-up delay is performed (block 118). Then, the control signal S2 is turned OFF, opening the switch MS (block 120). A cross conduction delay occurs thereafter with control signal S2 already OFF and switch MS now open (block 122). Then control signal S1 is turned ON, closing the rectifying element MR, beginning the discharge state. Operation 100, thus returns to block 106 to repeat the sequence.

Figure 7:
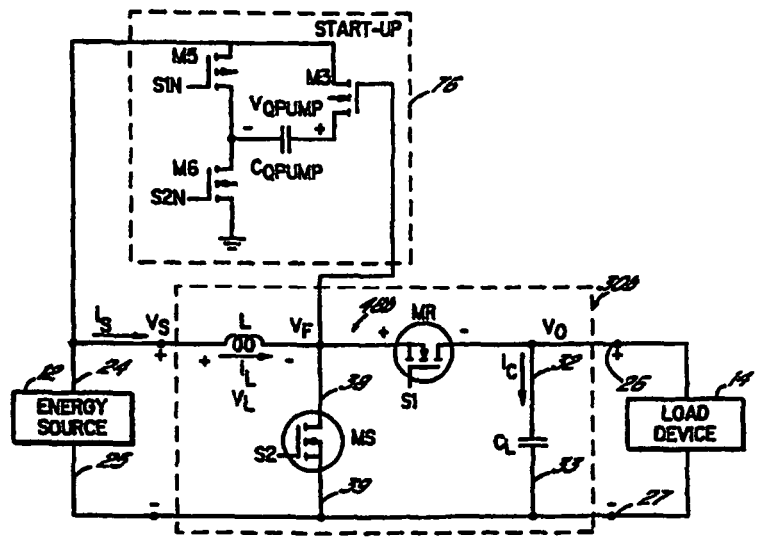
FIG. 7 is an embodiment of a start-up circuit for the boost power converter of FIG. 5 in accordance with the invention.

FIG. 7 is an embodiment of a start-up circuit 76 for the boost power converter of FIG. 5.

Figure 8:
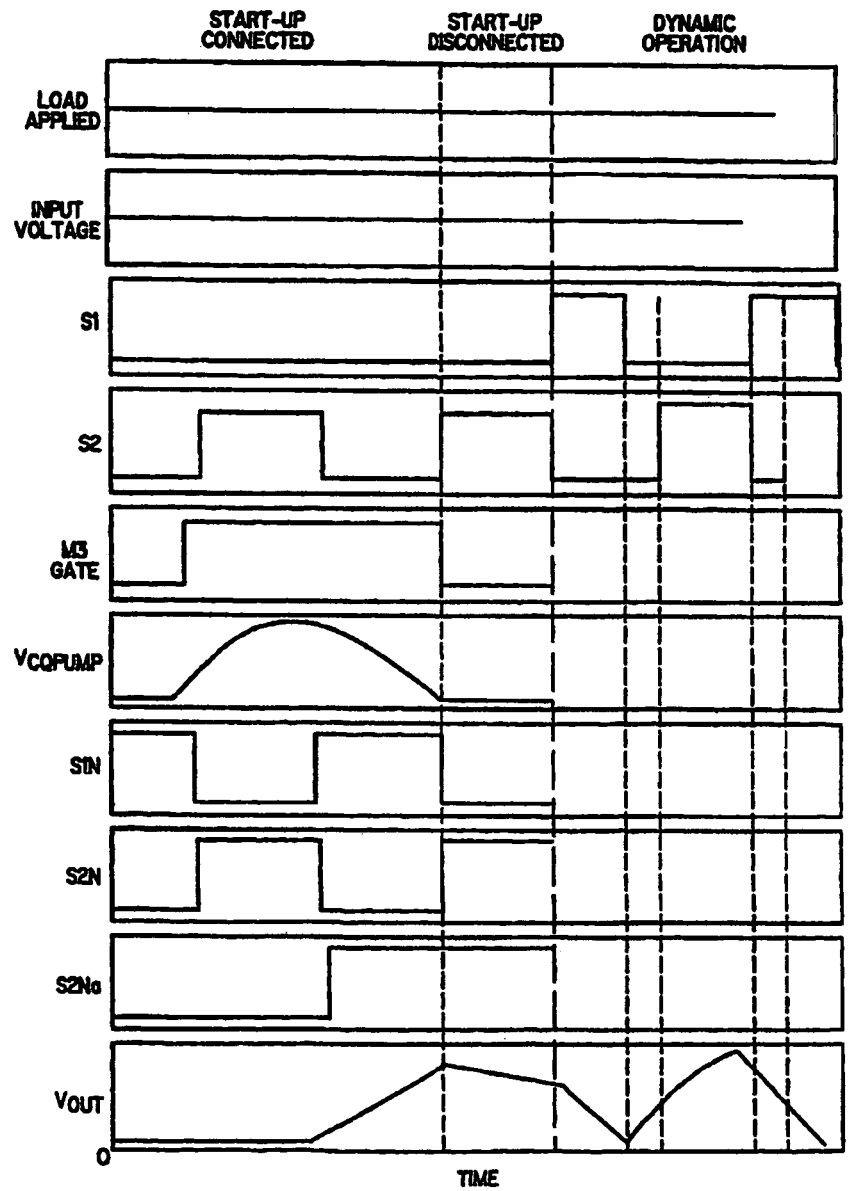
FIG. 8 is a wave diagram for the start-up circuit of FIG. 7.

FIG. 8 is a wave diagram for the start-up circuit 76 of FIG. 7.

Figure 9:
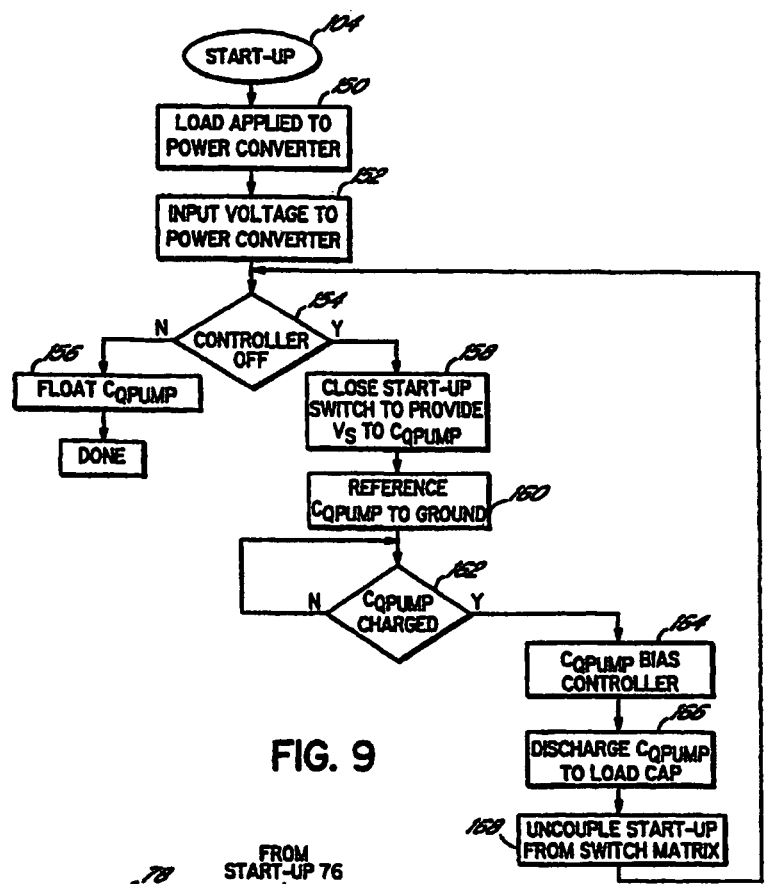
FIG. 9 is a flow diagram for the operation of the start-up circuit of FIG. 7.

Referring to FIG. 9, the operation 104 of the start-up circuit 76 of FIG. 7 is illustrated. The start-up operation 104 begins with an initial condition in block 150 that a load is already applied to the power converter and in block 152 that an input voltage is available to the power converter. Then a determination is made as to whether the power controller is off and not controlling the power output stage (block 154). If the power controller is on (block 154), then a small start-up capacitor $C_{QPUMP}$ is floated (block 156) and the start-up operation 104 is complete.

It should be appreciated that the controller 50b is off with respect to the start-up operation 104 even after the controller begins to operate. That is, control signals to the start-up circuit 76 generally becomes available before the controller actually has developed a sufficient voltage to operate the rectifying element MR and the switch MS.

If in block 154 the controller is off, then a start-up switch is closed to provide input voltage $V_S$ to the start-up capacitor $C_{QPUMP}$ (block 158) and the start-up capacitor $C_{QPUMP}$ is referenced to ground (block 160). When the start-up capacitor $C_{QPUMP}$ is charged (block 162), it is first used to bias the controller (block 164), and then discharged into the load capacitor (block 166) and the start-up circuit including start-up capacitor $C_{QPUMP}$ is uncoupled from the power output stage of the power converter (block 168). Then, the start-up operation 104 returns to block 154 to see if this start-up cycle was sufficient to activate the controller and subsequent start-up operation cycles repeated as necessary.

Figure 10:
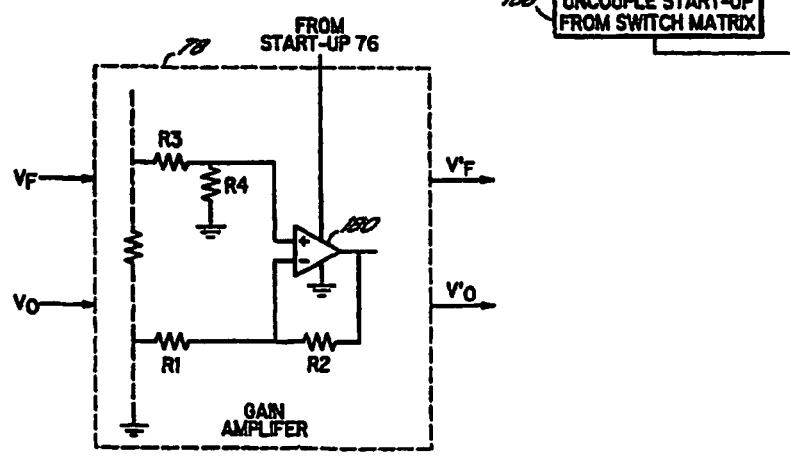
FIG. 10 is an embodiment of a gain amplifier circuit for the boost power converter of FIG. 5 in accordance with the invention.

Referring to FIG. 10, an embodiment of the gain amplifier circuit 78 for the dynamic controller 50b of FIG. 5 is depicted. The gain amplifier circuit 78 accepts as input signals the feedback voltage VF and the output voltage $V_O$. An operational amplifier 180 is biased by the start-up circuit 76. The positive input of the operational amplifier 180 is the input which is coupled through voltage divider R3/R4. The negative input and output of the operational amplifier are coupled for feedback through resistors R1 and R2. The resistors may be integrated (e.g., poly resistors) and of high impedance (e.g., mega-ohm range) for low power consumption.

Figure 11:
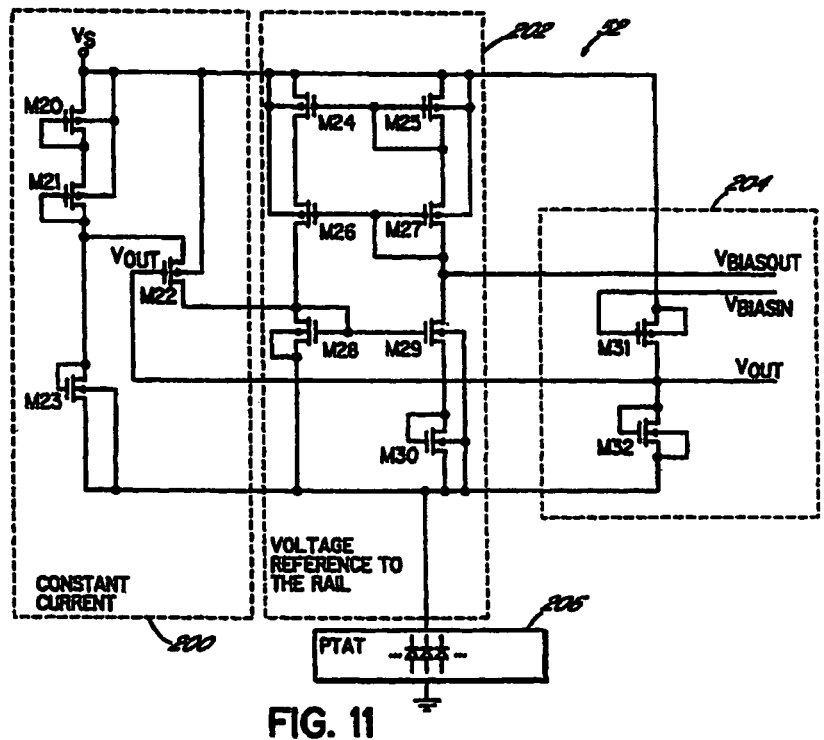
FIG. 11 is an embodiment of a voltage reference circuit for the boost power converter of FIG. 5 in accordance with the invention.

Referring to FIG. 11, one embodiment of a voltage reference circuit 52 is shown for the boost power converter 30b of FIG. 5, capable of sub-one volt input voltage $V_S$ operation in accordance with an aspect of the invention. A constant current circuit 200 powers a voltage reference-to-rail circuit 202, isolating the voltage reference-to-rail circuit 202 from changes in the input voltage $V_S$. An output buffer 204 amplifies an unamplified reference voltage from the voltage reference-to-rail circuit 202. In order to temperature compensate the voltage reference-to-rail circuit 202, a parallel diode array Proportional to the Absolute Temperature (PTAT) circuit 206 biases the circuit 202.

Figure 12:
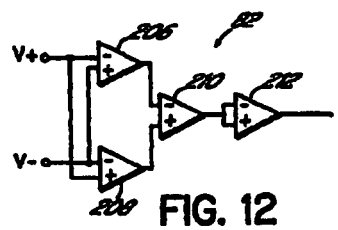
FIG. 12 is top-level block diagram of an embodiment of the comparator for the boost power converter of FIG. 5 in accordance with the invention.
Figure 13:
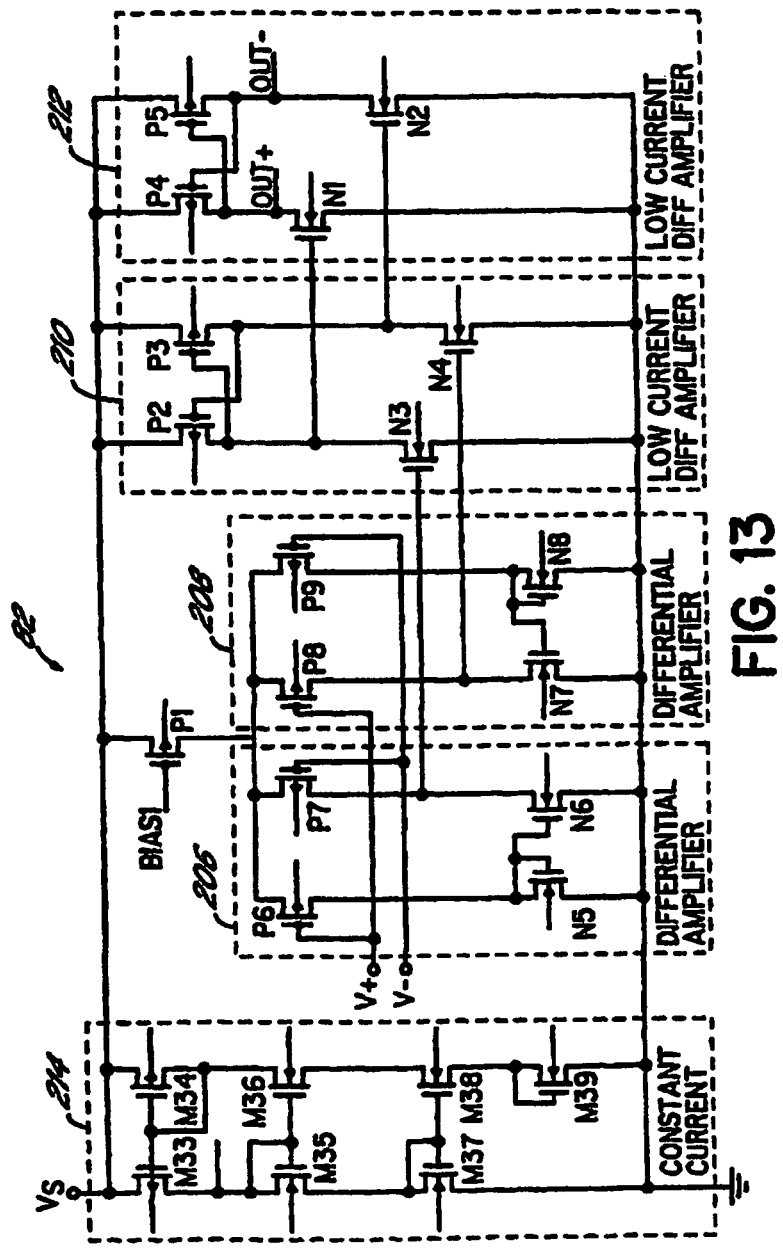
FIG. 13 is an embodiment of a circuit for the comparator of FIG. 12 in accordance with the invention.

Referring to FIGS. 12 and 13, one embodiment of a comparator 82 is depicted for the boost power converter 30b of FIG. 5. Differential amplifiers 206-210 are advantageously used since they are effective in rejecting common-mode signals. For example, common-mode signals may be induced noise on the inputs. Integrated circuit differential amplifiers have relatively low output gain. This has implications in two ways: non-linearity in an input transistor and in providing necessary current gain for the timing circuit 84.

For providing some cancellation of input non-linearity, a three differential amplifier combination is depicted, wherein the first differential amplifier 206 receives a V+ input at its negative input and V- at its positive input. A second differential amplifier 208 receives V- at its negative terminal and V+ at its positive terminal. The output of the first differential amplifier 206 is coupled to a negative terminal of a third differential amplifier 210 and the output of the second differential amplifier 208 is coupled to a positive input of the third differential amplifier 210. A fourth differential amplifier 212 is configured as a voltage follower buffer to increase the current of a comparator switching signal (Out+, Out−) from the third differential amplifier 210.

Figure 14:
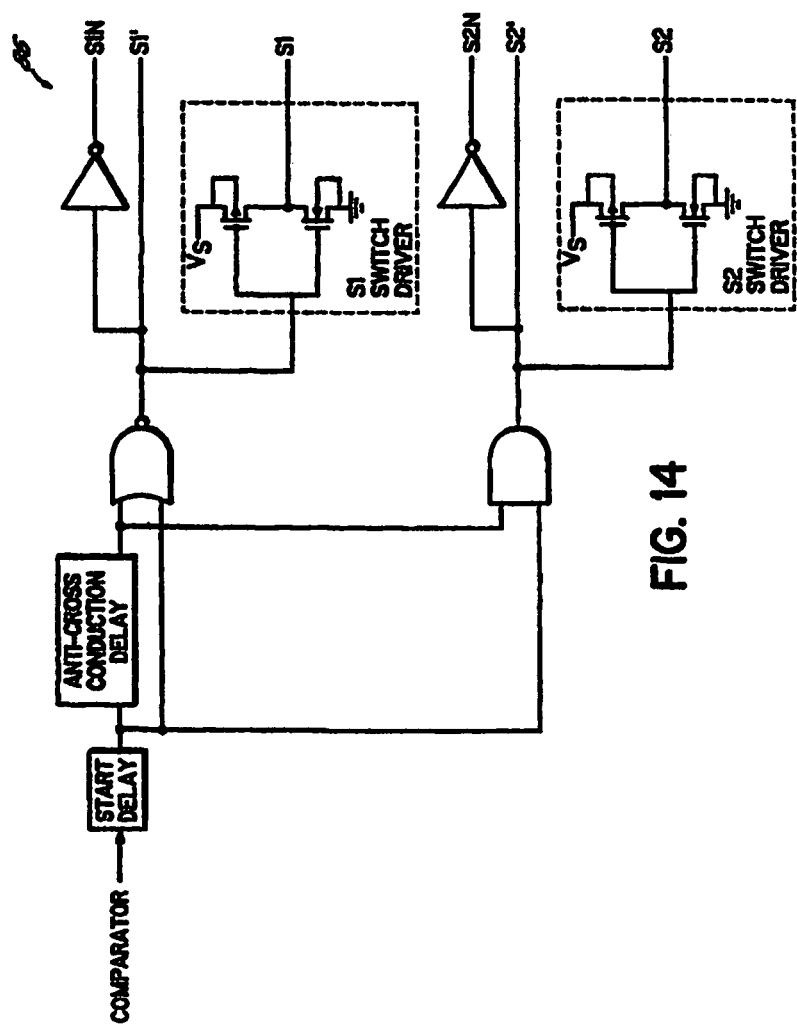
FIG. 14 is an embodiment of a circuit for the timing circuit of FIG. 5 in accordance with the invention.

Referring to FIG. 14, one embodiment of the timing circuit 84 is depicted for the power controller 46A of FIG. 5.

Figure 15:
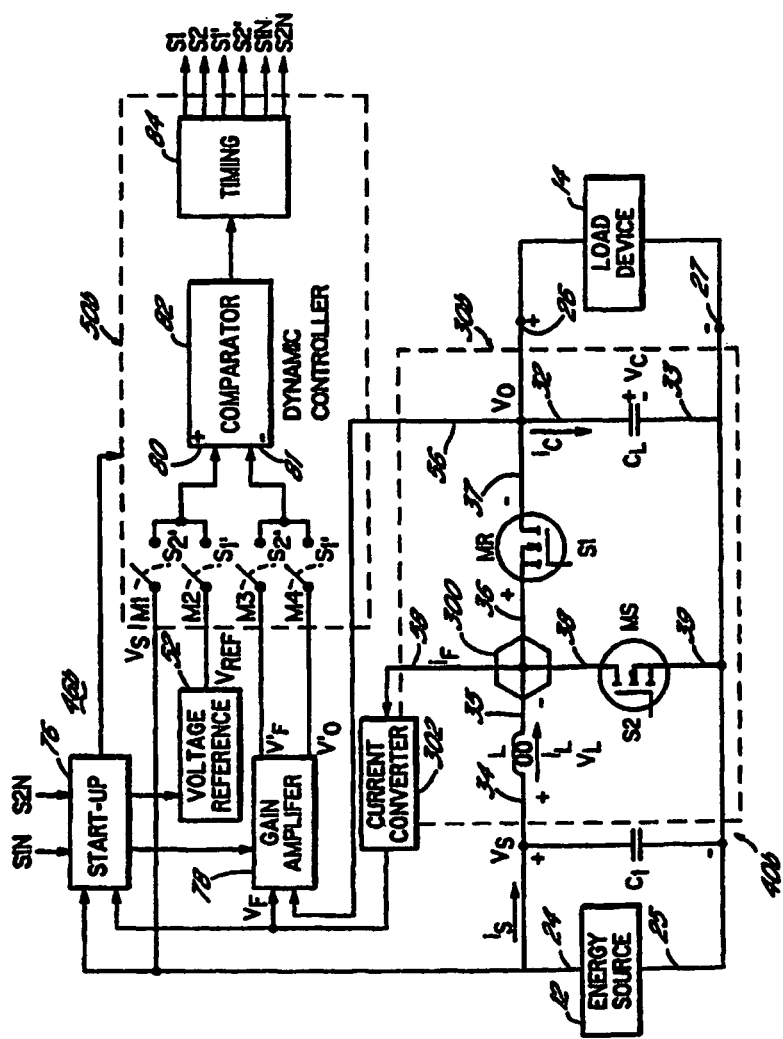
FIG. 15 is an embodiment of a circuit for a current-feedback oscillator-less controller for the boost power converter of FIG. 2B.

Referring to FIG. 15, an embodiment of a circuit for a current-feedback oscillator-less dynamic controller 50b is shown for the boost power output stage 30b of FIG. 2B. Specifically, a feedback current $i_F$ sensed by a current probe 300 at feedback voltage VF node. The feedback current $i_F$ is related to, or the same as, the inductor current $i_L$. The sensed feedback current $i_F$ is converted into a feedback voltage VF by a current converter 302 for an input to the gain amplifier 78 as described above.

While the present invention has been illustrated by description of several embodiments and while the illustrative embodiments have been described in considerable detail, it is not the intention of applicants to restrict or in any way limit the scope of the appended claims to such detail. Additional advantages and modifications readily appear to those skilled in the art.

For example, for clarity, the switch MS and rectifying element MR are normally open, closed by a positive ON signal. It would be apparent to those skilled in the art having the benefit of the instant disclosure to use normally closed switches and/or switches closed by a negative ON signal.

As another example, a power converter consistent with the invention may be incorporated in a wide range of products. For example, a power converter 31 taking advantage of the small size and low power consumption (i.e., efficiency) properties described above may advantageously be incorporated into a battery package to enhance battery service life and energy and amplitude on demand. Incorporating the power converter would be accomplished in manner similar to that disclosed in the following co-pending and commonly owned applications all filed on Apr. 2, 1998: U.S. Pat. No. 6,198,250, entitled PRIMARY BATTERY HAVING A BUILT-IN CONTROLLER TO EXTEND BATTERY RUN TIME, naming Vladimir Gartstein and Dragan D. Nebrigic; U.S. Pat. No. 6,118,248, entitled BATTERY HAVING A BUILT-IN CONTROLLER TO EXTEND BATTERY SERVICE RUN TIME naming Vladimir Gartstein and Dragan D. Nebrigic; U.S. Pat. No. 6,163,131, entitled BATTERY HAVING A BUILT-IN CONTROLLER, naming Vladimir Gartstein and Dragan D. Nebrigic; and U.S. Pat. No. 6,835,491, entitled BATTERY HAVING A BUILT-IN CONTROLLER, naming Dragan D. Nebrigic and Vladimir Gartstein. All of the aforementioned applications are hereby incorporated by reference in their entirety, with essential portions concerning features claimed in the present application being reproduced below.

Battery Having a Built in Controller

The term "primary" is used in this application and refer to a battery or an electrochemical cell that is intended to be discarded after its usable electrical storage capacity has been depleted (i.e., it is not intended to be recharged or otherwise re-used). The terms "rechargeable" and "secondary" are used interchangeably in this application and refer to a battery or an electrochemical cell that is intended to be recharged at least once after its usable electrical storage capacity has been depleted (i.e., it is intended to be reused at least once). The term "consumer" in this application refers to a battery that is intended to be used in an electronic or electric device purchased or used by a consumer. The term "single-cell" refers to a battery having a single electrochemical cell packaged individually such as a standard AA, AAA, C or D type battery, or a single-cell in a multiple-cell battery (e.g., such as a standard 9 volt battery or a battery for a cellular telephone or laptop computer). The term "battery," as used in this application, refers to a container having terminals and a single electrochemical cell, or a housing that has terminals and at least substantially contains two or more electrochemical cells (e.g., a standard 9 volt battery or a battery for a cellular telephone or laptop computer), which can also be referred to as a "battery pack". The electrochemical cells need not be completely enclosed by the housing if each cell has its own individual container. A portable telephone battery, for example, may contain two or more electrochemical cells that each have their own individual containers and are packaged together in a shrink-wrap plastic material that holds the individual containers together but may not completely enclose the individual containers of the cells. As used in this application, the term "hybrid battery" includes a multiple-cell battery that contains two or more electrochemical cells of which at least two of those cells have different electrochemical elements such as a different electrode, a different pair of electrodes or a different electrolyte.

The term "controller" as used in this application refers to a circuit that accepts at least one input signal and provides at least one output signal that is a function of the input signal. The terms "DC/DC converter" and "converter," are used interchangeably in this application and refer to a switching-type, i.e., a chopper-controlled DC/DC converter that converts an input DC voltage to a required DC output voltage. DC/DC converters are power electronic circuits that often provide a regulated output. The converter may provide a stepped-up voltage level, a stepped-down voltage level or a regulated voltage of about the same level. Many different types of DC/DC converters are well known in the art. The present invention contemplates the use of known converters or linear regulators as possible, though less advantageous, substitutions for the preferred converters described in this application that are capable of operating at voltage levels below where typical electronic devices can operate.

The "cut-off voltage" of an electronic device is the voltage below which an electric or electronic device connected to a battery cannot operate. Thus, the "cut-off voltage" is device dependent, i.e., the level depends on the minimum operating voltage of the device (the functional end-point) or the frequency of operation (e.g., must be able to charge a capacitor within a given time period). Most electronic devices have a cut-off voltage in the range from about 1 volt to about 1.2 volts, with some of the electronic devices having a cut-off voltage as low as about 0.9 volts, Electric devices that have mechanical moving parts, such as electric clocks, motors and electromechanical relays also have a cut-off voltage that is necessary to provide enough current to create an electromagnetic field strong enough to move the mechanical parts. Other electric devices, such as a flashlight, generally do not have a device cut-off voltage, but as the voltage of the battery powering it decreases, the output power (e.g., bulb intensity) will also decrease.

If a single electrochemical cell is powering a device having a cut-off voltage, the electrochemical cell is "subject to" the cut-off voltage of the device in that the battery must provide an output voltage that is greater than or equal to the cut-off voltage of the device or else the device will shut-off. If two or more electrochemical cells arranged in series, however, are powering the device, i.e., electrically connected between the positive input terminal and the negative input terminal, each electrochemical cell is "subject to" a portion of the cut-off voltage of the device. For example, if two electrochemical cells are connected in series and are powering a device, each cell is "subject to" one-half of the cut-off voltage of the device. If three electrochemical cells are connected in series and are used to power the device, however, each electrochemical cell is only "subject to" one-third of the cut-off voltage of the device. Thus, if a number of cells "n" are connected in series and are powering the device, each cell is "subject to" a portion of the cut-off voltage of the device that may be defined as the cut-off voltage divided by n, where n is an integer. If two or more electrochemical cells are connected in parallel to power the electronic device, however, each cell is still "subject to" the full cut-off voltage of the device. Additionally, in this application, if two or more electrochemical cells are connected in series, and that series connection is connected in parallel with one or more other electrochemical cells, each of the series-connected cells are "subject to" the same portion of the cut-off voltage as if electrochemical cells connected in series were only electrochemical cells powering the device.

One aspect of the present invention is to extend the "service run time" of a battery. For a primary electrochemical cell, the "battery service run time" and the "battery run time" are interchangeable and are defined as the time of the discharge cycle until the output voltage of the battery drops below the minimum operating voltage of the device that the battery is powering, i.e., the cut-off voltage of that device. The term "cell run time," which is also referred to as the "run time of the electrochemical cell," is the time required for the cell to completely exhaust its electrochemical energy under load conditions. Thus, while the "cell run time" is dependent upon the electrochemical cell itself, i.e., exhausting all the electrochemical energy of the cell, the "battery run time" is dependent upon the device in which it is used. An electronic device having a cut-off voltage of about 1 volt, for example, will shut down when the battery output voltage drops below 1 volt even though the electrochemical cell may still have at least 50% of its energy storage capacity remaining. In this example, the "battery run time" has elapsed because it can no longer provide enough energy to drive the electronic device and the battery is generally thrown away. The "cell run time," however, has not elapsed because the cell has electrochemical energy remaining.

A rechargeable battery, however, has multiple charge/discharge cycles. In a rechargeable battery, the "cycle life" is defined as the number of charge/discharge cycles that can be achieved. The "battery run time" of a rechargeable battery refers to the time of a single discharge cycle until the output voltage of the rechargeable battery drops below the cut-off voltage of the device that the battery is powering or the discharge is stopped to provide a greater cycle life of the battery. The "battery service run time" of a rechargeable battery, however, refers to the total number of charge/discharge cycles in which each discharge cycle has an optimum run time. The "cell run time" of a rechargeable electrochemical cell is the time required for the cell to achieve optimal discharge depth under load conditions during a single discharge cycle of that cell. As discussed above, the "cycle life" of a rechargeable battery is a function of the depth of discharge that the rechargeable cell undergoes. As the depth of discharge increases, the battery run time also increases, but the cycle life and the battery service run time decrease. Conversely, as the depth of discharge decreases, the battery run time also decreases, but the cycle life and the battery service run time increase. From a device usage point of view, however, shorter battery run time is inconvenient. Thus, for each particular electrochemistry and design of a rechargeable battery a ratio between the discharge depth and the cycle life can be optimized to allow for a greater battery service run time. One possible way to optimize the service run time of a rechargeable battery, for example, is to compare the cumulative energy delivered, which may be defined as the product of the cycle life (i.e., number of cycles) achieved at a particular discharge depth and the amount of energy recovered in each of those cycles.

In this application, the terms "useful life of the electrochemical cell" or the "cell useful life" are also used regardless of whether the electrochemical cell is a primary or rechargeable cell, and correspond to the battery run time in that the "cell useful life" is the time until the cell is no longer useful in a particular discharge cycle because the electrochemical cell can no longer provide enough voltage to drive the device that it is powering. If the "cell run time" in a single-cell battery is extended or reduced, then the "cell useful life" and the "battery run time" are also necessarily extended or reduced, respectively. Additionally, the terms "battery run time" of a single-cell battery and "cell useful life" are interchangeable in that if either the "battery run time" of the single-cell battery or the "cell useful life" are extended or reduced, then the other will also be respectively extended or reduced. In contrast, however, the term "cell useful life" of a particular electrochemical cell in a multiple-cell battery is not necessarily interchangeable with the term "battery run time" for that multiple-cell battery because the particular electrochemical cell may still have a remaining useful life even after the battery run time of the multiple-cell battery has elapsed. Likewise, if the "cell run time" of a particular electrochemical cell in a multiple-cell battery is extended or reduced, the "battery run time" is not necessarily extended or reduced because the "battery run time" may depend upon the cell voltage of one or more other cells in the battery.

The "optimal depth of discharge" or "optimal discharge depth" of a rechargeable electrochemical cell as used in this application refers to the cell voltage that maximizes the number of charge/discharge cycles and optimizes the run time for each discharge cycle of that cell. The service run time of a rechargeable electrochemical cell may be drastically shortened if the cell is discharged below the "optimal discharge depth" for that cell (e.g., about 1.6 volts for a SLA cell). A deep discharge of a lithium ion cell, for example, may damage the cell and decrease the number of and the efficiency of future charge cycles of that cell. A nickel cadmium ("NiCd") electrochemical cell, however, is preferably more deeply discharged in order to prevent "memory" effects from shortening the life of the cell by decreasing the run time of that cell in future discharge cycles.

The terms "electrically connected" and "electrical connection" refer to connections that allow for continuous current flow. The terms "electronically connected" and "electronic connection" refer to connections in which an electronic device such as a transistor or a diode are included in the current path. "Electronic connections" are considered in this application to be a subset of "electrical connections" such that while every "electronic connection" is considered to be an "electrical connection," not every "electrical connection" is considered to be an "electronic connection."

A battery of the present invention includes one or more controllers that optimize at least one aspect of the operation or safety of that battery. In one embodiment of the present invention, for example, a controller may perform one or more of the following functions: (1) discharge control, (2) charge control, (3) emergency disconnect control, (4) valve control, (5) monitor the state of charge of one or more electrochemical cells, and/or (6) identify cell electrical and electrochemical characteristics. Electrochemical cell(s) may be packaged in either single-cell or multiple-cell batteries. Multiple-cell batteries may include two or more of the same type of electrochemical cell, or include two or more different types of electrochemical cells in a hybrid battery. The multiple-cell battery of the present invention may contain electrochemical cells electrically arranged in series and/or in parallel. The controller(s) of a single-cell battery may be electrically connected in series and/or parallel with the electrochemical cell(s) inside a container of a cell, and packaged inside a housing that at least partially contains the container of the cell, or attached to the container, the housing, or to a label or any other structure affixed to the container or housing. The controller(s) of a multiple-cell battery may be packaged along with one or more of the individual cells as described with respect to a single-cell battery, and/or may be packaged along with a combination of multiple cells such that the controller is connected in series or in parallel with the combination of electrochemical cells.

The controller of a battery of the present invention may perform one or more of the functions listed above, and may alternatively perform other functions in addition to the functions listed above. The controller, for example, may only perform two or three of the functions listed above such as a controlling the charging of a rechargeable battery containing at least one metal-air cell and controlling one or more microvalves to control the reaction rate of the metal-air cell(s). A controller of a battery of the present invention may contain one circuit that performs each of the desired functions, or may contain individual sub-controllers that each perform one or more of the desired functions. In addition, the sub-controllers may share circuitry such as sensing circuitry that may provide control signals to the individual sub-controllers.

Figures 16, 16A:
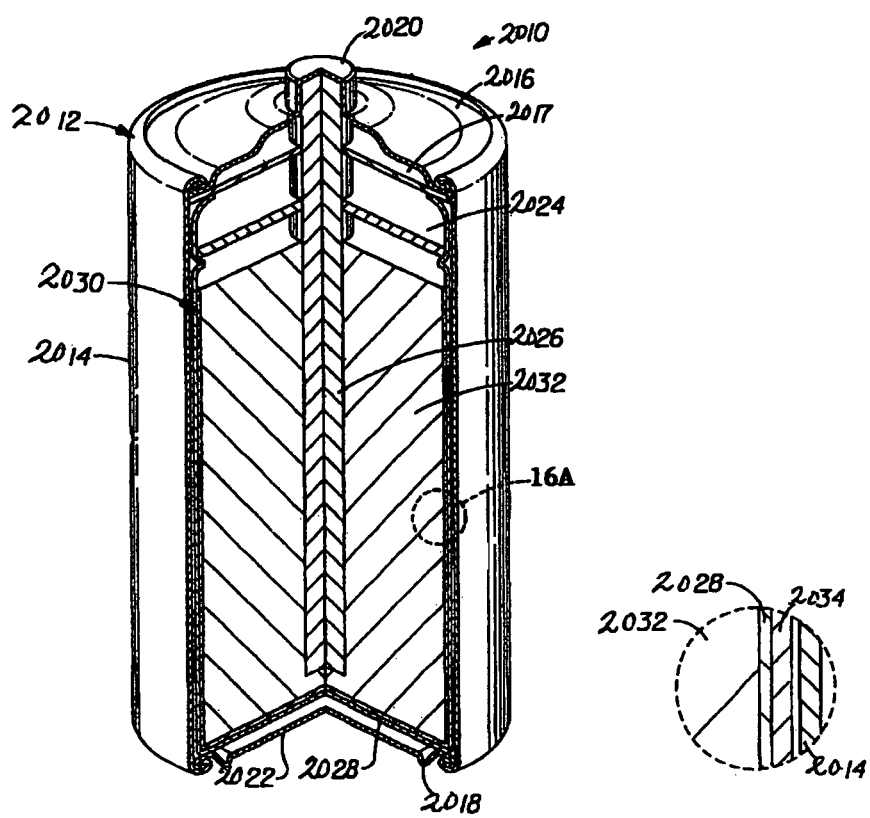
FIG. 16 is a broken-away perspective view of a typical cylindrical battery structure and FIG. 16A is an enlarged view of a portion of the cylindrical batter structure of FIG. 16.
Figure 17:
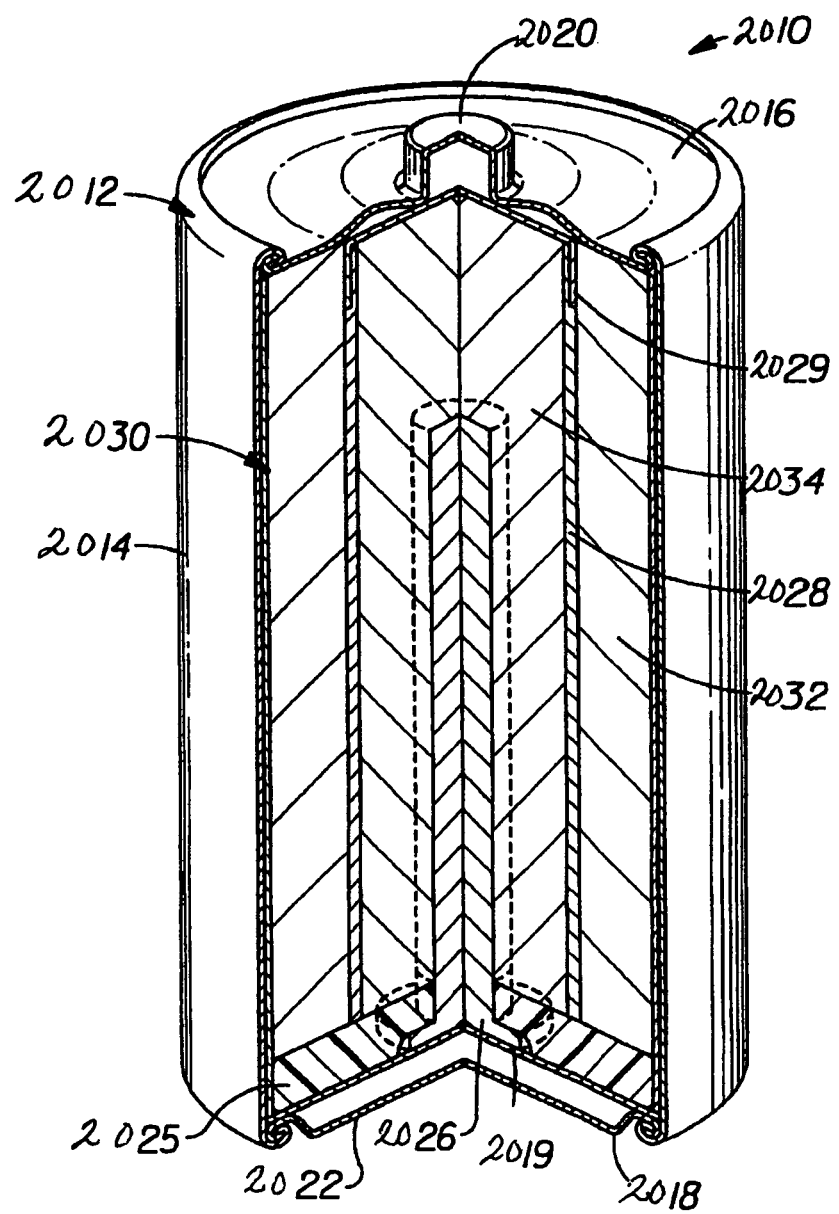
FIG. 17 is a broken-away perspective view of another typical cylindrical battery structure.

FIGS. 16-17 show typical cylindrical battery 2010 structures that are simplified for the purpose of discussion. Each cylindrical battery 2010 structure has the same basic structural elements arranged in different configurations. In each case, the structure includes a container having a jacket or side wall 2014, a top cap 2016 including, a positive terminal 20, and a bottom cap 2018 including a negative terminal 2022. The container 2012 encloses a single electrochemical cell 2030. FIG. 16A shows a configuration that may be used for a cylindrical, single zinc-carbon electrochemical cell 2030 battery 2010. In this configuration, the entire top cap 2016 is conductive and forms the positive terminal 2020 of the battery 2010. The insulating washer or seal 2024 insulates the conductive top cap 2016 from the electrochemical cell 2030. The electrode or current collector 2026 electrically connects the external positive terminal 2020 of the battery 2010 and the cathode (positive electrode) 2032 of the electrochemical cell 2030. The bottom cap 2018 is also entirely conductive and forms the external negative terminal 2022 of the battery 2010. The bottom cap is electrically connected to the anode (negative electrode) 2034 of the electrochemical cell 2030. Separator 2028 is disposed between the anode and cathode and provides the means for ion conduction through the electrolyte. A zinc-carbon battery, for example, is typically packaged in this type of arrangement.

FIG. 17 shows an alternative battery design in which an insulating washer or seal 2024 is shown insulating the bottom cap 2018 from the electrochemical cell 2030. In this case, the entire top cap 2016 is conductive and forms the positive terminal 2020 of the battery. The top cap 2016 is electrically connected to the cathode 2032 of the electrochemical cell 2030. The bottom cap 2018, which is also conductive, forms the negative terminal 2022 of the battery. The bottom cap 2018 is electrically connected to the anode 2034 of the battery cell 2030 via the current collector 2026. Separator 2028 is disposed between the anode and cathode and provides the means for ion conduction through the electrolyte. Primary and rechargeable alkaline (zinc/manganese dioxide) batteries, for example, are typically packaged in this type of arrangement.

Figure 18:
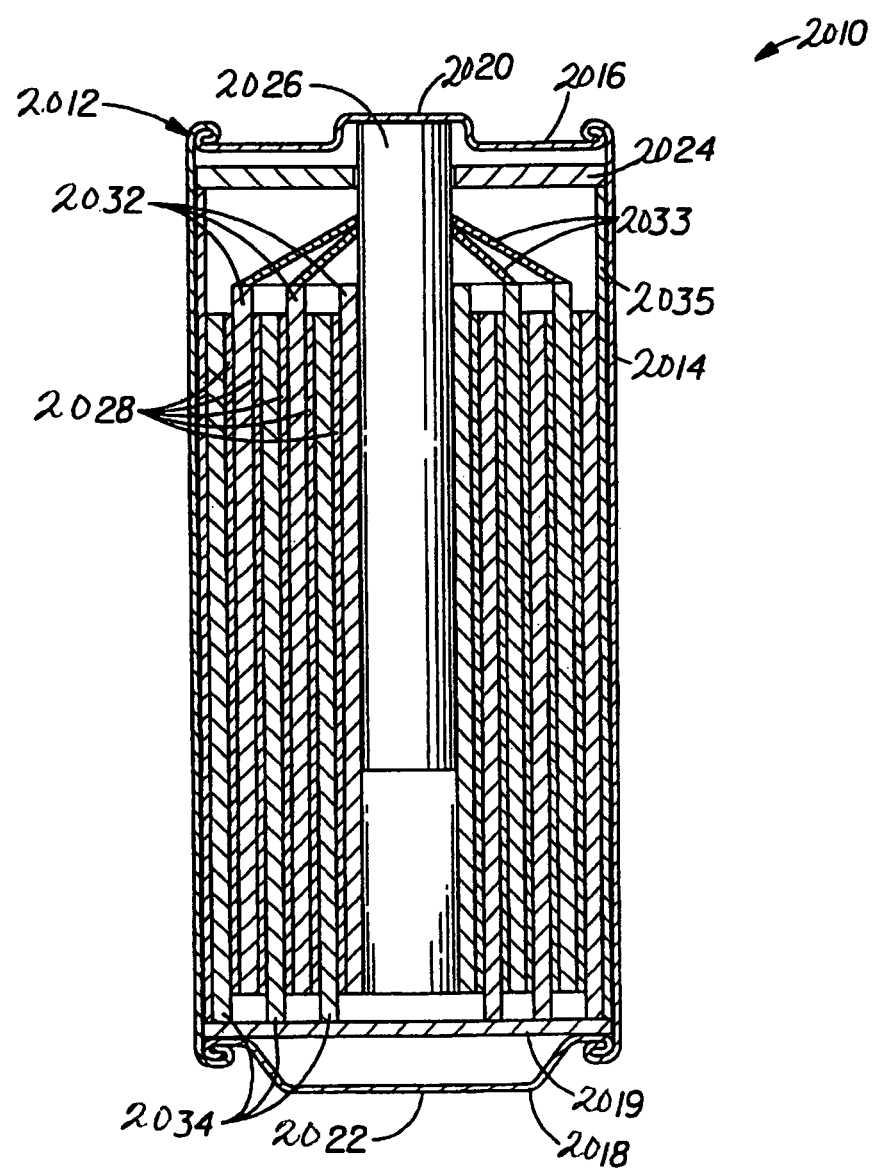
FIG. 18 is a cross-sectional view of yet another typical cylindrical battery structure.

FIG. 18 shows another alternative battery design in which the electrochemical cell 2030 is formed in a "spirally wound jelly roll" structure. In this design, four layers are disposed adjacent each other in a "laminate-type" structure. This "laminate-type" structure may, for example, contain the following order of layers: a cathode layer 2032, a first separator layer 2028, an anode layer 2034 and a second separator layer 2028. Alternatively, the second separator layer 2028 that is not disposed between the cathode 2032 and the anode 2034 layers may be replaced by an insulating layer. This "laminate-type" structure is then rolled into a cylindrical spirally wound jelly roll configuration and placed in the container 2012 of the battery 2010. An insulating washer or seal 2024 is shown insulating the top cap 2016 from the electrochemical cell 2030. In this case, the entire top cap 2016 is conductive and forms the positive terminal 2020 of the battery 2010. The top cap 2016 is electrically connected to the cathode layer 2032 of the electrochemical cell 2030 via current collector 2026. The bottom cap 2018, which is also conductive, forms the negative terminal 2022 of the battery. The bottom cap 2018 is electrically connected to the anode 2034 of the battery cell 2030 via conductive bottom plate 2019. Separator layers 2028 are disposed between the cathode layer 2032 and the anode layer 2034 and provide the means for ion conduction through the electrolyte. The side wall 2014 is shown connected to both the top cap 2016 and the bottom cap 2018. In this case, the side wall 2014 is preferably formed of a non-conductive material such as a polymer. The side wall, however, may also be made of a conductive material such as a metal if the side wall 2014 is insulated from at least the positive terminal 2020 and/or the negative terminal 2022 so that it does not create a short-circuit between the two terminals. Primary and rechargeable lithium batteries such as a primary lithium manganese dioxide (MnO$_2$) battery and rechargeable lithium ion and nickel cadmium (NiCd) batteries, for example, are often packaged in this type of arrangement.

Each of these cells may also include various forms of safety vents, operating vents for electrochemical cells that need air exchange for operation, capacity indicators, labels, etc., which are well known in the art. In addition, the cells may be constructed in other structures known in the art such as button cells, coin cells, prismatic cells, flat-plate or bipolar-plate cells, etc.

For the purpose of one embodiment of the present invention, the battery "container" 2012 houses a single electrochemical cell 2030. The container 2012 includes all the elements necessary to insulate and protect the two electrodes 2032 and 2034, separator and the electrolyte of the electrochemical cell 2030 from the environment and from any other electrochemical cells in a multiple-cell battery and to provide electrical energy from the electrochemical cell 2030 outside of the container. Thus, the container 2012 in FIGS. 16 and 17 includes a side wall 2014, top 2016 and bottom 2018 caps, and positive 2020 and negative 2022 terminals that provide for electrical connection of the cell 2030. In a multiple-cell battery, the container may be an individual structure that contains a single electrochemical cell 2030, and this container 2012 may be one of multiple individual containers within the multiple-cell battery. Alternatively, the container 2012 may be formed by a portion of the housing of a multiple-cell battery if the housing completely isolates the electrodes and the electrolyte of one electrochemical cell from the environment and each other cell in the battery. The container 2012 may be made of a conducting material, such as metal, or an insulating material, such as a plastic or a polymer.

Figure 21:
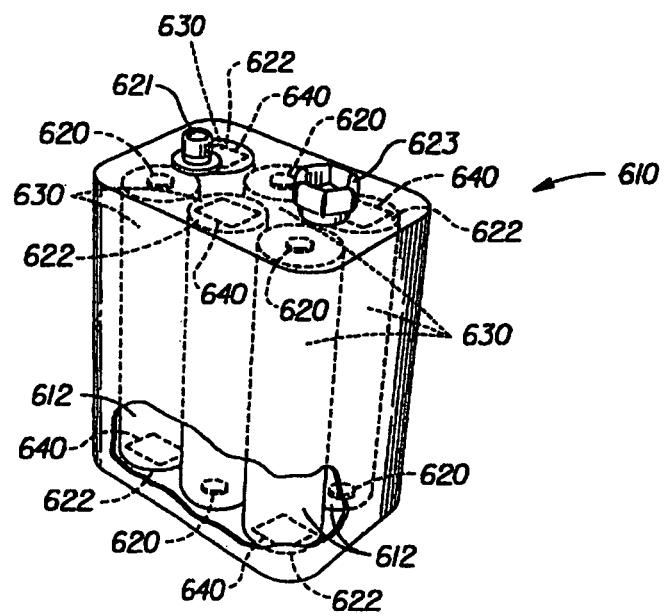
FIG. 21 is a perspective view, partially broken-away, of a preferred embodiment of a battery of the present invention.

The container 2012, however, is to be distinguished from a multiple-cell battery housing that contains separated individually isolated cells each containing its own electrodes and electrolytes. For example, a standard alkaline 9 volt battery housing encloses six individual alkaline cells, each having their own container 612, as shown in FIG. 21. In some lithium 9 volt batteries, however, the housing of the multiple-cell battery is formed such that it has individual chambers that isolate the electrodes and the electrolyte of the electrochemical cells, and thus the housing comprises both the individual containers 2012 for each cell and the housing for the entire battery.

Figure 20A:
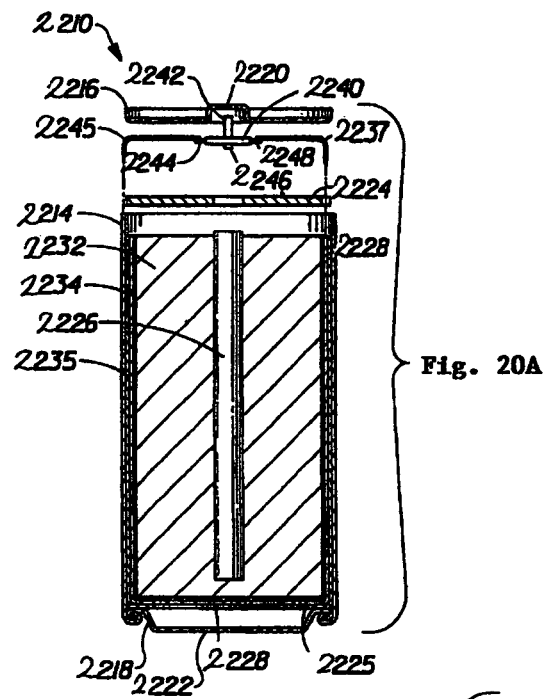
FIG. 20A is a partially exploded, cross-sectional view of a preferred embodiment of a battery of the present invention.
Figure 20B:
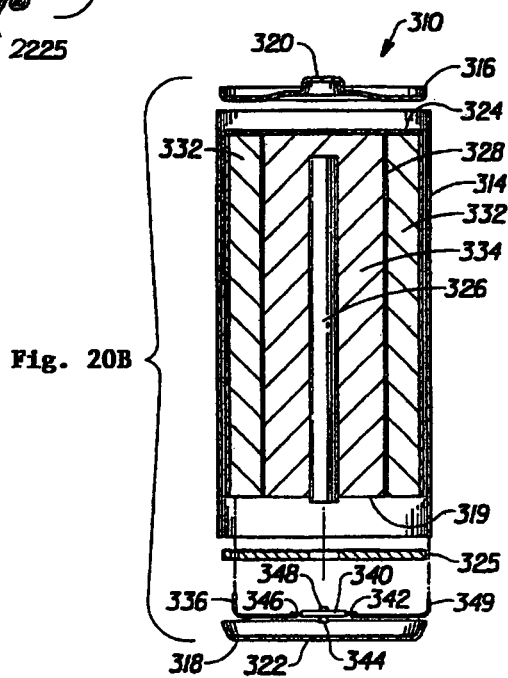
FIG. 20B is a partially exploded, cross-sectional view of another preferred embodiment of a battery of the present invention.
Figure 20C:
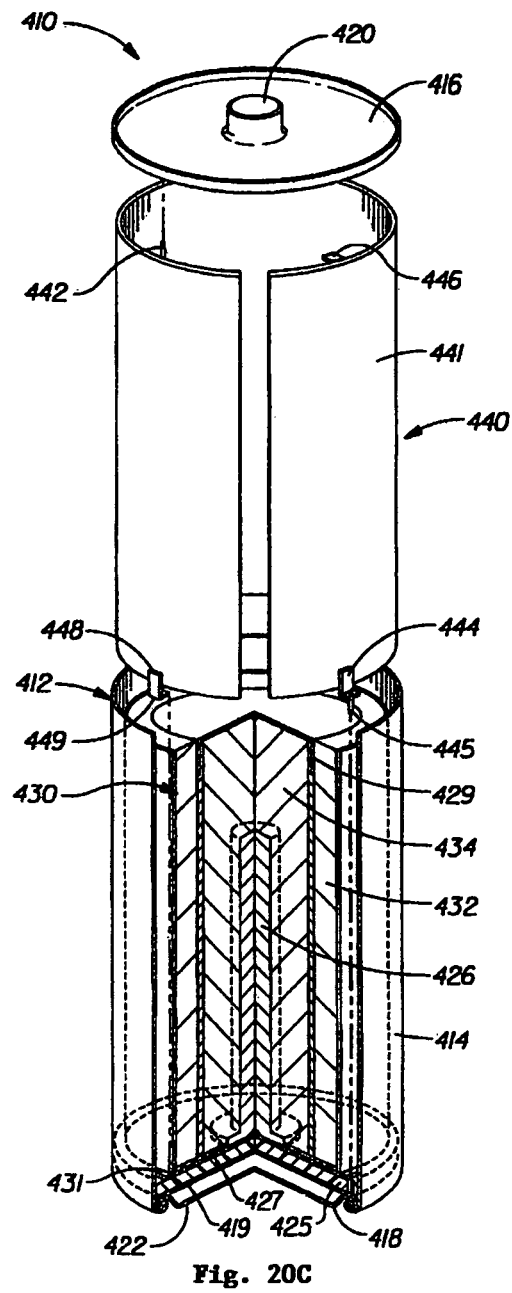
FIG. 20C is a partially exploded, broken-away perspective view of yet another preferred embodiment of a battery of the present invention.

FIGS. 20A, 20B and 20C show partially exploded views of three embodiments of the present invention for single-cell cylindrical primary batteries. In FIG. 20A, the controller 2240 is placed between the top cap 2216 and the insulating washer 2224 of the battery 2210. The positive output 2242 of the controller 2240 is electrically connected to the positive terminal 2240 of the battery 2210, which is directly adjacent to the controller 2240, and the negative output 2244 of the controller 2240 is electrically connected to the negative terminal 2222 of the battery 2210. In this example, the negative output 2244 of the controller 2240 is connected to the negative terminal 2222 of the battery 2210 via conductive strip 2245 and conductive side wall 2214, which is in electrical contact with negative terminal 2222 of the conductive bottom cap 2218 of the battery 2210. In this case, the conductive side wall must be electrically insulated from the top cap 2216. The positive input 2246 of the controller 2240 is electrically connected to the cathode 2232 of the electrochemical cell 2230 via current collector 2226. The negative input 2248 of controller 2240 is electrically connected to the anode 2234 of the electrochemical cell 230 via conductive strip 2237. Alternatively, the controller 2240 may be placed between the bottom cap 2218 and the insulator 2225, or attached, affixed or joined to the outside of the container or the label of the battery.

In FIG. 20B, the controller 340 is placed between the bottom cap 318 and the insulator 325 of the battery 310. The negative output 344 of the controller 340 is electrically connected to the negative terminal 322 of the battery 310, which is directly adjacent to the controller 340, and the positive output 342 of the controller 340 is electrically connected to the positive terminal 320 of the battery 310. In this example, the positive output 342 of the controller 340 is connected to the positive terminal 320 of the battery 310 via conductive strip 349 and conductive side wall 314, which is in electrical contact with positive terminal 320 of the conductive top cap 316 of the battery 310. The positive input 346 of the controller 340 is electrically connected to the cathode 332 of the electrochemical cell 330 via conductive strip 336. The negative input 348 of controller 340 is electrically connected to the anode 334 of the electrochemical cell 330 via current collector 326, which extends from bottom plate 319 into the anode 334 of the electrochemical cell 330. In such cases, the current collector 325 and the negative input 348 of the controller 340 must be insulated from the negative terminal 322 of the container 312 and the negative output 344 of the controller 340 if the controller 340 uses a virtual ground. Alternatively, the controller 340 may be placed between the top cap 316 and the insulator 324, or attached, affixed or joined to the outside of the container 312 or the label of the battery.

In FIG. 20C, the controller 440 is formed on a wrapper 441 using thick film printing technology, or flexible printed circuit boards ("PCBs"), and placed inside the container between the side wall 414 and the cathode 432 of the battery 410. The positive output 442 of the controller 440 is electrically connected to the positive terminal 420 of the battery 410 via top cap 416 of the battery 410, and the negative output 444 of the controller 440 is electrically connected to the negative terminal 422 of the battery 410 via bottom plate 419 and bottom cap 418. The positive input 446 of the controller 440 is electrically connected to the cathode 432 of the electrochemical cell 430, which in this example is directly adjacent to the wrapper 441 containing the controller 440. The negative input 448 of controller 440 is electrically connected to the anode 434 of the electrochemical cell 430 via contact plate 431 and the current collector 426, which extends from contact plate 431 into the anode 434 of the electrochemical cell 430. Insulating washer 427 isolates the contact plate 431 from the cathode 432. As shown in FIG. 20C, the insulating washer may also extend between the anode 434 and contact plate 431 because current collector 426 provides the connection from the anode 434 to the contact plate 431. If the controller 440 uses a virtual ground, the contact plate 431 must also be insulated from the bottom plate 419 and the negative terminal 422 such as by insulating washer 425. Alternatively, the wrapper 441 may also be disposed on the outside of the container 412, wrapped around the outside of the side wall 414. In such embodiments, the label may cover the wrapper, or the label may be printed on the same wrapper as the controller itself.

FIG. 21 shows a perspective view, partially in section, of a multiple-cell 9 volt battery 610 of the present invention in which each electrochemical cell 630 has a controller 640 inside the cell's individual container 612. In this embodiment, the battery 610 contains six individual electrochemical cells 630, each having a nominal voltage of approximately 1.5 volts. The battery 610, for example, could also contain three lithium cells, each having a nominal voltage of approximately 3 volts apiece. Other multiple-cell constructions are known in the art and may be used to house a controller of the present invention. For example, multiple-cell batteries include prismatic batteries, batteries having individual containers that are at least substantially shrink-wrapped together and plastic housings that contain multiple single cell containers such as camcorder and cellular phone batteries.

Figure 19:
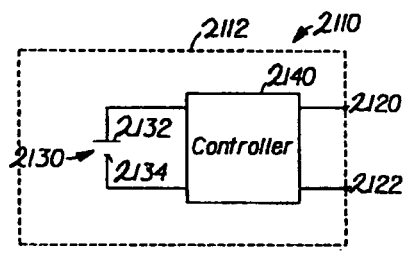
FIG. 19 is a block diagram of a battery of the present invention.
Figure 19A:
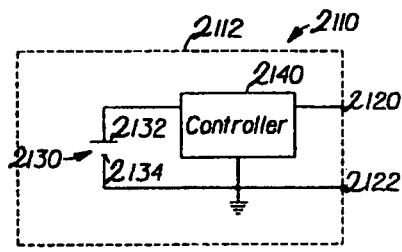
FIG. 19A is a block diagram of one preferred embodiment of the battery shown in FIG. 19.
Figure 19B:
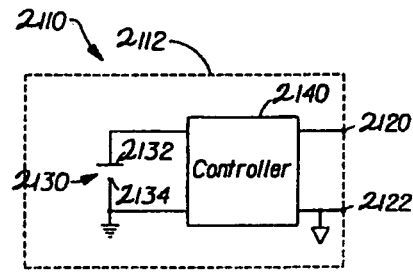
FIG. 19B is a block diagram of another preferred embodiment of the battery shown in FIG. 19.

FIGS. 19, 19A and 19B show block diagrams of different embodiments of the battery 2110 of the present invention. FIG. 19 shows a block diagram of one embodiment of a battery of the present invention utilizing an embedded integrated controller circuit 2140. This embodiment preferably utilizes a mixed-mode integrated circuit that has both digital and analog components. The controller circuit could alternatively be fabricated using an application specific integrated circuit ("ASIC"), a hybrid chip design, a PC board or any other form of circuit fabrication technology known in the art. The controller circuit 2140 may be placed inside the battery container 2112 between the positive 2132 and negative 2134 electrodes of the electrochemical cell 2130 and the positive 2120 and negative 2122 terminals of the battery. Thus, the controller 2140 container connect the electrochemical cell 2130 to or disconnect the electrochemical cell 2130 from the terminals 2120 and 2122 of the container 2112, alter or stabilize the output voltage or the output impedance of the cell 2130 that is applied to the battery terminals 2120 and 2122. FIG. 19A shows one preferred embodiment of the battery 2110 of the present invention shown in FIG. 19. In FIG. 19, the controller 2140 is connected between the positive electrode (cathode) 2132 of the electrochemical cell 2130 and the positive terminal 2120 of the battery container 2112. The negative electrode (anode) 2134 of the electrochemical cell 2130 and the negative terminal 2122 of the battery container 2112 share a common ground with the controller 2140. FIG. 19B, however, shows an alternative preferred embodiment of the battery 2110 of the present invention in which the controller 2140 operates on a virtual ground and isolates the negative electrode 2134 of the electrochemical cell 2130 from the negative terminal 2122 of the container 2112 in addition to isolating the positive electrode 2132 of the electrochemical cell 2130 from the positive terminal 2120 of the container 2112.

Each of the embodiments shown in FIGS. 19A and 19B has its own advantages and disadvantages. The configuration of FIG. 19A, for example, allows for a simpler circuit design having a common ground for the electrochemical cell 2130, the controller 2140 and the negative terminal 2122 of the battery container 2112. The configuration of FIG. 19A, however, has the disadvantage of requiring a converter to work under true electrochemical cell voltage levels and may require the use of a discrete inductor element. In the configuration of FIG. 19B, the virtual ground applied to the negative terminal 2122 of the battery container 2112 both isolates the negative electrode 2134 of the electrochemical cell 2130 from the load and allows the use of an almost inductorless DC/DC converter. This configuration, however, has the disadvantage of requiring the increased circuit complexity of a virtual ground in order to allow a voltage converter of the controller 2140 to continue to operate more efficiently when the cell voltage is below the nominal voltage level of the electrochemical cell.

Figure 19C:
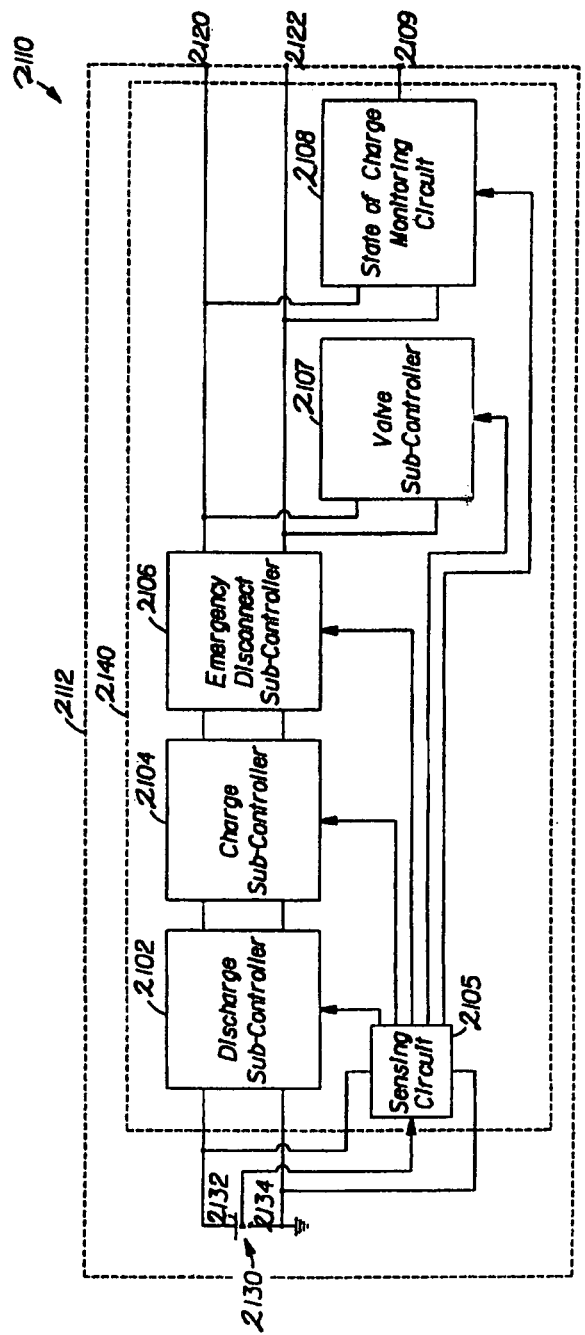
FIG. 19C is a block diagram of yet another preferred embodiment of the battery shown in FIG. 19.

FIG. 19C shows yet another embodiment of a battery 2110 of the present invention having an integrated controller circuit 2140 wherein the controller circuit 2140 includes six main components: a discharge sub-controller circuit 2102, a charge sub-controller circuit 2104, an emergency disconnect sub-controller circuit 2106, a valve sub-controller circuit 2107, a state of charge monitoring circuit 108, and a sensing circuit 2105 that provides voltage control signals to one or more of the sub-controllers and the state of charge monitoring circuit 108 based upon continuously or intermittently sensed operating parameters and/or physical conditions. The sensing circuit 2105 may measure operating parameters of the electrochemical cell 2130 such as the cell voltage, current drawn from the cell, phase shift between the cell voltage and current, etc. Additionally, the sensing circuit 2105 may measure operating parameters of the integrated controller circuit 2140 such as the output voltage and current levels, charging voltage and current levels, etc. Further, the sensing circuit may also measure physical conditions of the electrochemical cell such as the temperature, pressure, the hydrogen and/or the oxygen concentration, etc. The sensing circuit 2105 may measure any combination of these sufficient to effectively monitor the electrochemical cell during a charge or discharge cycle as is known in the art or described below.

The discharge sub-controller circuit 2102 controls the discharge of the, electrochemical cell(s) 2130 of the battery 2110 in order to provide a longer service run time of the cell by providing a safe deep discharge to use more of the battery's stored energy or by optimally using the stored energy of a rechargeable battery before charging. The charge sub-controller circuit 2104 safely and efficiently controls the charging of the electrochemical cell(s) 2130 of the battery 2110 in which the controller circuit 2140 is integrated. The emergency disconnect sub-controller 2106 disconnects the electrochemical cell(s) from the battery terminals when the sensing circuit 2105 detects an unsafe condition such as a short circuit, an inverse polarity, an over charge, or an over discharge.

In a preferred embodiment of a primary battery of the present invention, however, the controller 2140 would preferably include the discharge sub-controller circuit 2102, the emergency disconnect sub-controller 2106, the state of charge monitoring circuit 108 and the sensing circuit 2105. The sensing circuit 2105 preferably continuously monitors the operating parameters and the physical conditions of the electrochemical cell 2130. The discharge sub-controller circuit 2102 preferably provides a safer, deeper discharge of primary electrochemical cell(s) 2130 of the battery 2110 in order to provide a longer service run time before the battery is thrown away. The emergency disconnect sub-controller circuit 2106 preferably disconnects the electrochemical cell(s) from the battery terminals when the sensing circuit detects an unsafe condition. The state of charge monitoring circuit 108 preferably monitors the actual charge of the electrochemical cell 2130 and may provide this information to a device via contact 2109. Alternatively, the state of charge monitoring circuit 108 may provide a direct indication to the user of the charge level of the electrochemical cell or may provide the level to one or more of the sub-controllers in order to allow the sub-controllers to optimize the performance of the electrochemical cell 2130. Additionally, if the electrochemical cell 2130 is a metal-air cell that requires air or oxygen, the valve sub-controller 2107 may regulate the diffusion of air or oxygen into the cell.

In a preferred embodiment of a rechargeable battery of the present invention, the discharge sub-controller 2102 preferably optimizes the service run time of the battery by controlling the discharge depth of the cell in order to maximize number of and the efficiency of the charge cycles, and the controller circuit 2140 may additionally include a charge sub-controller circuit 2104. The charge sub-controller circuit 2104 safely and efficiently controls the charging of the electrochemical cell(s) 2130 of the battery 2110 in which the controller circuit 2140 is integrated. The sensing circuit 2105 preferably continuously and directly monitors the operating parameters of the controller circuit 2140 and the physical conditions in the electrochemical cell(s) 2130. For example, the sensing circuit 2105 may monitor the cell voltage, the charging current, the internal impedance of the electrochemical cell(s), hydrogen or oxygen concentration, temperature, pressure, or any other operating parameter or physical condition known in the art.

In a particularly preferred embodiment, each electrochemical cell has its own integrated controller circuit 2140 that monitors the conditions in that particular cell. By directly monitoring the conditions of each particular cell, the charge sub-controller 2105 can provide better safety and efficiency than a known charging controller that monitors a battery having multiple electrochemical cells. The charge sub-controller 2105 minimizes losses by utilizing the instantaneous charge value of the cell(s) and the maximum capacity of the cell to continuously optimize the charging conditions.

In one embodiment of the present invention, a controller may include one or more of the following components: (1) a discharge sub-controller, (2) a charge sub-controller, (3) an emergency disconnect sub-controller, (4) a valve sub-controller, and/or (5) a state of charge circuit. For ease of discussion, the functions are described in terms of independent sub-controllers or circuits. Actual realization of the controller, however, does not require independent circuit implementations of the functions because multiple functions that are performed by the controller may be, and preferably are, combined into a single circuit. For example, each sub-controller may have its own internal sensing circuits for measuring one or more operating parameters of the controller or physical conditions of the electrochemical cell(s), or an independent sensing circuit may measure the parameters and/or conditions and provide them and/or control signals related to the parameters and/or conditions to one or more of the sub-controllers. Further, a controller may have additional or alternative sub-controllers that perform other functions in addition to one or more of the functions listed here.

Discharge Sub-Controller

The discharge sub-controller may extend the service run time of a battery of the present invention in one of several ways. First, in the case of a multiple-cell battery that contains at least one primary or reserve cell, or at least one rechargeable cell that is preferably discharged as completely as possible before being recharged (e.g., a NiCd cell is preferably discharged up to about 100% but no more), the sub-controller may allow one or more of the electrochemical cell(s) of the battery to be more deeply discharged by an electronic device than would be otherwise possible. For example, the discharge sub-controller may allow a single-cell battery to discharge beyond the point where the cell voltage has dropped below the cut-off voltage of the device. In the case of a primary battery, the service run time of the battery may be increased by discharging the electrochemical cell(s) as deeply as possible before throwing the battery away. In a rechargeable battery, however, the battery service run time is increased by discharging the electrochemical cells to the optimal discharge depth. Thus, if the optimal discharge depth of a rechargeable electrochemical cell is below the cut-off voltage of the device which the rechargeable battery is powering, the service run time of the rechargeable battery may be increased if the rechargeable cell is allowed to discharge beyond the cut-off voltage of that device.

In this application, the term "deep discharge" refers to allowing the electrochemical cell(s) to be discharged to at least 80% of the rated capacity of the electrochemical cell(s). In addition, the term "substantial discharge" in this application refers to allowing the electrochemical cell(s) to be discharged to at least 70% of the rated capacity of the electrochemical cell(s). "Over-discharge" is referred to in this application as discharging the electrochemical cell beyond 100%, which may lead to a voltage reversal. A typical alkaline battery on the market today, for example, is generally capable of delivering approximately 40 to 70% of its stored energy capacity before the voltage level of the electrochemical cell drops to a voltage level that is insufficient to drive a given electronic device. Thus, a sub-controller of the present invention preferably provides an alkaline cell that is capable of greater than about 70% discharge before the battery cuts off. More preferably, the sub-controller provides a discharge level of greater than about 80%. Even more preferably, the sub-controller provides a discharge level of greater than about 90%, with greater than about 95% being the most preferred.

The discharge sub-controller may include a converter that converts the cell voltage to a desired output voltage of a primary or rechargeable battery. In a primary battery, this allows a deeper discharge of the electrochemical cell(s) and thereby extends the service run time of the battery. In a rechargeable battery however, the converter allows the controller to discharge the rechargeable battery to the optimal discharge depth independent of the cut-off voltage of a given device. In one embodiment of the present invention, the sub-controller may continuously convert the cell voltage to a desired output voltage over the run time of the battery. When the cell voltage drops to the level of the device cut-off voltage where the battery discharge would normally cut-off, the converter is boosting, or stepping up, the cell voltage to a level at the output of the battery that is sufficient to continue to drive the device until the voltage level drops below the minimum required voltage to drive the sub-controller. Thus, a battery having a sub-controller design that is capable of operating at a lower voltage level than the sub-controller of another battery will provide a battery capable of being more deeply discharged.

In preferred embodiments of the present invention, the converter operates only when the cell voltage falls to or below a predetermined voltage level. In such embodiments, the internal losses of the converter are minimized because the converter operates only when necessary. The predetermined voltage level is preferably in the range from the nominal voltage of the electrochemical cell to the highest cut-off voltage of the class of devices for which the battery is intended to operate. More preferably, the predetermined voltage level is slightly greater than the highest cut-off voltage of the class of devices for which the battery is intended to operate. For example, the predetermined voltage level may be in the range from about the highest cut-off voltage of the class of devices for which the battery is intended to operate to about 0.2 volts plus that cut-off voltage. For example, an electrochemical cell having a nominal voltage of about 1.5 volts generally has a predetermined voltage in the range between about 0.8 volts and about 1.8 volts. Preferably, the predetermined voltage is in the range between about 0.9 volts and about 1.6 volts. More preferably, the predetermined voltage is in the range between about 0.9 volts and about 1.5 volts. Even more preferably, the predetermined voltage is in the range between about 0.9 volts and about 1.2 volts, with the range between about 1.0 volts and about 1.2 volts being yet even more preferred. The voltage level of slightly greater than or equal to the highest cut-off voltage of the class of devices for which the battery is intended to operate being the most preferred. A sub-controller designed for operation with an electrochemical cell having a nominal voltage of about 3.0 volts, however, generally may have a predetermined voltage level is in the range from about 2.0 volts to about 3.4 volts. Preferably, the predetermined voltage is in the range from about 2.2 volts to about 3.2 volts. More preferably, the predetermined voltage is in the range from about 2.4 volts to about 3.2 volts. Even more preferably, the predetermined voltage is in the range from about 2.6 volts to about 3.2 volts, with the range from about 2.8 volts to about 3.0 volts being yet even more preferred. The voltage level of slightly greater than or equal to the highest cut-off voltage of the class of devices for which the battery is intended to operate being the most preferred.

When the cell voltage falls to or below the predetermined voltage level, the discharge sub-controller turns the converter on and boosts the cell voltage to a desired output voltage sufficient to drive the load. This eliminates losses of the converter that are not necessary when the cell voltage is high enough to drive the load, but then allows the electrochemical cell to continue to discharge even after the cell voltage drops below the level required to drive the load. The sub-controller may use any one or more of a number of control mechanisms from a simple voltage comparator and electronic switch combination that turns on the converter when the cell voltage drops to the predetermined voltage level, to more complex control schemes such as the ones described below.

A universal battery of the present invention that is designed for a given output voltage is preferably able to extend the service run time of the battery when it is used to power a device. As used in this application, a "universal" battery is a battery that can provide a uniform output voltage independent of the cell electrochemistry. Thus, the battery of the present invention is preferably designed to extend its service run time by maintaining the output voltage of the battery at a level greater than or equal to the cut-off voltage of a given device until the built-in sub-controller shuts down when the voltage of the electrochemical cell(s) drops to a level below which the sub-controller can no longer operate, or when a rechargeable electrochemical cell drops to its optimal discharge depth. A battery of the present invention that is designed to power a specific electronic device or a narrow class or electronic devices that have similar cut-off voltages may be specifically designed to operate more efficiently by matching the predetermined voltage level to the cut-off voltage(s) of those device(s) more closely.

Second, the discharge sub-controller may also be used to extend the service run time of a rechargeable electrochemical cell by optimally discharging the cell in order to increase the number and the efficiency of charge cycles. In a sealed lead-acid cell, for example, a deep discharge may damage the cell and/or reduce the number or the efficiency of future recharge cycles. The sub-controller may, for example, control the discharge of a particular type of rechargeable electrochemical cell so that the discharge cycle is ended when the cell voltage reaches a predetermined voltage level that is the optimal discharge depth for that type of or that particular electrochemical cell. In a lead-acid rechargeable electrochemical cell, for example, the predetermined voltage level is in the range from about 0.7 volts to about 1.6 volts, with about 0.7 volts being more preferred. In a lithium $MnO_2$ rechargeable electrochemical cell, for example, the predetermined voltage level is in the range from about 2.0 volts to about 3.0 volts, with about 2.4 volts being the most preferred. Alternatively, the discharge sub-controller may also end the discharge cycle when the internal impedance of the rechargeable electrochemical cell reaches a predetermined impedance level that corresponds to the maximum desired discharge level for that type of or that particular electrochemical cell. Thus, in a battery of the present invention that contains at least one rechargeable electrochemical cell that is preferably not deeply discharged beyond an optimal discharge depth, a discharge sub-controller may be used to increase the service run time of the battery by ending the discharge cycle when the cell voltage reaches a predetermined voltage level or when the cell internal impedance reaches a predetermined internal impedance level.

Third, the discharge sub-controller may also step down the cell voltage of electrochemical cell(s) having a nominal voltage greater than the desired output voltage and/or alter the output impedance of the electrochemical cell(s) of a battery. This not only extends the run time of the batteries, but also allows for greater interchangeability between electrochemical cells having different nominal voltages than is otherwise possible, allows designers to take advantage of the greater storage potential of electrochemical cells having a higher nominal voltage, and allows designers to alter the output impedance of a certain electrochemical cell in order to match the impedance to a desired level either to increase the interchangeability of the electrochemical cell with other types of electrochemical cells, and/or to increase the efficiency of the electrochemical cell with a particular type of load. In addition, electrochemical cells that are inefficient, hazardous to the environment, expensive, etc. and are used generally only because a particular nominal voltage is required, such as a mercury cadmium cell, may be replaced by safer, more efficient or cheaper electrochemical cells having their nominal voltage stepped up or stepped down or their output impedance altered in order to meet the required nominal voltage or output impedance required by the application.

For example, an electrochemical cell having a nominal voltage of about 1.8 volts or higher can be packaged with a sub-controller that steps down this higher nominal voltage to the standard nominal level of about 1.5 volts so that the battery may be used interchangeably with a battery having a nominal voltage of about 1.5 volts. In one specific example, a standard lithium cell such as a primary lithium $MnO_2$ cell having a nominal voltage of approximately 3.0 volts may be packaged in a battery with a step down sub-controller so that the battery has an output voltage of approximately 1.5 volts. This provides a battery having at least two times more capacity than a battery having an electrochemical cell with a nominal voltage of about 1.5 volts and the same volume. In addition, it also provides a lithium cell that is truly interchangeable with a standard alkaline or zinc-carbon single-cell battery, without the need to chemically alter the lithium cell chemistry, which decreases the chemical energy storage of the cell. Further, a rechargeable lithium ion cell has a nominal voltage of about 4.0 volts. The cell may be packaged in a battery with a step-down controller so that the single-cell battery has an output voltage of about 1.4 volts. The lithium ion battery of the present invention may be interchangeable with a standard single-cell NiCd rechargeable battery, but would be able to provide about three times the capacity of a single-cell NiCd battery having the same volume.

Additionally, batteries having electrochemical cells such as a lithium ion, magnesium, magnesium air and aluminum air also have nominal voltages above about 1.8 volts and can be used interchangeably with a standard battery having a nominal voltage of about 1.5 volts. Not only can different types of electrochemical cells be used interchangeably, but different types of electrochemical cells can be packaged together in a hybrid battery. Thus, different types of batteries having different electrochemical cells with various nominal voltages or internal impedance may be used interchangeably, or hybrid batteries may be manufactured having different types of electrochemical cells.

Alternatively, electrochemical cells that have nominal voltages below that which a typical electronic device will operate may be used with a discharge sub-controller having a built-in step-up converter to boost the nominal voltage. This allows a battery having this type of electrochemical cell to be used with a device that requires a higher voltage level than the cell would otherwise provide. In addition, the battery having this type of cell may also be used interchangeably with a standard alkaline or a zinc-carbon electrochemical cell. This may provide commercially-feasible, usable batteries having electrochemical cells that have not otherwise been considered for consumer use because the nominal voltages were too low to be practical.

Table 1 is not meant to be exclusive, but rather lists exemplary primary, secondary and reserve electrochemical cells that may be used in a battery of the present invention. For example, different types of primary and/or rechargeable electrochemical cells that have different nominal voltages or internal impedance may be used with a converter to create a universal single-cell battery that has the same output voltage as a standard 1.5 volt alkaline primary or rechargeable battery or a standard 1.4 volt NiCd rechargeable battery. In addition, the primary, secondary and/or reserve cells may be used together in a hybrid multiple-cell battery of the present invention. Indeed, the present invention allows greater interchangeability between various types of electrochemical cells, and between electrochemical cells and alternative power supplies such as fuel cells, capacitors, etc. than ever before. By placing a controller in each electrochemical cell, the electrical characteristics such as the nominal voltage and the output impedance of different types of electrochemical cells can be adjusted in order to allow a larger variety of cells to be used in making interchangeable batteries. Batteries may be specially designed to tale advantage of particular advantages of an electrochemical cell, while still permitting interchangeability with batteries that contain other types of cells. Further, the present invention may be used to create new standard voltage levels by converting the nominal voltages of electrochemical cells to the voltage levels of the standards.

TABLE 1

Electrochemical Cell Types and Nominal Voltages

| Type of Cell | Nominal Voltage | Type of Cell | Voltage |
|---|---|---|---|
| Primary Cells | | | |
| Mercad | 0.9 volts | Lithium $FeS_2$ | 1.6 volts |
| Mercuric Oxide | 1.35 volts | Magnesium-Organic electrolyte | 1.6 volts |
| Mercuric Oxide with $MnO_2$ | 1.4 volts | Magnesium $MnO_2$ | 2.8 volts |
| Zinc-Air | 1.4 volts | Lithium-Solid Electrolyte | 2.8 volts |
| Carbon-Zinc | 1.5 volts | Lithium $MnO_2$ | 3.0 volts |
| Zinc-Chloride | 1.5 volts | Lithium $(CF)_n$ | 3.0 volts |
| Alkaline $MnO_2$ | 1.5 volts | Lithium $SO_2$ | 3.0 volts |
| Silver-Oxide | 1.5 volts | Lithium $SOCl_2$ | 3.6 volts |
| Secondary Cells | | | |
| Silver-cadmium | 1.1 volts | Zinc-bromine | 1.6 volts |
| Edison (Fe—Ni oxide) | 1.2 volts | High Temperature Li(Al)—$FeS_2$ | 1.7 volts |
| Nickel-cadmium | 1.2 volts | Aluminum-air | 1.9 volts |
| Nickel Metal Hydride | 1.2 volts | Lead-acid | 2.0 volts |
| Nickel Hydrogen | 1.2 volts | High Temperature Na—S | 2.0 volts |
| Silver-zinc | 1.5 volts | Lithium-polymer Li—$V_6O_{13}$ | 3.0 volts |
| Zinc-air | 1.5 volts | Lithium-ion C—$Li_xCoO_2$ | 4.0 volts |
| Nickel-zinc | 1.6 volts | | |
| Reserve Cells | | | |
| Cuprous Chloride | 1.3 volts | Thermal Li—$FeS_2$ | 2.0 volts |
| Zinc/silver oxide | 1.5 volts | | |

In addition, otherwise incompatible electrochemical cells may be used together in hybrid batteries specially designed for particular types of applications. For example, a zinc-air electrochemical cell may be used together either in parallel or in series with a lithium cell in a hybrid battery. The zinc-air cell has a nominal voltage of about 1.5 volts and a very high energy density, but can only provide low, steady current levels. The lithium cell, however, has a nominal voltage level of about 3.0 volts and can provide short bursts of high current levels. The discharge sub-controllers of each electrochemical cell provide the same nominal output voltage and allow for an arrangement either in a parallel or series electrical configuration. When the cells are in a parallel configuration, the sub-controllers also prevent the cells from charging one another. The sub-controller for each cell may be used to connect or disconnect either or both of the cells as needed by the load. Thus, when the load is in a low power mode, the zinc-air cell may be connected to provide a steady, low current, and, when the load is in a high power mode, the lithium cell or the lithium and the zinc-air cells in combination may provide the current necessary to power the load.

Hybrid batteries may also contain many different combinations of electrochemical cells such as primary and secondary cells, primary and reserve cells, secondary and reserve cells, or primary, secondary and reserve cells. Further, a hybrid battery may also contain a combination of one or more electrochemical cells and one or more alternative power supplies such as a fuel cell, a conventional capacitor or even a super-capacitor. For example, a hybrid battery may contain combinations such as alkaline and metal-air cells, metal-air and a secondary cells, a metal-air cell and a super capacitor. Moreover, hybrid batteries may also contain any combination of two or more of the above mentioned cells or power supplies.

Further, the discharge sub-controller may also extend the service run time of a battery by protecting the electrochemical cell(s) from current peaks that can impair the operation of the electrochemical cell components and lower the cell voltage. For example, the sub-controller may prevent high current demands from creating a memory effect in the cell and decreasing the run time of the battery. The current peaks are also harmful to electrochemical cells such as alkaline, lithium, NiCd, SLA, metal hydride and zinc-air cells.

The discharge sub-controller may protect the electrochemical cell from current peaks by providing a temporary storage of electrical charge at the output of the sub-controller so that the temporary storage may be utilized upon immediate demand. Therefore, a current peak may be completely eliminated or significantly reduced before it reaches the electrochemical cell. This both allows a battery to provide current peaks higher than the electrochemical cell(s) may provide directly and protects the electrochemical cell(s) from current peaks that may be detrimental to the cell components. The storage element is preferably a capacitor. This capacitor may be any type of capacitor that is known in the art such as a conventional capacitor, a thick-film printed capacitor or even a "super-capacitor." FIG. 28, for example, shows capacitor Cf connected across the output terminals 1320 and 1322 of the container 1312.

A single discharge sub-controller will preferably extend the service run time of a battery by both protecting the electrochemical cell against current peaks and by converting the cell voltage to a desired output voltage. For example, a preferred embodiment of the sub-controller can turn a converter on when the cell voltage drops to a predetermined voltage in order to minimize losses associated with the converter. The same sub-controller can monitor both the cell voltage and the output load current and turn on the converter if either the cell voltage reaches the predetermined voltage level or the load current reaches a predetermined current level. Alternatively, the sub-controller may monitor both the cell voltage and the output load current and determine if supplying the required load current will drop the cell voltage below a cut-off voltage level. In the latter example, the sub-controller is operating upon two input signals combined in an algorithm to determine if the converter should be turned on. In the former example, however, the sub-controller turns on the converter if either the cell voltage drops to a predetermined voltage level, or the output load current rises to a predetermined current level. These, along with other possible control schemes, are discussed in more detail below.

The present invention relates to specialized batteries as well as standard consumer batteries, such as AAA, AA, C or D cells, and 9 volt batteries. The invention contemplates the use of specialized batteries, and hybrid batteries that could be used in various applications. It is anticipated that these specialized batteries and hybrid batteries could be used to replace rechargeable batteries for uses such as for cellular telephones, laptop computers, etc., which are currently limited by the ability of primary batteries to provide the required current rate over a sufficient period of time. In addition, being able to individually control the output voltage end output impedance of the cells will allow battery designers to design entirely new types of hybrid batteries that use different types of cells in combination or alternative power supplies, such as fuel cells, conventional capacitors or even "super-capacitors," in the same hybrid battery. The increase of interchangeable types of electrochemical cells could allow battery designers to provide standard batteries to decrease the reliance upon batteries custom designed for particular devices such as cellular telephones, laptop computers, camcorders, cameras, etc. A consumer could simply purchase standard batteries to power a cellular telephone, much like a consumer would presently purchase for a flashlight or tape recorder, instead of having to purchase a battery specifically manufactured for the particular type, brand and/or model electronic device. In addition, as the number of standard batteries manufactured increased, the cost per unit would rapidly decrease, resulting in much more affordable batteries that could ultimately replace specially designed rechargeable batteries.

Electronic labeling technology such as that used on photographic film, etc. could also be used to designate the exact type of cell(s) in the battery, rated and/or remaining capacity of the cell(s), peak and optimal current delivery capabilities, current charge level, internal impedance, etc. so that a "smart" device could read the electronic labeling and optimize its consumption to enhance the performance of the device, to extend the service run time of the battery, etc. A camera, which already utilizes electronic labeling to determine film speed, for example, could also utilize electronic labeling technology with its batteries to allow for a slower charge time of the flash, stop use of the flash, etc. in order to optimize the service run time of a particular battery. A laptop could also utilize electronic labeling technology to determine the most efficient operating parameters for particular batteries by, for example, changing its operating speed in order to best use the remaining charge in the battery for a duration desired by a user, or utilizing power on/power off technology to conserve energy of the battery. In addition, camcorders, cellular telephones, etc. could also utilize electronic labeling to optimize the usage of batteries.

Further, primary batteries could also be used interchangeably with different types of primary or even rechargeable batteries depending upon the needs of the consumer. For example, if the rechargeable batteries of a laptop computer were exhausted, the user could purchase primary batteries that would last for several hours of use until the user could charge the rechargeable battery. A user, for example, could also purchase less expensive batteries if the user did not need certain higher-performance levels that could be provided by the device with more expensive batteries.

The present invention also relates to standard consumer batteries such as AAA, AA, C or D cells, and 9 volt batteries. In addition to primary batteries being interchangeable with different types of primary or even rechargeable batteries, standard primary or rechargeable batteries may be available for applications in which only custom-designed batteries are presently available. Depending on their needs, for example, consumers could purchase one or more standard primary or rechargeable batteries that they could put directly into their laptop computers, camcorders, cellular telephones, and other portable electronic equipment. As mentioned above, as the number of standard batteries manufactured increased, the cost per unit would rapidly decrease, resulting in much more affordable batteries that could ultimately replace specially designed rechargeable batteries.

In a preferred embodiment, for example, the discharge sub-controller can be designed to operate with a battery that has a nominal voltage of about 1.5 volts so that the sub-controller can operate at voltage levels as low as about 0.1 volts in a silicon carbide ("SiC") embodiment, about 0.34 volts in a gallium arsenide ("GaAs") embodiment, and about 0.54 volts in a conventional silicon-based embodiment. In addition, as printing size decreases these minimum operating voltages will decrease as well. In silicon, for example, decreasing the circuit printing to 0.18 micron technology would decrease the minimum operating voltage from about 0.54 to about 0.4 volts. As described above, the lower the minimum required operating voltage of the discharge sub-controller, the lower that the discharge sub-controller can regulate the cell voltage in order to provide the deepest discharge of the electrochemical cell possible. Thus, it is within the comprehension of this invention to utilize different advances of in circuit fabrication to increase the battery utilization up to approximately 100% of the stored charge of the electrochemical cell. The present silicon-based embodiment, however, provides up to a 95% usage of the battery storage potential, which is quite high in comparison to the average 40-70% usage without a controller.

In one silicon-based preferred embodiment, for example, the discharge sub-controller is designed to operate at voltages as low as about 1 volt, more preferably about 0.85 volts, even more preferably about 0.8 volts, yet even more preferably about 0.75 volts, even more preferably about 0.7 volts, yet even more preferably about 0.65 volts, even more preferably about 0.6 volts, with about 0.54 volts being the most preferred. In a sub-controller designed for an electrochemical cell having a nominal voltage of about 1.5 volts, the sub-controller is preferably capable of operating at an input voltage at least as high as about 1.6 volts. More preferably, the discharge sub-controller is capable of operating at an input voltage of at least as high as about 1.8 volts. Thus, a preferred sub-controller should be able to operate in voltage range from a minimum of about 0.8 volts to at least 1.6 volts.

In a preferred embodiment of a discharge sub-controller of the present invention designed for use with an electrochemical cell such as a primary lithium $MnO_2$ cell having a nominal voltage of about 3.0 volts, however, the sub-controller must be able to operate at a higher voltage level than is required for a discharge sub-controller used in conjunction with an electrochemical cell having a nominal voltage of about 1.5 volts. In the case of an electrochemical cell having a nominal voltage of about 3.0 volts, the discharge sub-controller is preferably able to operate in the range from about 2.4 volts to about 3.2 volts. The sub-controller more preferably is capable of operating in a voltage range from about 0.8 volts to at least about 3.2 volts. More preferably, the sub-controller is capable of operating with an input voltage in the range from about 0.6 volts to at least about 3.4 volts. Even more preferably, the sub-controller is capable of operating with an input voltage in the range from about 0.54 volts to at least about 3.6 volts, with the range from about 0.45 volts to at least about 3.8 volts being the most preferred.

In a preferred embodiment of a discharge sub-controller of the present invention designed for use with an electrochemical cell such as a rechargeable lithium ion cell having a nominal voltage of about 4.0 volts, however, the sub-controller must be able to operate at an even higher voltage level than is required for a discharge sub-controller used in conjunction with an electrochemical cell having a nominal voltage of about 3.0 or about 1.5 volts. In the case of an electrochemical cell having a nominal voltage of about 4.0 volts, the discharge sub-controller is preferably able to operate in the range from about 2.0 volts to about 4.0 volts. The sub-controller more preferably is capable of operating in a voltage range from about 0.8 volts to at least about 4.0 volts. More preferably, the sub-controller is capable of operating with an input voltage in the range from about 0.6 volts to at least about 4.0 volts. Even more preferably, the sub-controller is capable of operating with an input voltage in the range from about 0.54 volts to at least about 4.0 volts, with the range from about 0.45 volts to at least about 4.0 volts being the most preferred.

An alternative preferred embodiment is capable of operation with an electrochemical cell having a nominal voltage of either about 1.5 volts or about 3.0 volts. In this embodiment the discharge sub-controller is capable of operating with a minimum input voltage of about 0.8 volts, preferably about 0.7 volts, more preferably about 0.6 volts and most preferably about 0.54 volts, and a maximum input voltage of at least about 3.2 volts, preferably about 3.4 volts, more preferably about 3.6 volts and most preferably about 3.8 volts. For example, the discharge sub-controller may be capable of operating in the range from about 0.54 volts to about 3.4 volts, or from about 0.54 volts to about 3.8 volts, or from about 0.7 volts to about 3.8 volts, etc.

The batteries of the present invention also provide distinct advantages over typical batteries when used with electric devices such as flashlights, etc. that do not have a cut-off voltage. With a typical battery, as the battery is discharged the output voltage of the battery decreases. Because the output power of the electric device is directly proportional to the voltage supplied by the battery, the output of the electric device decreases proportionately with the battery output voltage. For example, the intensity of a flashlight light bulb will continue to dim as the output voltage of the battery decreases until the battery is fully discharged. The battery of the present invention, however, has a discharge sub-controller that regulates the cell voltage into a relatively constant, controlled voltage level over the entire discharge cycle of the battery until the cell voltage decreases to a level below which the sub-controller is capable of operating. At that time, the battery will shut down, and the electric device will stop operating. During the discharge cycle, however, the electric device will continue to provide a relatively steady output (e.g., bulb intensity) until the battery shuts down.

A preferred embodiment of a battery of the present invention also includes a low remaining charge warning to the user. The discharge sub-controller, for example, may disconnect and reconnect the electrochemical cell(s) from the output terminals of the battery intermittently for a short duration of time when the electrochemical cell voltage reaches a predetermined value. This may provide a visible, audible, or device readable indication that the battery is about to shut down. Additionally, the sub-controller could also artificially recreate conditions of an accelerated battery discharge condition by decreasing the output voltage of the battery at the end of the life of the battery. For example, the sub-controller could begin ramping down the output voltage when the battery storage capacity is at about 5% of its rated capacity. This could provide an indication to the user such as a decreasing volume in a tape or compact disc player, or provide an indication to the device, which could warn the user accordingly.

Figure 22:
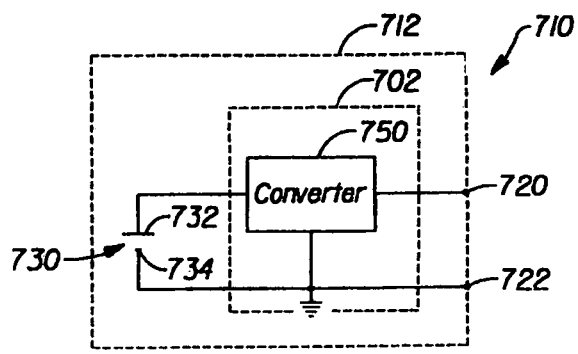
FIG. 22 is a block diagram of another preferred embodiment of a battery of the present invention.

FIG. 22 shows a block diagram of one embodiment of the present invention in which the DC/DC converter 750 of the discharge sub-controller 702 is electrically, or preferably electronically, connected between the positive 732 and negative 734 electrodes of the electrochemical cell 730 and the positive 720 and negative 722 terminals of the container 712. The DC/DC converter 750 converts the cell voltage across the positive 732 and the negative 734 electrodes of the electrochemical cell 730 to the output voltage at the positive 720 and the negative 722 terminals of the container 712. The DC/DC converter 750 may provide for step up conversion, step down conversion, both step up and step down conversion, or voltage stabilization at the output terminals 720 and 722. In this embodiment, the DC/DC converter 750 operates in a continuous mode in which the output voltage of the electrochemical cell 730 will be converted into a stable output voltage at the terminals 720 and 722 of the container over the run time of the battery. This embodiment stabilizes the output voltage of the container 712 at the output terminals 720 and 722. Providing a stable output voltage allows electronic device designers to decrease complexity of the power management circuits of the electronic devices, and, correspondingly, to decrease the size, weight and cost of the devices as well.

The DC/DC converter 750 will continue to operate until the cell voltage of the electrochemical cell 730 drops below either the optimal discharge depth of the electrochemical cell in the case of a rechargeable electrochemical cell or the minimum forward-bias voltage of the electronic components, Vfb, of the converter 750 in the case of a primary electrochemical cell. To the extent that the optimal discharge depth of the electrochemical cell or the minimum switching voltage, Vfb, of the DC/DC converter 750 is lower than the cut-off voltage of the electronic device that the battery 710 is powering, the controller 740 will also extend the service run time of the battery 710 by discharging the battery 710 beyond the cut-off voltage of the electronic device by maintaining the output voltage at the terminals 720 and 722 of the container 712 above the cut-off voltage of the electronic device.

In one preferred embodiment of the present invention as shown in FIG. 22, the DC/DC converter 750 that operates in a continuous mode may be a step down converter that lowers the cell voltage of the electrochemical cell 730 to an output voltage of the container 712. In one embodiment of a discharge sub-controller 702 that includes a step down converter, the converter lowers the voltage of a first type of electrochemical cell 730 to an output voltage of the container 712 that is about the nominal voltage level of a second type of electrochemical cell so that the battery containing the first type of electrochemical cell 730 is interchangeable with a battery containing the second type of electrochemical cell. For example, an electrochemical cell having a higher nominal voltage than a standard 1.5 volt cell could be used in combination with a step down converter that operates continuously to provide a cell that is interchangeable with the standard cell without the need to chemically alter the electrochemical cell. This embodiment allows for a greater degree of interchangeability between different types of electrochemical cells than is otherwise possible without chemically altering the structure of the electrochemical cell itself and diminishing the chemical energy storage of the cell.

A primary or rechargeable lithium cell, for example, may be used in a standard AA battery package to provide at least two times more capacity than an alkaline battery of the same volume. A lithium cell such as a lithium $MnO_2$ has a nominal voltage of about 3.0 volts and cannot normally be used interchangeably with a standard AA alkaline battery that has a 1.5 volt nominal voltage. Battery designers have, however, altered the primary lithium electrochemical cell chemistry to create lithium batteries that have a nominal voltage of about 1.5 volts in order to create a lithium battery that may be used interchangeably with a standard AA alkaline battery, for example. Although this 1.5 volt lithium battery still has the capability of delivering high current levels to photographic flash load circuits, the 1.5 volt lithium electrochemical cell does not provide a substantial increase in the total chemical energy storage over an alkaline cell of the same volume. The present invention, however, provides the ability to use a standard lithium electrochemical cell that has a nominal voltage of about 3 volts and a controller to convert that nominal voltage down to about 1.5 volts. Thus, the battery provides roughly twice the chemical energy storage of a battery containing either the chemically-altered 1.5 volt lithium cell or a 1.5 volt alkaline cell in a battery that is completely interchangeable with either 1.5 volt battery. Additionally, the lithium battery of the present invention would provide the same high current levels as a battery containing a 1.5 volt chemically altered lithium cell.

Additionally, the discharge sub-controller 702 also optimizes the performance of an electric device such as a flashlight that uses battery 710. Although an electric device will not shut off like an electronic device at a minimum operating voltage, the performance of the electric device, such as the intensity of the flashlight bulb, will decrease as the input voltage decreases. Thus, a stable battery 710 output voltage allows the electric device performance to remain constant over the run time of the battery without the device performance decreasing as the voltage of the electrochemical cell 730 decreases.

The DC/DC converter 750 may utilize one or more of many known control schemes such as pulse modulation, which can further include pulse-width modulation ("PWM"), pulse-amplitude modulation ("PAM"), pulse-frequency modulation ("PFM") and pulse-phase modulation ("P.psi.M"), resonant converters, etc. to control the operating parameters of the converter 750. A preferred embodiment of the converter 750 of the present invention utilizes pulse-width modulation. An even more preferred embodiment utilizes a combination of pulse-width modulation and pulse-phase modulation, which is described in detail below.

In a preferred embodiment DC/DC converter 750 for use in a battery of the present invention, the converter is controlled by a pulse-width modulator to drive the DC/DC converter 750. The pulse-width modulator generates a fixed frequency control signal in which the duty cycle is varied. For example, the duty cycle may be zero when the DC/DC converter is off, 100% when the converter is operating at fill capacity, and varied between zero and 100% depending upon the demand of the load and/or the remaining capacity of the electrochemical cell 730. The pulse-width modulation scheme has at least one input signal that is used to generate the duty cycle. In one embodiment, the output voltage at the terminals 720 and 722 of the container 712 is continuously sampled and compared to a reference voltage. The error correction signal is used to alter the duty cycle of the DC/DC converter. In this instance, the negative feedback loop from the output voltage at the terminals 720 and 722 of the container 712 allows the DC/DC converter 750 to provide a stabilized output voltage. Alternatively, the DC/DC converter 750 may utilize multiple input signals such as the cell voltage, i.e., the voltage across the positive 732 and the negative 734 electrodes of the electrochemical cell 730, and the output current to generate the duty cycle. In this embodiment, the cell voltage and the output current are monitored, and the DC/DC converter 750 generates a duty cycle that is a function of those two parameters.

FIGS. 23-26 show block diagrams of additional embodiments of discharge sub-controller circuits of the present invention. In each of these embodiments, the sub-controller circuit includes at least two main components: (1) a DC/DC converter; and (2) a converter controller that electrically, or preferably electronically, connects and disconnects the DC/DC converter between the electrodes of the electrochemical cell and the output terminals of the container so that the internal losses of the DC/DC converter are incurred only when the DC/DC converter is necessary to convert the cell voltage to a voltage necessary to drive the load. The DC/DC converter, for example, may be turned on only when the cell voltage falls to a predetermined level below which the load can no longer operate. Alternatively, if the electronic device requires an input voltage within a specific range such as .+−.10% of the nominal voltage of the battery, for example, the converter controller may turn "on" the DC/DC converter when the cell voltage is outside the desired range, but turn the converter "off" when the cell voltage is within the desired range.

Figure 23:
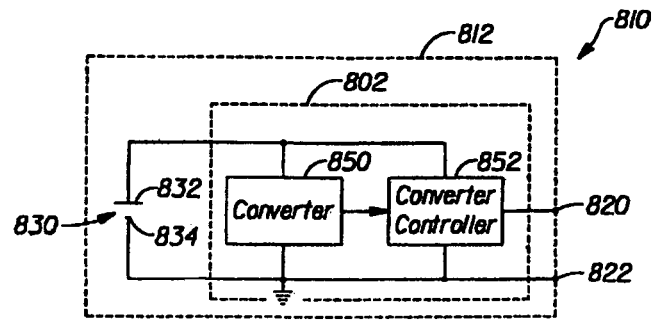
FIG. 23 is a block diagram of yet another preferred embodiment of a battery of the present invention.

In FIG. 23, for example, the DC/DC converter 850 is electrically connected between the positive 832 and the negative 834 electrodes of the electrochemical cell 830 and the positive 820 and the negative 822 terminals of the container 812. The converter controller 852 is also electrically connected between the positive 832 and negative 834 electrodes electrochemical cell 830 and the positive 820 and negative 822 terminals of the container 812. In this example, the converter controller 852 acts as a switch that either connects the electrochemical cell 830 directly to the output terminals 820 and 822 of the container 812, or connects the DC/DC converter 850 between the electrochemical cell 830 and the output terminals 820 and 822 of the container 812. The converter controller 852 continuously samples the output voltage and compares it to one or more internally generated threshold voltages. If the output voltage of the container 812 falls below the threshold voltage level or is outside a desired range of threshold voltages, for example, the converter controller 852 "turns on" the DC/DC converter 850 by electrically, or preferably electronically, connecting the DC/DC converter 850 between the electrochemical cell 830 and the output terminals 820 and 822 of the container 812. The threshold voltage is preferably in the range from about the nominal voltage of the electrochemical cell 830 to about the highest cut-off voltage of the class of electronic devices with which the battery is designed to operate. Alternatively, the converter controller 852 may continuously sample the cell voltage of the electrochemical cell 830 and compare that voltage to the threshold voltage in order to control the operation of the DC/DC converter 850.

In the case of a rechargeable battery, the converter controller 852 preferably also disconnects the electrochemical cell 830 from the output terminals 820 and 822 of the container 812 when the cell voltage reaches about the optimal discharge depth of the electrochemical cell 830. This provides a maximum cycle life of the battery in which each discharge cycle has an optimized battery run time. Thus, the service run time of the battery may be increased.

Figure 24:
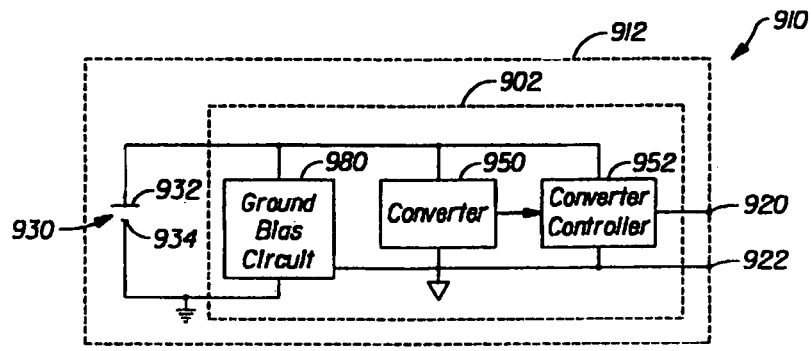
FIG. 24 is a block diagram of another preferred embodiment of a battery of the present invention.

The discharge sub-controller 902 of FIG. 24 may include the elements of the discharge sub-controller 802 shown in FIG. 23, but further includes a ground bias circuit 980 electrically connected between the electrodes 932 and 934 of the electrochemical cell 930, and the DC/DC converter 950, the converter controller 952, and the output terminals 920 and 922 of the container 912. The ground bias circuit 980 provides a negatively biased voltage level, Vnb, to the DC/DC converter 950 and to the negative output terminal 922 of the container 912. This increases the voltage applied to the DC/DC converter 950 from the cell voltage to a voltage level of the cell voltage plus the absolute value of the negatively biased voltage level, Vnb. This allows the converter 950 to operate at an efficient voltage level until the actual cell voltage drops to a voltage level below the minimum forward-bias voltage necessary to drive the ground bias circuit 980. Thus, the converter 950 may more efficiently draw a higher current level from the electrochemical cell 930 than it would be able to with only the cell voltage of the electrochemical cell 930 driving the converter 950. In a preferred embodiment of the discharge sub-controller 902 for a battery 910 of the present invention having an electrochemical cell with a nominal voltage of about 1.5 volts, the negatively biased voltage, Vnb, is preferably in the range between about 0 volts and about 1 volt. More preferably the negatively biased voltage, Vnb, is about 0.5 volts, with 0.4 volts being the most preferred. Therefore, the ground bias circuit 980 allows the converter to more deeply discharge the electrochemical cell 930 and increase the efficiency of the converter 950 in extracting the current from the electrochemical cell 930 when the cell voltage drops below about 1 volt for an electrochemical cell having a nominal voltage of about 1.5 volts.

Figure 24A:
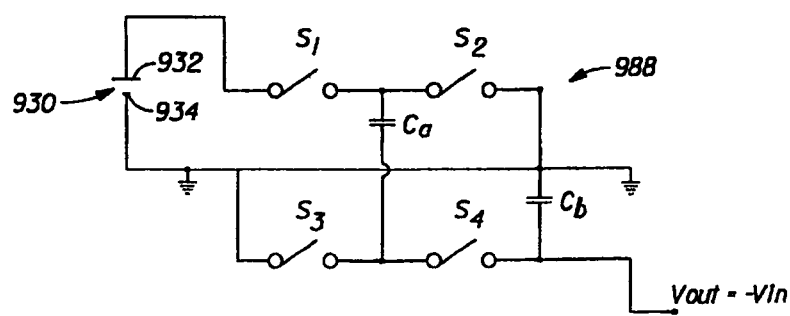
FIG. 24A is a schematic diagram of one embodiment of an aspect of the preferred embodiment of the battery of FIG. 25.

One exemplary embodiment of a charge pump 988 that may be used as a ground bias circuit 980 in a battery 910 of the present invention is shown in FIG. 24A. In this embodiment, when switches S1 and S3 are closed, and S2 and S4 are open, the cell voltage of the electrochemical cell 930 charges capacitor Ca. Then, when switches S1 and S3 are open, and S2 and S4 are closed, the charge on capacitor Ca is inverted and transferred to capacitor Cb, which provides an inverted output voltage from the cell voltage of the electrochemical cell 930. Alternatively, the charge pump 988 shown in FIG. 24A may be replaced by any suitable charge pump circuit known in the art.

Figure 24B:
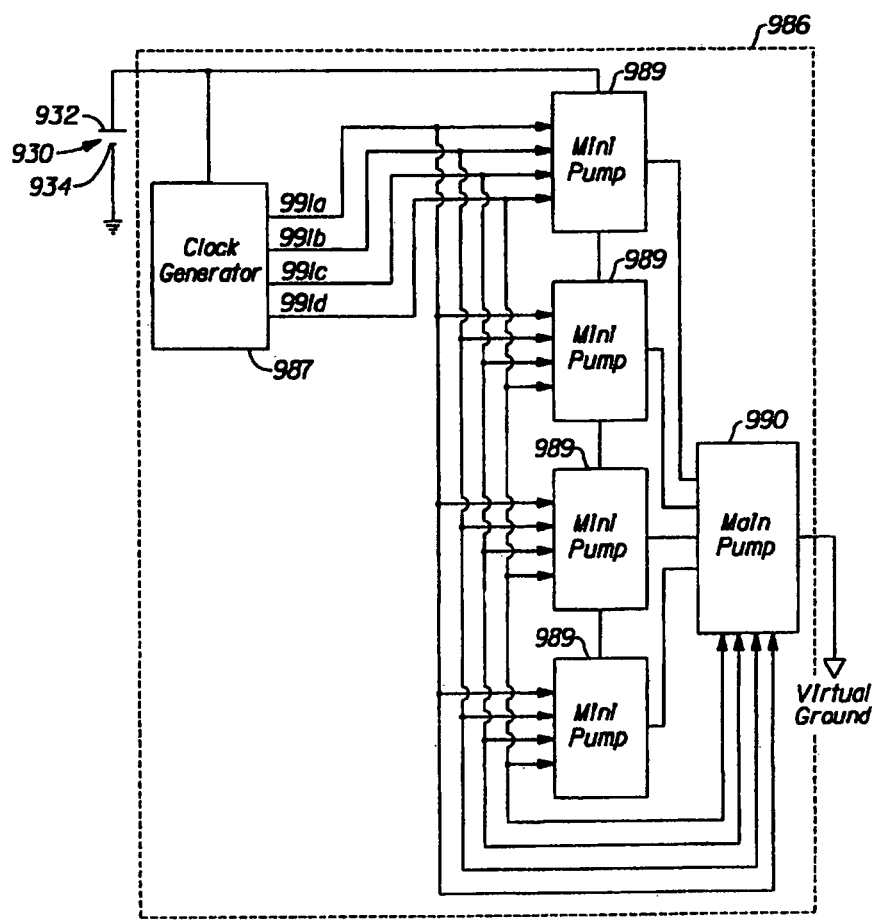
FIG. 24B is a block diagram of yet another preferred embodiment of an aspect of the preferred embodiment of the battery of FIG. 25.

In a preferred embodiment of the present invention, the ground bias circuit 980 includes a charge pump circuit 986. The charge pump circuit 986 is shown in FIG. 24B and includes a clock generator 987, and one or more pumps 988. In a preferred embodiment of the charge pump circuit 986 shown in FIG. 24B, for example, the charge pump includes a two-tiered configuration including four mini-pumps 989, and one main pump 990. Any number of mini-pumps 989, however, may be used. One preferred embodiment of a charge pump circuit 986, for example, includes twelve mini-pumps 989 and one main pump. The mini-pumps 989 and the main pump 990 of this embodiment are driven by four different phased control signals, 991$a$, 991$b$, 991$c$, and 991$d$, generated by the clock generator 987 that each have the same frequency, but are shifted in phase from each other. The control signals 991$a$ through 991$d$, for example, may be shifted in phase ninety degrees from each other. In this embodiment, each of the mini-pumps 989 provides an inverted output voltage of the controls signals 991$a$ through 991$d$ that are generated by the clock generator. The main pump 990 sums the outputs of the multiple mini-pumps 989 and provides an output signal for the charge pump circuit 986 that is at the same voltage level as the individual output voltages of the mini-pumps 989, but is at a higher current level that is the total of the current provided by all twelve of the mini-pumps 989. This output signal provides the virtual ground for the DC/DC converter 950 and the output negative terminal 922 of the container 912 (shown in FIG. 24).

In a further aspect of the invention, the charge pump circuit further includes a charge pump controller 992 that only turns on the charge pump circuit 986 when the cell voltage drops to a predetermined voltage level in order to minimize losses associated with the charge pump circuit 986. The predetermined voltage for the charge pump controller 992, for example, could be in the range from about the nominal voltage of the electrochemical cell 930 to about the highest cut-off voltage of the group of electronic devices for which the battery 910 is designed to power. The predetermined voltage is more preferably about 0.1 volts greater than the cut-off voltage of the electronic device, with about 0.05 volts greater than the cut-off voltage being the most preferred. Alternatively, the charge pump circuit 986 could be controlled by the same control signal that turns on the DC/DC converter 950 so that the charge pump circuit 986 operates only when the converter 950 is operating.

In addition, both the DC/DC converter 950 and charge pump circuit 986 in a battery having a rechargeable electrochemical cell are preferably turned off when the cell voltage drops to about the "discharge end-point voltage". This allows the rechargeable electrochemical cell to be optimally discharged in order to allow a maximum number of and efficiency of future charge cycles of that cell.

Further, when the ground bias circuit 980 is turned off, the virtual ground, which is applied to the output negative terminal 922 of the container 912, preferably collapses to the voltage level of the negative electrode 934 of the electrochemical cell 930. Thus, when the ground bias circuit 980 is not operating, the battery operates in a standard ground configuration provided by the negative electrode 934 of the electrochemical cell 930.

Alternatively, the ground bias circuit 980 could comprise a second DC/DC converter such as a Buck-Boost converter, a Cuk converter, or a linear regulator. In addition, the DC/DC converter 950 and the ground bias circuit 980 can be combined and replaced by a single converter such as a Buck-Boost converter, a push-pull converter, or a flyback converter that will both shift the positive output voltage up and shift the negative bias down.

Figure 25:
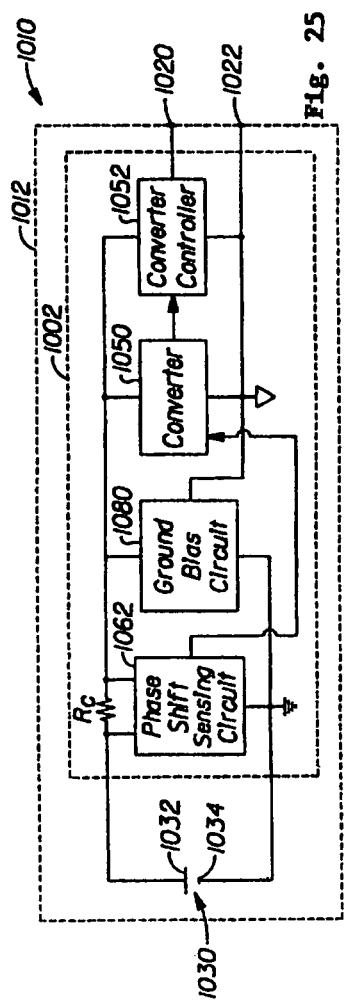
FIG. 25 is a block diagram of yet another preferred embodiment of a battery of the present invention.

FIG. 25 shows yet another embodiment of a discharge sub-controller circuit 1002 of the present invention. In this embodiment, the DC/DC converter 1050 is capable of accepting a correction control signal from an external source such as the phase shift sensing circuit 1062. As described above with reference to FIG. 22, the DC/DC converter 1050 utilizes a control scheme such as a pulse-width modulator to control the operating parameters of the converter 1050. In this embodiment, the discharge sub-controller circuit 1002 includes the same elements as the discharge sub-controller circuit 902 shown in FIG. 24, but further includes a phase shift sensing circuit 1062 that measures the instantaneous phase shift, .psi., between the AC components of the cell voltage at electrode 1032 and the current being drawn from the electrochemical cell 1030 measured across current-sensing resistor Rc. The DC/DC converter 1050 uses this signal in combination with other internally or externally generated control signals to generate the duty cycle.

Figure 26:
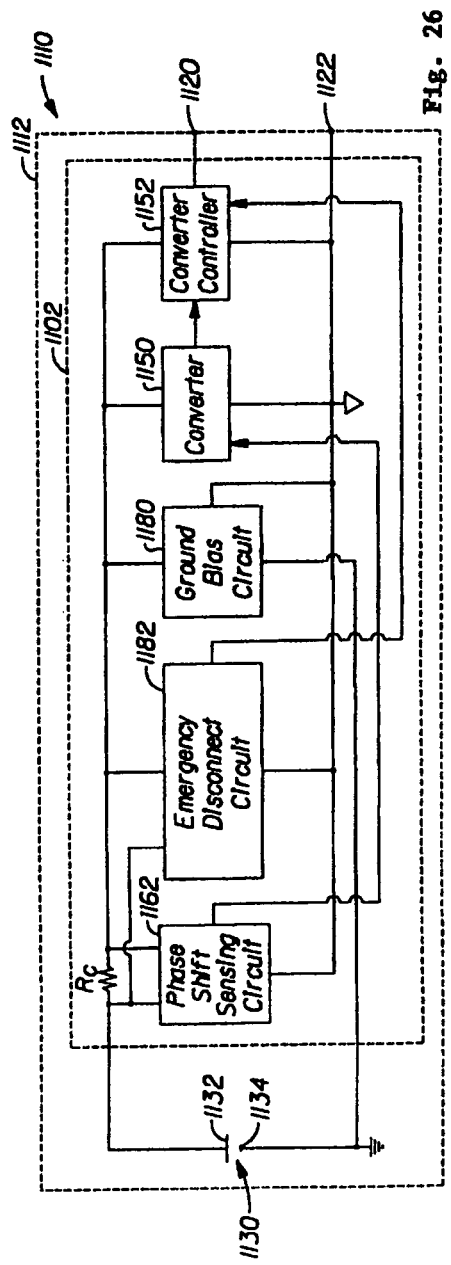
FIG. 26 is a block diagram of another preferred embodiment of a battery of the present invention.

The discharge sub-controller 1102 of the embodiment shown in FIG. 26 may include the same elements as the discharge sub-controller 1002 shown in FIG. 25, but further includes an emergency disconnect circuit 1182 electrically connected to the current-sensing resistor Rc, and the positive 1132 and the negative 1134 electrodes of the electrochemical cell 1130, and further connected to the converter controller 1152. The emergency disconnect circuit 1182 can signal to the converter controller 1152 one or more safety-related conditions requiring disconnect of the electrochemical cell(s) 1130 from the output terminals 1120 and 1122 of the container 1112 to protect the consumer, an electrical or electronic device, or the electrochemical cell itself. For example, in the event of a short-circuit or inverse polarity, the emergency disconnect circuit 1182 signals the converter controller 1152 to disconnect the electrodes 1132 and 1134 of the electrochemical cell 1030 from the terminals 1120 and 1122 of the container 1112. In addition, the emergency disconnect circuit 1182 can also provide an indication of the end of the discharge cycle of the electrochemical cell 1130 to the converter controller 1152 by sensing the voltage and/or the internal impedance of the electrochemical cell 1130. For example, the discharge sub-controller 1102 may ramp down the current when the remaining capacity of the electrochemical cell 1130 falls to a predetermined level, intermittently disconnect and reconnect the electrodes 1132 and 1134 of the electrochemical cell 1130 from the output terminals 1120 and 1122 for a short duration when the remaining capacity of the electrochemical cell 1130 reaches a predetermined value, or provide some other visible, audible or machine readable indication that the battery 1118 is about to shut down. At the end of the discharge cycle, the emergency disconnect circuit may also send a signal to the converter controller 1152 to disconnect the electrochemical cell 1130 from the terminals 1120 and 1122 of the container 1112 and/or to short the output terminals 1120 and 1122 to prevent the discharged electrochemical cell 1130 from consuming the current of other cells connected in series with the discharged electrochemical cell 1130.

Figure 27:
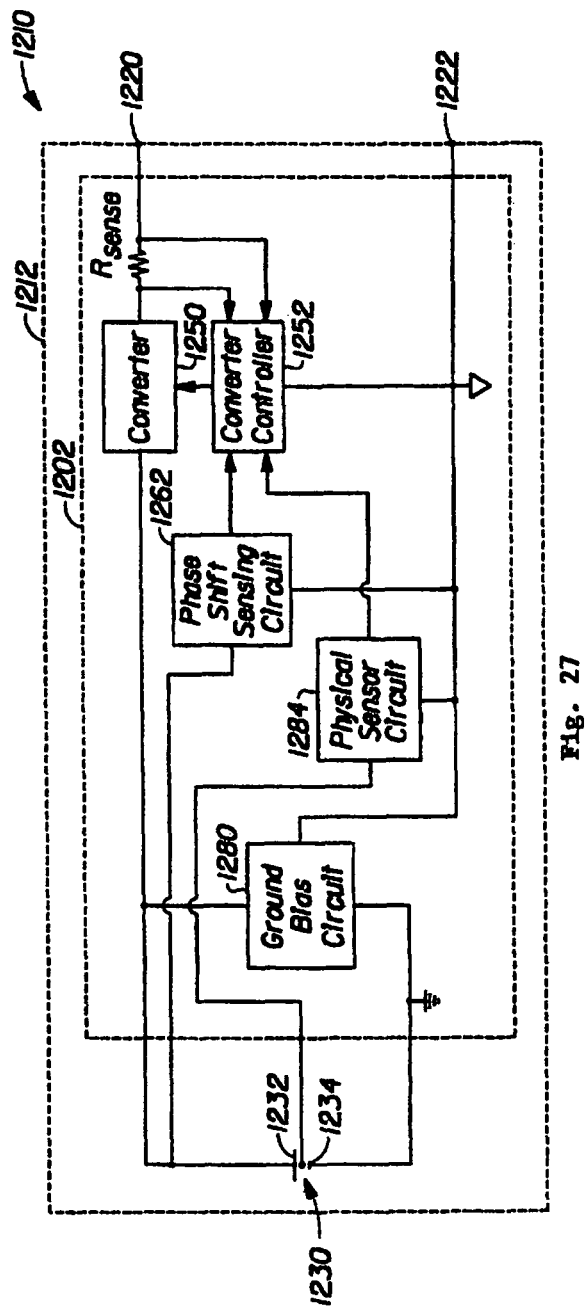
FIG. 27 is a block diagram of yet another preferred embodiment of a battery of the present invention.

A preferred discharge sub-controller 1202 that is shown in FIG. 27 includes a DC/DC converter 1250 having a synchronous rectifier 1274 that can electronically connect and disconnect the positive electrode 1232 from the positive terminal 1220 of the container 1212. The switch of the synchronous rectifier 1274 eliminates the need for an additional switch such as the converter controller 852 in the direct electrical path between the positive 1232 or the negative 1234 electrodes of the electrochemical cell 1230 and the output terminals 1220 and 1222 of the container. Additionally, the synchronous rectifier 1274 increases the efficiency of the DC/DC converter 1250 by reducing the internal losses. The converter controller 1252 of this embodiment also allows for additional input signals for the control of the DC/DC converter 1250. For example, in the embodiment shown in FIG. 27, the converter controller 1252 monitors the internal electrochemical cell environment via sensors such as temperature, pressure, and hydrogen and oxygen concentration in addition to the phase shift measurements described earlier with respect to FIG. 25.

FIGS. 22-27 show progressively more complex circuit designs of the present invention. They are given in this order to provide an orderly description of different elements that may be included in a discharge sub-controller circuit in addition to the DC/DC converter that is the central element of the controller of the present invention. The order of presentation is not meant to imply that the elements introduced later in circuits combining multiple different elements must have all the features described with respect to the previous Figures in order to be within the scope of the present invention. An emergency disconnect circuit, a charge indicator circuit, a phase sensing circuit, and/or a ground bias circuit, for example, may be used in combination with the circuits of FIGS. 21-26 without the converter controller or other elements shown in the Figures that show these elements.

Figure 28:
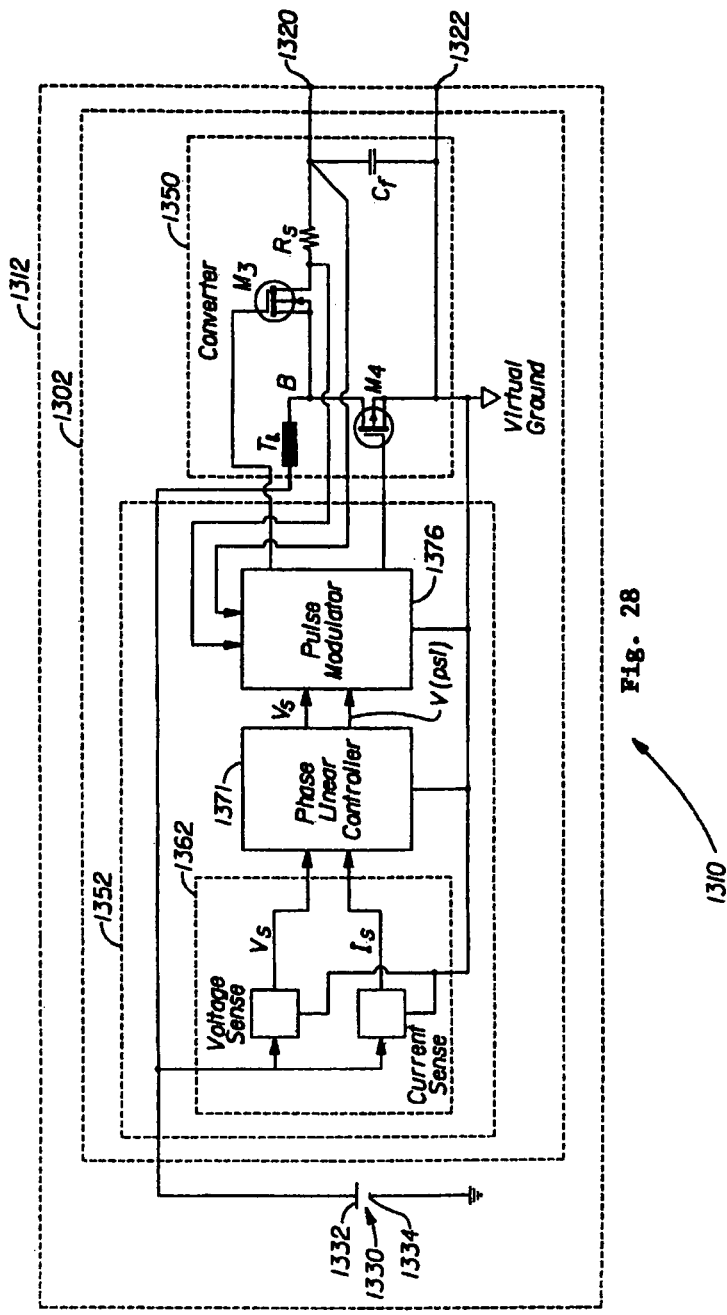
FIG. 28 is a combination of a block and a schematic diagram of another preferred embodiment of a battery of the present invention.

A preferred embodiment of the integrated controller circuit 1340 for use in a battery 1310 of the present invention includes the DC/DC converter 1350 and the converter controller 1352 and is shown in FIG. 28. The converter 1350 is preferably an almost inductorless, high frequency, high efficiency, and medium power converter that can operate below the threshold voltage of most electronic devices. The discharge sub-controller 1302 preferably includes a charge pump such as the one shown in FIG. 24B to supply a virtual ground that has a potential below that of the negative electrode 1334 of the electrochemical cell 1330 to the DC/DC converter 1350 and the output terminal 1322 of the container 1312. The virtual ground provides an increased voltage differential available to drive the DC/DC converter 1350 and allows the converter 1350 to more efficiently draw a higher current level from the electrochemical cell 1330 than it would be able to with only the cell voltage driving the converter.

In this embodiment, the converter controller 1352 preferably utilizes a pulse-width and pulse-phase modulation control scheme. The phase shift sensing circuit 1362 measures the cell voltage and the current drawn from the electrochemical cell 1330 at the positive 1332 and the negative 1334 electrodes of the electrochemical cell 1330 and the instantaneous and/or continuous phase shift between the voltage and the current. This phase shift defines the internal impedance of the electrochemical cell 1330, which is a function of charge capacity of the electrochemical cell 1330. In an alkaline battery, for example, after about 50% discharge of the electrochemical cell 1330, which is determined by the cell closed-circuit voltage drop, the increasing internal impedance indicates the remaining electrochemical cell 1330 capacity. The phase shifting sensing circuit 1362 provides these signals to the phase linear controller 1371. The phase linear controller 1371 then provides the voltage $V_S$ sensed by the phase shift sensing circuit 1362 and an output voltage control signal V(psi) that is linearly proportional to the phase shift to the pulse modulator 1376 that utilizes a combination of pulse-width modulation and pulse-phase modulation control schemes. The pulse modulator 1376 also receives the voltage drop across the resistor Rs as a voltage control signal.

The pulse modulator 1376 uses the voltage control signals in combination to drive the DC/DC converter 1350. When the voltage $V_S$ is above a predetermined threshold voltage level, the pulse modulator 1376 maintains the metal-oxide semiconductor field-effect transistor ("MOSFET") M3 in a closed state and the MOSFET M4 in an open state. Thus, the current path from the electrochemical cell 1330 to the load is maintained via MOSFET M3. In addition, the losses associated with the DC/DC converter 1350 and the converter controller 1352 are minimized because the duty cycle is effectively maintained at zero percent. In this case, the DC losses of the closed MOSFET M3 and the resistor Rs are extremely low. The resistor Rs, for example, is preferably in the range from about 0.01 to about 0.1 ohms.

When the voltage $V_S$ is below a predetermined threshold voltage level, however, the pulse modulator 1376 is turned on and modulates the duty cycle of the DC/DC converter 1350 based upon the combination of the voltage control signals. The amplitude of $V_S$ operates as the primary control signal that controls the duty cycle. The voltage drop across the current sense resistor Rs, which is a function of the output current, operates as the second control signal. Finally, the signal V(psi) generated by the phase linear controller 1371, which is linearly proportional to the phase shift between the AC components of the cell voltage and the current being drawn from the electrochemical cell 1330, is the third control signal. In particular, the V(psi) signal is used to alter the duty cycle in response to the internal impedance changes over the battery run time, which affects the efficiency of the converter and the battery run time. The pulse modulator increases the duty cycle if the instantaneous and/or continuous amplitude of $V_S$ decreases, or if the voltage drop across the resistor Rs increases, and/or the instantaneous and/or continuous amplitude of the V(psi) control signal increases. The contribution of each variable is weighted according to an appropriate control algorithm.

When the pulse modulator 1376 is turned on, its oscillator generates trapezoidal or square wave control pulses that preferably have a 50% duty cycle and a frequency in the range from about 40 KHz to about 1 MHz, more preferably in the range from about 40 KHz to about 600 KHz, with about 600 KHz generally being the most preferred. The pulse modulator 1376 alters the duty cycle of the output control signal for the MOSFETs M3 and M4 utilizing an appropriate control algorithm. Most generally, the control algorithm operates M3 and M4 with the same duty cycle but the opposite phase. The MOSFETs M3 and M4 are preferably complementary high power transistors in which M3 is preferably an N-channel MOSFET, and M4 is preferably a P-channel MOSFET. In essence, the configuration of the complete DC/DC converter 1350 is a boost DC/DC converter with a synchronized rectifier at the output. In addition, the converter 1350 minimizes AC and DC losses by using MOSFET M3 instead of a non-synchronous Schottky diode. Separate control signals drive M3 and the power MOSFET M4. Altering the phase and/or the duty cycle between the M3 and M4 control signals alters the output voltage across the terminals 1320 and 1322 of the container 1312.

The pulse modulator 1376 may control the MOSFETs M3 and M4 based upon one or more voltage control signals such as the voltage $V_S$, the voltage drop across the resistor Rs, or the internal impedance of the electrochemical cell 1330. If the load current consumption is low, for example, the pulse modulator 1376 generates a duty cycle of the DC/DC converter 1350 close to zero percent. If the load current consumption is high, however, the pulse modulator 1376 generates a duty cycle of the DC/DC converter 1350 close to 100%. As the load current consumption varies between these two endpoints the pulse modulator 1376 varies the duty cycle of the DC/DC converter in order to supply the current required by the load.

Figure 29:
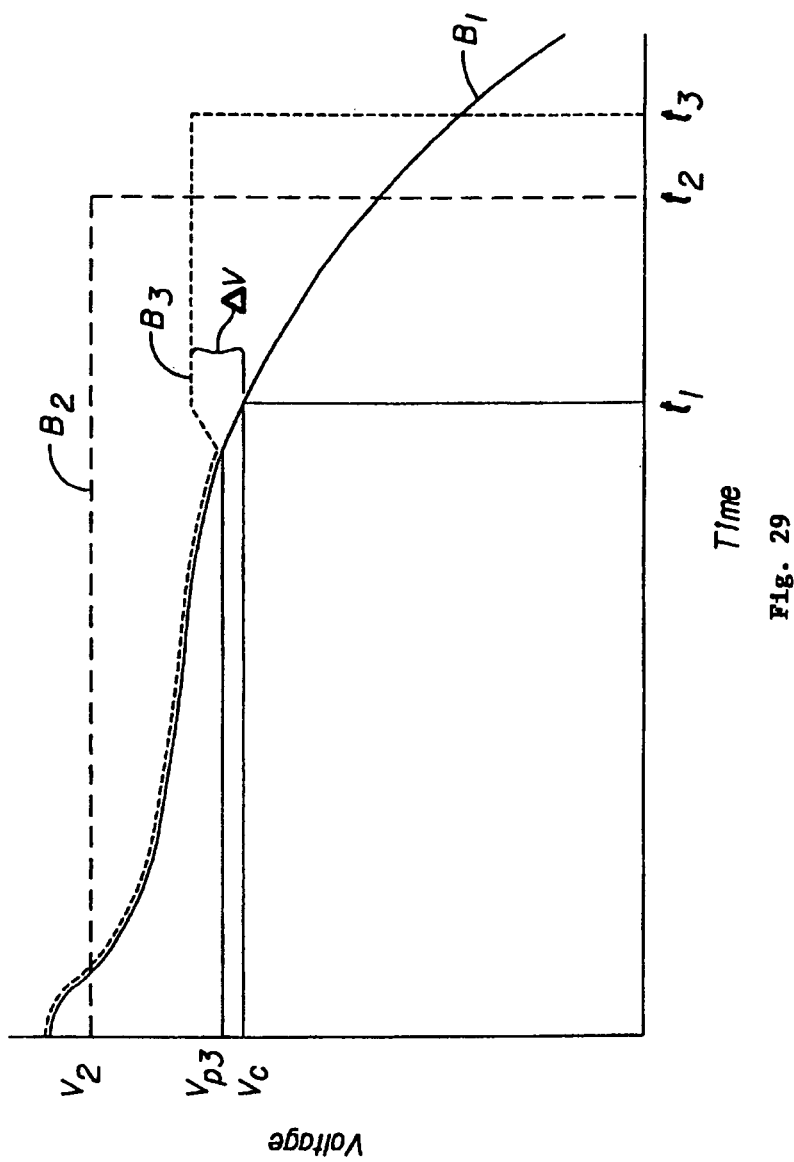
FIG. 29 is a graph of discharge characteristic curves for a typical battery and two different preferred embodiments of batteries of the present invention.

FIG. 29 compares exemplary discharge curves for a battery B1 that does not have a controller of the present invention, a battery B2 of the present invention having discharge sub-controller in which the converter that operates in a continuous mode, and a battery B3 of the present invention, having a discharge sub-controller in which the converter turns on above the cut-off voltage of the battery for a typical electronic device for which that battery is designed. As shown in FIG. 29, the battery B1 that does not have a controller of the present invention will fail in an electronic device that has a cut-off voltage Vc at time t1. The discharge sub-controller of the battery B2, however, continuously boosts the output voltage of the battery to voltage level V2 throughout the run time of the battery. When the cell voltage of the electrochemical cell of battery B2 falls to voltage level Vd, the minimum operating voltage of the discharge sub-controller, the sub-controller of battery B2 will shut down and the battery output voltage drops to zero at time t2, ending the effective run time of the battery B2. As shown in the graph of FIG. 29, the effective run time extension of the battery B2 having a sub-controller in which the converter operates in a continuous mode is t2-t1.

The controller of the battery B3, however, does not begin to boost the output voltage of the battery until the cell voltage of the electrochemical cell reaches a predetermined voltage level Vp3. The predetermined voltage level Vp3 is preferably in the range between the nominal voltage level of the electrochemical cell and the highest cut-off voltage of the class of electronic devices that the battery is intended to power. More preferably, the predetermined voltage level Vp3 is about 0.2 volts greater than the highest cut-off voltage, Vc, of the class of electronic devices that the battery is intended to power. Even more preferably, the predetermined voltage level Vp3 is about 0.15 volts greater than the highest cut-off voltage, Vc, of the class of electronic devices that the battery is intended to power. Yet even more preferably, the predetermined voltage level Vp3 is about 0.1 volts greater than the highest cut-off voltage, Vc, of the class of electronic devices that the battery is intended to power, with about 0.05 volts greater than Vc being the most preferred. When the cell voltage reaches the predetermined voltage level Vp3, the converter of battery $B_3$ begins to boost or stabilize the output voltage to a level of Vc+.DELTA.V. The voltage level .DELTA.V is depicted in FIG. 29 and represents the voltage difference between the boosted output voltage of the battery $B_3$ and the cut-off voltage Vc. The voltage level .DELTA.V is preferably in the range from about 0 volts to about 0.4 volts, with about 0.2 volts being more preferred. Battery B3 then continues to provide an output until the cell voltage of the electrochemical cell falls to voltage level Vd, the minimum operating voltage of the converter, the controller of battery B3 will shut down. At this time, the battery output voltage drops to zero at time t3, ending the effective run time of the battery B3. As shown in the graph of FIG. 29, the effective run time extension of the battery B3 over the battery $B_1$ that does not have a converter of the present invention is t3-t1.

FIG. 29 also shows that the battery B3 will outlast the battery B2 when they are connected to the same electronic device. Because the converter of battery $B_2$ operates continuously, the internal losses of the converter consume some of the energy capacity of the electrochemical cell of battery B2, and, therefore, the cell voltage of battery B2 will reach the minimum operating voltage of the converter Vd in a shorter time compared to the battery B3 in which the controller is operational for only a portion of the discharge cycle. Thus, optimizing the selection of the predetermined voltage Vp3 of battery B3 as close to the cut-off voltage of the electronic device that it is powering will result in the most efficient usage of the electrochemical cell and result in a greater battery run time extension. Thus the predetermined voltage Vp3 of the battery B3 is preferably equal to or slightly greater than the cut-off voltage of the electronic or electric device that it is intended to power. For example, the predetermined voltage Vp3 may preferably be about 0.2 volts greater than the cut-off voltage. More preferably, the predetermined voltage Vp3 may preferably be about 0.15 volts greater than the cut-off voltage. Even more preferably, the predetermined voltage Vp3 may preferably be about 0.1 volts greater than the cut-off voltage, with about 0.05 volts greater than the cut-off voltage being the most preferred.

If the battery is designed as a universal battery for a variety of electronic devices, however, the predetermined voltage Vp3 is preferably selected to be equal to or slightly greater than the highest cut-off voltage of that group of electronic devices. For example, the predetermined voltage Vp3 may preferably be about 0.2 volts greater than the highest cut-off voltage of that group of electronic devices. More preferably, the predetermined voltage Vp3 may preferably be about 0.15 volts greater than the highest cut-off voltage of that group of electronic devices. Even more preferably, the predetermined voltage Vp3 may preferably be about 0.1 volts greater than the highest cut-off voltage of that group of electronic devices, with about 0.05 volts greater than the highest cut-off voltage of that group of electronic devices being the most preferred.

The graphs of FIG. 29 also show that the lower the minimum operating voltage of the converter Vd, the greater the run time extension will be compared to battery B1 that does not have a controller of the present invention. In addition, the greater the difference between the cut-off voltage of the electronic device, Vc, and the minimum operating voltage of the converter, Vd, the controller of the present invention will provide a greater run time extension of the battery due to the boosting of the cell voltage of the electrochemical cell.

Further, FIG. 29 shows that the device cut-off is no longer the limiting factor of the discharge of a primary or rechargeable electrochemical cell. As long as the controller can maintain the output voltage of the battery above the cut-off voltage of the device, the electrochemical cell(s) of the battery may continue to discharge. In a primary battery, this allows the cell(s) to be discharged as completely as possible depending upon the minimum operating voltage of the converter. In a rechargeable battery, however, the present invention allows an optimal discharge that increases the service run time of the rechargeable battery independent of the cut-off voltage of the device as long as the converter is capable of operating at a cell voltage less than or equal to the optimal discharge depth of the rechargeable electrochemical cell.

Charge Sub-Controller

The charge sub-controller may also extend the cycle life of a rechargeable battery of the present invention by individually controlling the charge cycles for each individual electrochemical cell. Thus, the charge sub-controller may optimize the charge of each cell based on actual feedback from that particular cell in order to maximize the number and efficiency of each charge and discharge cycle. The charge sub-controller may, for example, control the charge of each cell by directly monitoring the cell voltage and/or the internal impedance of each cell. This allows the sub-controller to control the charge cycle of each individual electrochemical cell of multiple single-cell batteries or of one or more multiple-cell batteries.

The charge sub-controller may also extend the run time of a rechargeable battery that is preferably not deeply discharged, such as a lead-acid battery, by charging the electrochemical cell(s) during the "off-time" of the discharge cycle, i.e., when the electrochemical cell is not in a discharge mode. For example, the controller may allow the charge sub-controller to charge any one or more of the individual cell(s) during the "off-time" of the discharge for those cell(s). If the "off-time" is long enough with respect to the "on-time" of the discharge, i.e., when the particular electrochemical cell is actively discharging, the charge sub-controller may be able to maintain the cell in at least a near full-charge condition. If the duty cycle is high enough and the device operates over a sufficient duration that the charge sub-controller is unable to maintain the charge of the electrochemical cell above a predetermined voltage level or below a particular impedance level that corresponds to the maximum desired discharge depth of that type of or that particular electrochemical cell, the discharge sub-controller may end the discharge cycle of the battery when the rechargeable electrochemical cell(s) reach the maximum desired discharge depth. The charge sub-controller may also prevent an overcharge by only charging the cell when the cell voltage is below a certain predetermined voltage level such as the nominal voltage of the cell, by any other method to determine the end of a charge cycle described in this application, or by any other means known in the art. Thus, the controller may optimize the service run time of rechargeable electrochemical cells by not allowing the cell to discharge beyond the optimal discharge depth during the discharge cycle and optimizing the charge sequence during the charge cycle. The charge sequence may also be designed for a particular type of electrochemical cell, a particular class of electrochemical cells or a particular electrochemical cell.

Alternate power supplies for the charging cycle may include an external supply such as a power cord of a device or an internal supply such as another electrochemical cell in the device or packaged with the rechargeable electrochemical cell in a hybrid battery. A primary cell, for example may be packaged in the device or along with a rechargeable electrochemical cell in a hybrid battery. A metal-air cell, such as a zinc-air cell that has a high energy density, but is only able to provide relatively low current levels, provides a particularly advantageous alternative power supply that may be used to charge a rechargeable electrochemical cell. Alternatively, an alternative power supply such as a fuel cell may be included in a hybrid battery to provide the charging source for the rechargeable electrochemical cell.

In addition, the charge sub-controller also allows the use of either a contacted charging system or a contact-less isolated charging system to charge a battery of the present invention.

A preferred embodiment of the battery of the present invention may also include a full charge indication to the user. The charge sub-controller, for example, may provide a visible or audible indication to the user that the battery is fully charged. Alternatively, the sub-controller may provide a charger system or device readable indication so that the charger system or the device could warn the user accordingly.

Figure 30:
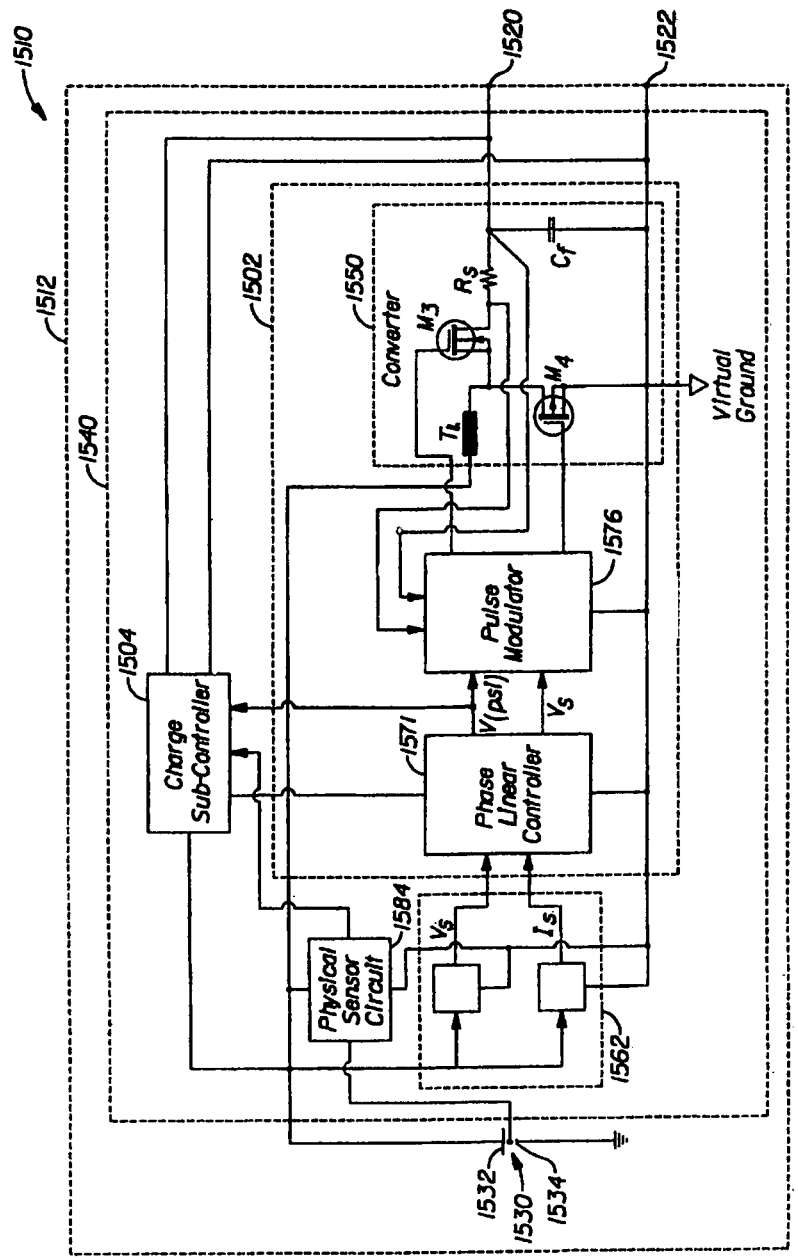
FIG. 30 is a combination of a block and schematic diagram of yet another preferred embodiment of a battery of the present invention.

FIG. 30 shows a block diagram of a battery of the present invention that includes a charge sub-controller circuit 1504. The charge sub-controller circuit 1504 is preferably integrated into the battery 1510 and is responsible to safely and efficiently control an incoming power signal from an external charging source or circuit in order to optimize the charge cycle of the rechargeable electrochemical cell 1530. The charge sub-controller circuit 1504 controls the incoming power signal from the external charging source based upon input voltage control signals received from the sensing circuit 2105 and/or feedback from its own internal sensing circuitry. For example, the charge sub-controller 1504 could use the voltage control signed, V(psi), that defines the internal impedance of the electrochemical cell 1530. This control signal is generated by the phase linear controller 1571 and is described with respect to FIG. 28. Alternatively, the charge sub-controller may control the charging of the electrochemical cell 1530 by the cell voltage or the charging current, or by a combination of two or more of the internal impedance, the cell voltage and the charging current. In addition, physical conditions measured within the container 1512 of the battery 1510 such as hydrogen concentration, oxygen concentration, temperature and/or pressure may be used by the charge sub-controller to optimally charge the electrochemical cell 1530.

When the voltage at the terminals 1520 and 1522 is higher than the cell voltage of the electrochemical cell 1530, the pulse modulator 1576 of the discharge sub-controller 1502 closes N-channel MOSFET M3 and opens P-channel MOSFET M4. MOSFET M3 creates a current path from the terminals 1520 and 1522 to charge the electrochemical cell 1530, and MOSFET M4 prevents a short circuit between the terminals 1520 and 1522. The pulse modulator 1576 may also turn off the ground bias circuit 1580 by sending a voltage control signal to the clock generator 1587 of the ground bias circuit 1580. In the charge pump example of FIG. 24A, for instance, the clock generator 987 will open switches S1 and S2, and close switches S3 and S4, collapsing the virtual ground output to the potential of the negative electrode 934 of the electrochemical cell 930. Alternatively, if the ground bias circuit 1580 includes an internal controller such as a charge pump controller 1592 that operates as described with respect to the charge pump controller 992 of FIG. 24B, the internal controller may directly compare the voltage of the terminals 1520 and 1522 to the cell voltage of the electrochemical cell 1530 and shut off the ground bias circuit 1580 if the voltage across the terminals 1520 and 1522 is greater than the cell voltage of the electrochemical cell 1530 by directly controlling the clock generator 1587. This will collapse the virtual ground output to the potential of the negative electrode 1534 of the electrochemical cell 1530.

In a preferred embodiment of the present invention, the charge sub-controller circuit 1504 uses the internal impedance information to determine the most efficient AC signal profile including the amplitude, the frequency, falling and rising edges, etc. The sub-controller thus minimizes the internal charging dynamic and static losses of the electrochemical cell and provides the control for the fastest possible charging rate for the particular electrochemistry, memory effects, and fatigue status of the electrochemical cell. In addition, physical condition sensors such as hydrogen and oxygen concentration, temperature, pressure, etc. may provide the ability to further optimize the charging conditions.

When the charge sub-controller circuit 1504 determines that the electrochemical cell has been fully charged, the charge sub-controller opens N-channel MOSFET M3. This disconnects the electrochemical cell 1530 from the terminals 1520 and 1522 of the container 1512 and, thereby, from the external charging source or circuit.

Utilization of the internal impedance to control the charging of the electrochemical cell 1530 allows charge optimization based upon the true ionic and electro-impedance conditions of the electrochemical cell 1530. By placing a charge sub-controller 1504 in each container 1512 provides more control of the individual electrochemical cells 1530 of multiple single-cell batteries or of a multiple-cell battery because the sub-controllers individually control the charging of each cell. The cells 1530 may be charged in a series and/or a parallel configuration with other electrochemical cells 1530. If the cells are charged in series, the charge sub-controller 1504 may include a high impedance path between the terminals so that when the electrochemical cell 1530 is fully charged, the sub-controller 1504 may shunt the charging current to the other cells connected in series with that cell 1530. If the cells are connected in parallel, however, the charge sub-controller 1504 may disconnect the electrochemical cell 1504 from the charging current. Placing a charge sub-controller in each electrochemical cell of a multiple-cell battery allows each cell to be charged by the same charging current, which is controlled by the individual controllers in each cell to optimally charge that cell, regardless of the electrochemistry of that cell. This charge sub-controller may also charge multiple cells of a hybrid battery even when the cells have different nominal voltages.

Figure 31:
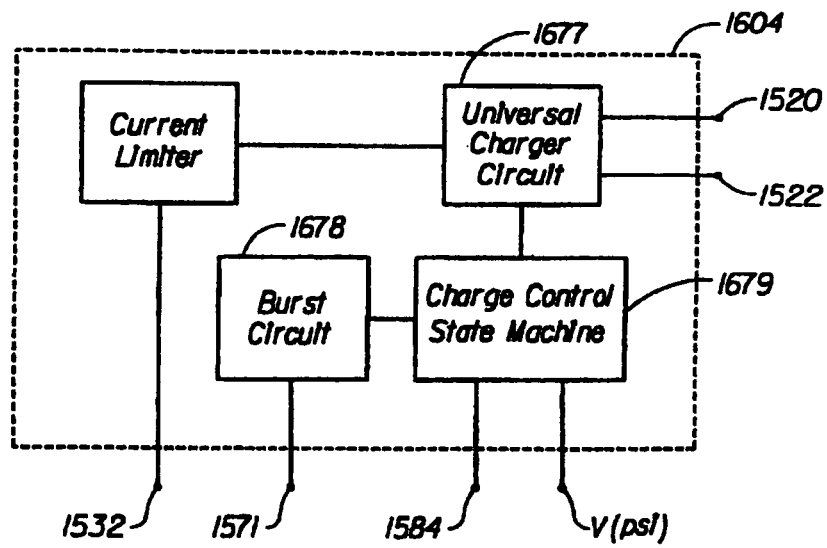
FIG. 31 is a block diagram of one embodiment of a charge sub-controller as depicted in FIG. 30.

FIG. 31 shows one embodiment of a charge sub-controller circuit 1504 configuration that may be used in a battery of the present invention as shown in FIG. 30. In this embodiment, the charge sub-controller circuit 1604 includes a universal charger circuit 1677, a burst circuit 1678, and a charge control state machine 1679. The charge control state machine 1679 uses burst circuit 1678 to create a test current, Is, and the test voltage, Vs, at the electrodes 1532 and 1534 of the electrochemical cell 1530. As described with reference to FIG. 28, the phase linear controller 1571 detects the phase shift between the test current, Is, and the test voltage, $V_S$. The burst circuit 1678 preferably includes a burst driver 1668 and a n-channel MOSFET M1. The burst driver 1668 produces a high frequency control pulse signal, which drives the gate of the MOSFET M1. The test current, Is, flows through the MOSFET M1, and the phase linear controller 1571 detects the phase shift angle (.psi.) between the test current, Is, and the test voltage, Vs. The phase linear controller 1571 outputs the voltage control signal V(psi), which is linearly proportional to the phase shift between the AC components of the cell voltage and the current being drawn from the electrochemical cell 1530, to the charge control state machine 1679. The charge control state machine 1679 uses this control signal from the phase linear controller 1571 to control the AC charge signal profile. When the electrochemical cell 1530 is fully charged, the pulse modulator 1576 disconnects MOSFET M3, which in turn disconnects the electrochemical cell 1530 from the terminals 1520 and 1522 of the container 1512.

Figure 32:
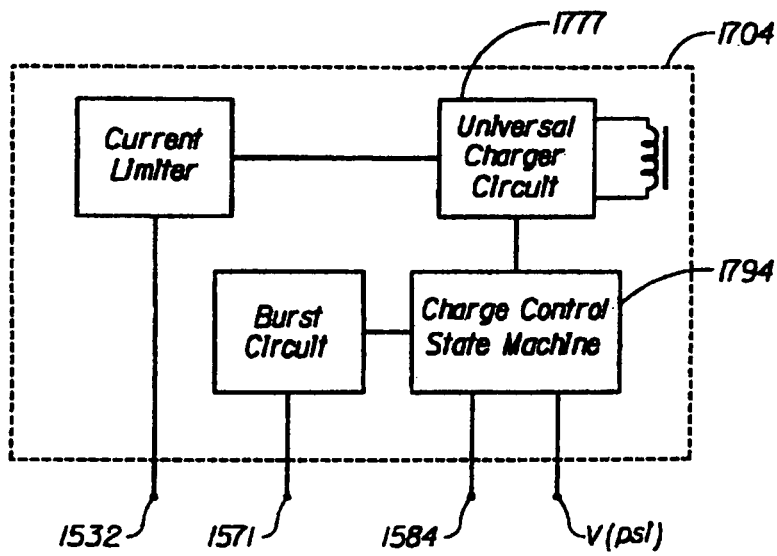
FIG. 32 is a block diagram of another embodiment of a charge sub-controller as depicted in FIG. 30.

FIG. 32 shows an alternative embodiment of the charge sub-controller circuit shown in FIG. 30 that allows an isolated charging of the electrochemical cell 1530 without any mechanical contacts between the external charger circuit and the battery 1510 of the present invention. In this embodiment, the charge sub-controller circuit 1704 includes a coil that acts as the secondary coil of a transformer to charge the electrochemical cell 1530. The external charge source includes a primary coil of the transformer that may be coupled in a wireless connection through the air to the secondary coil of the charge sub-controller circuit 1704. A battery of the present invention, for example, may contain a printed wire coil on the label of the battery 1510 or may be contained within a non-metallic container, a container having a non-metallic window, or the battery to form the secondary coil of the charging transformer. The charging circuit of this embodiment preferably operates at a frequency in the range from about 20 KHz to about 100 KHz, more preferably in the range from about 40 KHz to 60 kHz, with about 50 KHz being the most preferred. The signal from the external charging source energizes the secondary coil 1798 of the charge sub-controller circuit 1704 via the primary coil of the external charging source. The charging control state machine 1794 controls the universal charger circuit 1798 in order to optimize the charge cycle of the rechargeable electrochemical cell 1530. If the external charger circuit operates at a frequency of about 50 KHz, the transformer would have a sufficient range to allow charging of the electrochemical cell from about 1 to about 3 inches from the battery or battery of the present invention, and would thus allow an in situ charging of the electrochemical cell without removing the battery from the electric or electronic device. This may provide a distinct benefit over batteries that must be removed from a device. A battery in a surgically implanted device such as a pace-maker, for example, may be charged without surgically removing the battery from the patient.

Emergency Disconnect Sub-Controller

The controller may disconnect the electrochemical cell from the terminals of the container of the battery in the event that one or more safety-related conditions is detected. The controller may include an independent emergency disconnect sub-controller that detects unsafe conditions such as a short-circuit, an inverse polarity, an overcharge of the electrochemical cell, etc. and electronically disconnects the electrochemical cell from the terminals of the battery. Alternatively, the emergency disconnect functions may be performed by the circuitry of the discharge sub-controller and/or the charge sub-controller, or the controller may include separate sensing circuitry that signals the discharge sub-controller and/or the charge sub-controller to disconnect the electrochemical cell from the terminals of the battery. One embodiment of an emergency disconnect, for example, is discussed above with respect to FIG. 26. In this embodiment, an emergency disconnect circuit 1182 signals the converter controller 1152 when one or more safety-related conditions are detected.

Valve Sub-Controller

The controller may also monitor and manage gas exchange between a metal-air electrochemical cell and the external environment. Metal-air batteries have decided advantages over other types of electrochemical cells such as typical alkaline (zinc/manganese dioxide) or lithium batteries. The metal-air batteries have a higher specific energy and energy density. Metal-air batteries are also environmentally safe and generally leakage-free.

Metal-air batteries are comprised of one or more electrochemical cells. Each cell typically includes a metal anode and an air cathode separated by an electrolyte. The metal anode usually comprises a fine-grained metal powder, such as, but not limited to, zinc, aluminum or magnesium, blended together with an aqueous or non-aqueous electrolyte, such as potassium hydroxide, and a gelling agent into a paste. The air cathode is a catalytic structure designed to facilitate the reduction of oxygen and typically comprises active carbon, a binder and a catalyst, which are formed into a metal sheet together with a metal current collector.

In a metal-air battery, oxygen, through a series of reactions, reacts with the metal in the cell producing electrical current. In a zinc-air cell, for example, oxygen enables a charge/discharge reaction at the cathode (positive electrode):

$$\tfrac{1}{2}O_2 + H_2O + 2e \rightarrow OH-.$$

Meanwhile, a charge/discharge reaction occurs at the anode (negative electrode):

$$Zn + 2OH- \rightarrow ZnO + H_2O + 2e.$$

Hence, the zinc-air cell has an overall reaction:

$$Zn + \tfrac{1}{2}O_2 \rightarrow ZnO.$$

Typically, metal-air batteries utilize ambient air, which contains approximately 21% oxygen, as the reactant for the cells. The ambient air flows through ventilation holes in the housing. In the housing, the oxygen in the ambient air reacts with the cells. If the holes are not closed over an extensive period of time, the air will dehydrate the cell if the ambient humidity is below about 60% or will flood the cell if the abient humidity is greater than about 70%.

The controller, however, may monitor and manage the air exchange into and out of the electrochemical cell(s) of the battery so that air may only flow into the cell when the electrochemical cell requires oxygen to provide the current required by the load. When the load is disconnected or demands only a minimal amount of current, the controller may close or partially close the valves so that the reaction in the electrochemical cell is stopped or slowed down and the cell electrolyte is protected until the load demands more current. At that time, the controller may open the valves so that the electrochemical cell will generate the current demanded by the load.

In a preferred embodiment of the present invention the valves are non-linear, bi-stable microvalves. The microvalves are preferably micro-electromechanical, electrostatic, or magnetic valves arranged in an array configuration. The microvalves may include micro-electromechanical systems (MEMS), LIGA process, quasi-LIGA process or shape-based memory alloys (i.e., bi-metal laminates). The array configuration is preferably designed specifically for a particular single-cell battery or multiple-cell battery in order to provide enough airflow so that the particular battery may provide a high current rate and to stop the airflow so that the particular battery will not continue to be exposed to the ambient air after the load has been removed. The microvalves may be normally-open, but are preferably normally-closed. The use of bi-stable microvalves instead of a valve having a single stable state allows the controller to save energy when opening or closing the valves by sending a single pulse instead of "holding" the microvalves open or closed by maintaining a continuous voltage level.

Figure 33:
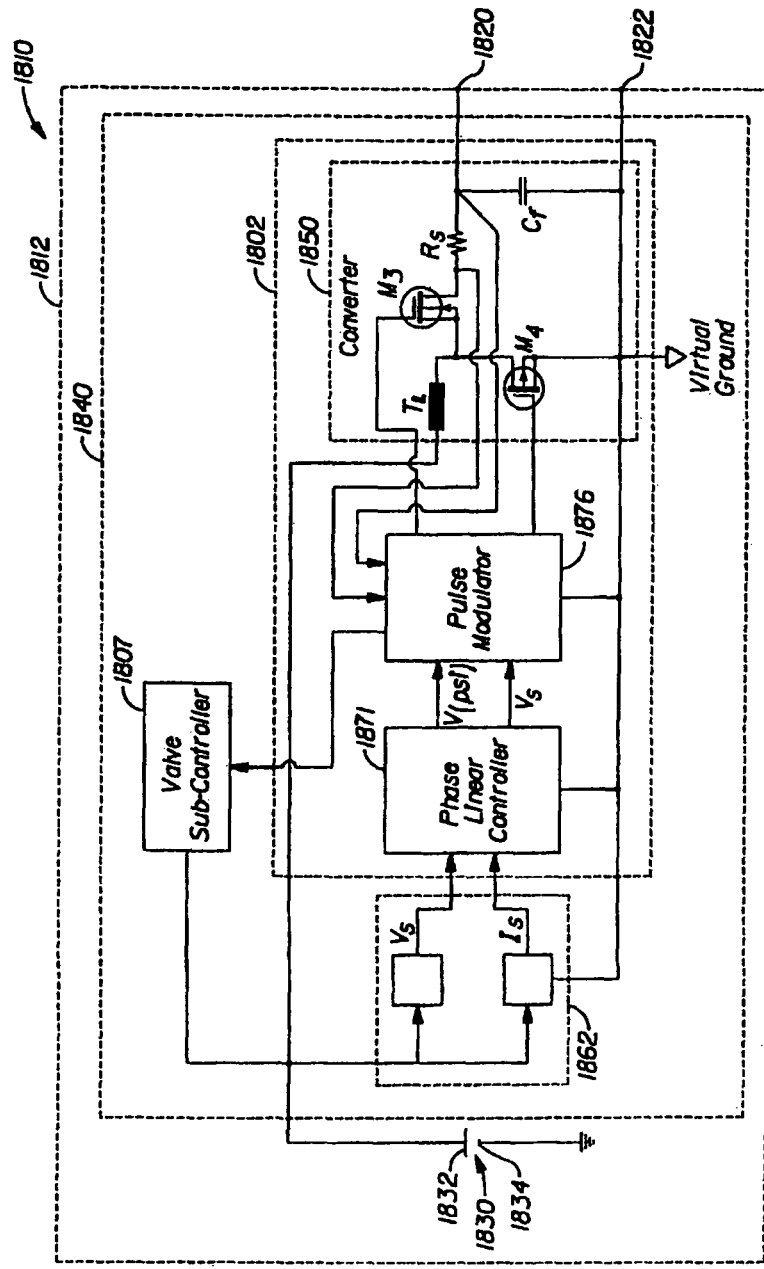
FIG. 33 is a combination of a block and schematic diagram of yet another preferred embodiment of a battery of the present invention.

The valve sub-controller may utilize one of many control schemes, whether described in this application or known in the art, to control the valves in a battery of the present invention. The control schemes described with reference to FIGS. 23-28 with respect to the discharge sub-controller may also be used to control the microvalves. In one embodiment, the valve sub-controller may close the microvalve is when the battery terminals are open-circuited (i.e., no load present), or in the case of an emergency disconnect short-circuit condition. In addition, FIG. 33 shows another control scheme that may be used to control the valves. In this example, the valve sub-controller opens the valves when the cell voltage is within a range of threshold voltages.

Figure 34:
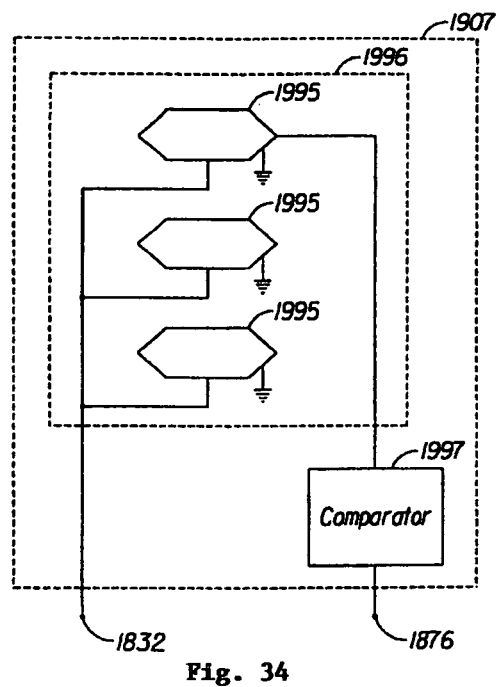
FIG. 34 is a block diagram of one embodiment of a valve sub-controller as depicted in FIG. 33.
Figure 35:
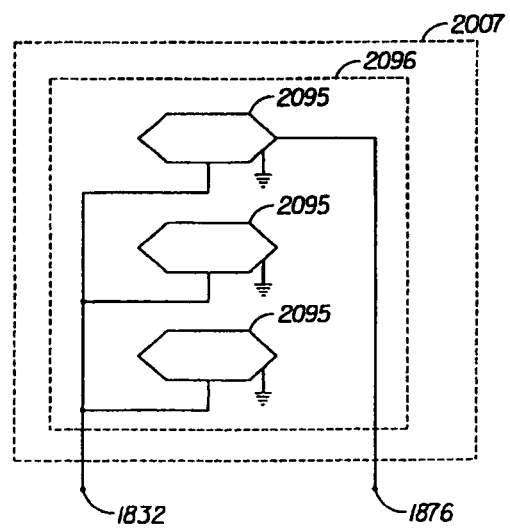
FIG. 35 is a block diagram of another embodiment of a valve sub-controller as depicted in FIG. 33.

FIG. 33 is a combination block and schematic diagram of a controller of the present invention that includes a valve sub-controller 1807. The valve sub-controller 1807 includes input connections from the positive electrode 1832 of the electrochemical cell 1830. The pulse modulator 1876 also provides a control signal that is used by the valve sub-controller to control the microvalve array. As shown in FIGS. 34 and 35, each microvalve is also grounded via the negative electrode 1834 of the electrochemical cell 1830. The pulse modulator may generate the control signal for the valve sub-controller based upon any of the control methods described above for controlling the discharge sub-controller with respect to FIGS. 23-28. For example, FIG. 33 shows a control scheme similar to the one described with respect to FIG. 28 in which the control signal is based on the cell voltage and/or the phase shift control signal V(phi), which is indicative of the internal impedance of the electrochemical cell 1830.

FIG. 34 shows one embodiment of a valve sub-controller 1807 of the present invention in which the microvalves 1995 form an array 1996 of digital (i.e., 2 state) valves. In this example, the control signal from the pulse modulator 1876 is fed into comparator 1997. Comparator 1997 determines if the array 1996 of microvalves 1995 needs to switch states (e.g., open or close). If the comparator 1997 determines that the array 1996 is to change states, the comparator 1997 preferably sends a control pulse signal that changes the state of each microvalve 1995 of the array 1996. The comparator 1997, however, may also control each microvalve 1995 in the array 1996 independently, or may control multiple arrays 1996 independently so that the valve sub-controller may regulate the amount of air that may flow into the container 1912 or housing depending upon the amount of drain current.

FIG. 35 shows another embodiment of the present invention in which the microvalve array 2096 includes proportionately-driven or analog-driven microvalves 2095. In this embodiment, the control signal from the pulse modulator 1876 directly controls the array 2096 of microvalves 2095. Thus, the pulse modulator 1876 generates a control signal having a duty cycle similar to the control signal that drives the DC/DC converter in the discharge sub-controller. The duty cycle proportionately controls the array 2096 so that the microvalves 2095 may be fully open, fully closed, or proportionately controlled between the open and closed states depending upon the demand of the load.

In another embodiment of a battery of the present invention, the valve sub-controller may individually control individual valves or groups of valves so that the valve sub-controller may alter the amount of air or oxygen that may flow into the electrochemical cell depending on the level of load current demanded from the electrochemical cell. In this embodiment, the valve sub-controller optimizes the airflow to most efficiently provided the demanded current and minimizes the exposure of the electrolyte to the ambient air. In a further aspect of this embodiment, a metal-air electrochemical cell having a valve sub-controller of the present invention may also be used in a hybrid battery with a rechargeable electrochemical cell. In this embodiment, the metal-air electrochemical cell may be used to charge the rechargeable electrochemical cell. The valve sub-controller may control the charging current supplied by the metal-air electrochemical cell by controlling the airflow into the metal-air electrochemical cell.

State of Charge Monitoring Circuit

The controller may also monitor the state of charge of one or more particular electrochemical cells and provide this information to a user, an electronic device, or for quality assurance purposes. The controller may notify the user, for example, by a low remaining capacity indication as described above with respect to the discharge sub-controller or by a visual or audio indication. Additionally, the controller may provide an indication to a device, for example, by technology such as electronic labeling discussed above or a communication bus such as an SMBUS designed for "Smart Batteries." Further, the controller may also monitor the voltage or remaining charge levels of an electrochemical cell or a battery to determine if the battery or the cell is defective and set a flag in a digital register if the battery or cell failed a quality assurance test. An external quality assurance test circuit, for example, may then check this register to determine of the battery or cell is defective before the battery or cell is shipped from the factory. In a primary cell, for example, the controller may sample the voltage and/or remaining charge levels over a period of time to determine if the voltage or remaining charge levels have fallen to an unacceptable level and, if so, set the flag in the register to indicate that the cell is defective. In a rechargeable cell, however, the controller may monitor a test charge or discharge cycle, or may monitor the voltage and/or remaining charge levels of the rechargeable cell after it has been charged in the same manner as for a primary cell to determine if the cell is able to maintain the charge adequately. If the cell fails one of these tests, the controller may set the flag in the register to indicate that the cell is defective. Thus, by including the controller in the battery, the controller may monitor the cell for the test period and the quality assurance equipment only needs to check a single flag in the battery to determine if the battery is acceptable to ship instead of needing to perform the actual monitoring of the individual cells.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. Various features of the invention are set forth in the following claims.

The invention claimed is:
1. An electronic device comprising:
a battery comprising a container including a positive terminal and a negative terminal;
an electrochemical cell disposed within said container, said cell having a positive electrode, a negative electrode and a cell voltage measured across said positive electrode and said negative electrode of said cell; and
a controller to monitor said cell for each of the following conditions within said cell: over temperature, short-circuit, overcharge, and over-discharge and to provide a safety disconnect when one of said conditions exist.

2. The device of claim 1, wherein said controller provides a safety disconnect in the event of excessive hydrogen generation.

3. The device of claim 1, wherein said controller provides a safety disconnect in the event of over pressure within the cell.

4. The device of claim 1, 2 or 3, wherein said controller electronically disconnects said cell from at least one of said terminals of said container.

5. The device of claim 1, wherein said controller electronically disconnects said cell from both of said terminals of said container.

6. The device of claim 1, wherein said controller monitors the temperature of said cell during the charging of said cell and provides a safety disconnect when said cell exceeds a predetermined temperature during charging.

7. The device of claim 1, wherein said controller monitors the temperature of said cell during the discharge of said cell and provides a safety disconnect when said cell exceeds a predetermined temperature during discharge of said cell.

8. The device of claim 1, wherein said controller monitors the temperature of said cell during the charging and discharge of said cell and provides a safety disconnect when said cell exceeds a predetermined temperature during either charging or discharging of said cell.

9. The device of any of claim 6, 7 or 8, wherein said controller electronically disconnects said cell from at least one of said terminals of said container.

10. The device of any of claim 6, 7 or 8, wherein said controller electronically disconnects said cell from both of said terminals of said container.

11. The device of claim 1, wherein said controller monitors the temperature of said cell during the charging of said cell and controls the charging current supplied to said cell based on said temperature of said cell.

12. The device of claim 1, wherein said controller monitors the state of charge of said cell.

13. The device of claim 1, wherein said controller monitors the cell to determine the ability of said cell to maintain a charge.

14. The device of claim 1, wherein said controller monitors the cell during charging to determine the ability of said cell to maintain a charge.

15. The device of claim 1, wherein said controller monitors the cell during discharging to determine the ability of said cell to maintain a charge.

16. The device of claim 1, wherein said controller monitors the temperature of said cell during the charging of said cell and adjusts the charging current supplied to said cell based on said temperature of said cell.

17. The device of claim 1, wherein:
a plurality of electrochemical cells are disposed within said container, each of said cells having a positive electrode, a negative electrode and a cell voltage measured across said positive electrode and said negative electrode of said cell; and
wherein said controller monitors each of said cells for each of the following conditions within said cells: over temperature, short-circuit, overcharge, and over-discharge and provides a safety disconnect when one of said conditions exist in at least one of said cells.

18. The device of claim 17, wherein said controller provides a safety disconnect in the event of excessive hydrogen generation within at least one of said cells.

19. The device of claim 17, wherein said controller provides a safety disconnect in the event of over pressure within at least one of said cells.

20. The device of any of claims 18 and 19, wherein said controller electronically disconnects at least one of said cells from at least one of said terminals of said container.

21. The device of claim 17, wherein said controller detects the terminal voltage and an internal impedance of each of said cells to determine a remaining charge of each of said cells and disconnects a cell when over-discharge of the cell is detected.

22. The device of claim 17, wherein said controller monitors the temperature of each of said cells during the charging of said cells and provides a safety disconnect when at least one of said cells exceeds a predetermined temperature during charging.

23. The device of claim 17, wherein said controller monitors the temperature of each of said cells during the discharging of said cells and provides a safety disconnect when at least one of said cells exceeds a predetermined temperature during discharging of said cell.

24. The device of claim 17, wherein said controller monitors the temperature of each of said cells during the charging and discharging of said cell and provides a safety disconnect when at least one of said cells exceeds a predetermined temperature during either charging or discharging of said cell.

25. The device of any of claims 22, 23, and 24, wherein said controller electronically disconnects at least one of said cells from at least one of said terminals of said container.

26. The device of any of claims 22, 23 and 24, wherein said controller electronically disconnects at least one of said cells from both of said terminals of said container.

27. The device of claim 17, wherein said controller is adapted to monitor the ability of each of said cells to maintain a charge.

28. The device of claim 17, wherein said controller monitors the cells during charging to determine the ability of each of said cells to maintain a charge.

29. The device of claim 17, wherein said controller monitors the cells during discharging to determine the ability of each of said cells to maintain a charge.

30. The device of any of claim 27, 28 or 29, wherein said controller is adapted to identify a cell that is unable to maintain a charge as a defective cell.

31. The device of claim 17, wherein said controller monitors the temperature of said cells during the charging of said cells and controls the charging current supplied to said cells based on said temperature of said cells.

32. The device of claim 17, wherein said cells are connected in one of series, parallel or series-parallel configuration.

33. The device of claim 17, wherein said controller adjusts the charging current supplied to said cells to prevent said cells from exceeding a predetermined temperature.

34. The device of claim 17, wherein said controller monitors the temperature of said cells during the charging of said cells and adjusts the charging current supplied to said cells based on said temperature of said cells.

35. An electronic device comprising:
a battery comprising a container including a positive terminal and a negative terminal;
a plurality of electrochemical cells disposed within said container, each of said cells having a positive electrode, a negative electrode and a cell voltage measured across said positive electrode and said negative electrode; and
at least one controller to monitor the temperature of said cells and to provide a safety disconnect that electronically disconnects all of said cells when at least one of said cells exceeds a predetermined temperature.

36. The device of claim 35, wherein said controller further monitors each of said cells for each of the following conditions within said cells: over temperature, short-circuit, overcharge, and over-discharge and provides the safety disconnect when any one of said conditions exists in at least one of said cells.

37. The device of claim 36, wherein said controller provides the safety disconnect in the event of over pressure within at least one of the cells.

38. The device of any of claims 35, 36, and 37, wherein said controller electronically disconnects said cells from at least one of said terminals of said container.

39. The device of any of claims 35, 36 and 37, wherein said controller electronically disconnects said cells from both of said terminals of said container.

40. The device of claim 35, wherein said controller monitors the temperature of each of said cells during the charging of said cells and provides the safety disconnect when at least one of said cells exceeds a predetermined temperature during charging.

41. The device of claim 37, wherein said controller monitors the temperature of each of said cells during the discharging of said cells and provides the safety disconnect when at least one of said cells exceeds a predetermined temperature during discharging of said cell.

42. The device of claim 35, wherein said controller monitors the temperature of each of said cells during the charging and discharging of said cell and provides the safety disconnect when at least one of said cells exceeds a predetermined temperature during either charging or discharging of said cell.

43. The device of claim 35, wherein said controller further checks said cells to identify a cell that is unable to maintain a charge and identify it as a defective cell.

44. The device of claim 35, wherein said controller monitors the temperature of said cells during the charging of said cells and controls the charging current supplied to said cells based on said temperature of said cells.

45. The device of claim 35, wherein said cells are connected in one of a series, parallel or series-parallel configuration.

46. The device of claim 35, wherein said controller adjusts the charging current supplied to said cells to prevent said cells from exceeding a predetermined temperature.

47. The device of claim 35, wherein said controller monitors the temperature of said cells during the charging of said cells and adjusts the charging current supplied to said cells based on said temperature of said cells.

48. An electronic device comprising:
a battery comprising a container including a positive terminal and a negative terminal;
a plurality of individual electrochemical cells disposed within said container, said cells having a positive electrode, a negative electrode and a cell voltage measured across said positive electrode and said negative electrode; and
a controller adapted to monitor the state of charge of each of said cells and to individually control the charge cycle of each of said cells.

49. The device of claim 48, wherein the controller optimizes the charging of each of said cells based on feedback to maximize the number and efficiency of each charge cycle of each of said cells.

50. The device of claim 49, wherein said controller optimizes the charging of each of said cells by monitoring the voltage of each of said cells.

51. The device of claim 49, wherein said controller optimizes the charging of each of said cells by monitoring the internal impedance of each of said cells.

52. The device of claim 49, wherein said controller provides control of the charging current to optimize the charging rate for each of said cells by examining the particular electrochemistry, memory effect, fatigue status, and temperature of each of said cells.

53. The device of claim 49, wherein said controller determines a charge value and maximum charge capacity of each of said cells to optimize the charging for each of said cells.

54. The device of claim 53, wherein said controller monitors the cell voltage, the charging current and temperature of each of said cells to optimize charging.

55. The device of claim 49, wherein said controller monitors the cell voltage, the charging current, temperature and the internal impedance of the cell to optimize charging.

56. The device of claim 48, wherein said controller directs charging current to other cells when at least one of said cell reaches full charge status.

57. The device of claim 48, wherein said controller reduces charging current supplied to a cell when it reaches full charge status.

58. The device of claim 48, wherein said cells are charged in series and said controller shunts charging current to another cell when a cell being charged reaches full charge status.

59. The device of claim 48, wherein said controller adjusts charging current supplied to said cells based on the charge level of said cells.

60. The device of claim 48, wherein said cells are connected in parallel and said controller disconnects a cell that has reached full charge status from charging current.

61. The device of claim 48, wherein said controller reduces charging current supplied to cells determined to have a charge level that is greater than a charge level of other cells.

62. The device of claim 48, wherein said controller monitors the temperature of said cells during the charging of said cells and provides a safety disconnect when at least one of said cells exceeds a predetermined temperature.

63. The device of claim 48, wherein said controller determines an instantaneous charge value and maximum charge capacity of each of said cells to optimize the charging for each of said cells.

64. The device of claim 48, wherein said cells are connected in one of a series, parallel or series-parallel configuration.

65. The device of claim 48, wherein said controller adjusts charging current supplied to said cells to prevent said cells from exceeding a predetermined temperature.

66. The device of claim 48 wherein said controller monitors temperature of said cells during charging of said cells and adjusts the charging current supplied to said cells based on the temperature of said cells.

67. A device comprising:
a battery comprising a container including a positive terminal and a negative terminal;
a plurality of individual electrochemical cells disposed within said container, said cells each having a positive electrode, a negative electrode, a cell voltage measured across said positive electrode and said negative electrode of said cell, and further having a state of charge including both a charge cycle and a discharge cycle; and
a controller adapted to monitor the state of charge of said plurality of individual electrochemical cells and to control the charge cycle and the discharge cycle of each of said cells to extend service run-time of the battery and to monitor at least one condition of over temperature, short circuit, overcharge and over-discharge, and further wherein said controller provides a safety disconnect when at one of said conditions exists.

68. The device of claim 67 wherein said controller monitors the temperature of the plurality of individual electrochemical cells to determine the state of charge to optimize the charge cycle and the discharge cycle.

69. The device of claim 67, wherein said controller monitors the cell voltage, charging current and temperature of the plurality of individual electrochemical cells to determine the state of charge to optimize the charge cycle and the discharge cycle.

70. The device of claim 67, wherein said controller comprises a discharge sub-controller having a converter that converts the cell voltage of the plurality of individual electrochemical cells to a desired output voltage.

* * * * *